United States Patent [19]
Arai et al.

[11] Patent Number: 5,591,385
[45] Date of Patent: Jan. 7, 1997

[54] METHOD FOR COOLING INJECTION MOLDING MOLDS

[75] Inventors: Takashi Arai, Satsute; Akira Furusawa, Kukizakimachi, both of Japan

[73] Assignee: Canon Kabushika Kaisha, Tokyo, Japan

[21] Appl. No.: 361,234

[22] Filed: Dec. 21, 1994

[30] Foreign Application Priority Data

Dec. 28, 1993 [JP] Japan .................................. 5-336010
Dec. 28, 1993 [JP] Japan .................................. 5-336011
Dec. 28, 1993 [JP] Japan .................................. 5-336012
Oct. 27, 1994 [JP] Japan .................................. 6-263991

[51] Int. Cl.$^6$ ................................................. B29C 45/73
[52] U.S. Cl. ..................... 264/40.6; 264/328.16; 264/336; 425/139; 425/144; 425/552; 425/556
[58] Field of Search ........................ 264/40.6, 328.1, 264/328.14, 328.16, 334, 335, 336; 425/143, 144, 139, 547–552, 556, 436 R, 436 RM

[56] References Cited

U.S. PATENT DOCUMENTS

| | | | |
|---|---|---|---|
| 5,017,315 | 5/1991 | Kumazaki | 264/40.6 |
| 5,062,786 | 11/1991 | Arai | 425/174 |
| 5,286,421 | 2/1994 | Arai | 264/1.7 |

FOREIGN PATENT DOCUMENTS 57-6731  1/1982  Japan .................................. 264/40.6

*Primary Examiner*—Jill L. Heitbrink
*Attorney, Agent, or Firm*—Fitzpatrick, Cella, Harper & Scinto

[57] ABSTRACT

This invention provides a plastic molding method, a mold, and a molded article. According to this invention, the supply flow rate of a coolant, e.g., cooling water, to a mold is maintained to shorten the molding cycle and to improve the productivity in continuous molding. The temperature distribution and pressure distribution in the mold are measured, thereby realizing determination as to whether a molded article is defective or not in the molding and cooling processes. The temperatures at respective required portions of the molded article removed from the mold are monitored, so that determination as to whether a molded article is defective or not can be performed, thereby improving the productivity. Countermeasures are taken not to deform the molded article. A thermoplastic resin injected from a hot runner into a cavity is heated at a gate discharge portion by a shearing heat upon injection. Countermeasures are taken to suppress temperature increase caused by this heat. Thus, the contiguous portion between the hot runner and the cavity is formed such that a recess will not be formed in the completed molded article.

15 Claims, 49 Drawing Sheets

FIG. 2

| MOLDING CONDITION | | |
|---|---|---|
| RESIN MATERIAL : NIPPON GE-PRO (CONTAINING 35%OF FILLER)<br>MOLDED ARTICLE : FRAME<br>MOLDING APPARATUS : TOSHIBA MACHINE 650 TON<br>TEMPERATURE OF CYLINDER : 300°C<br>TEMPERATURE OF HOT RUNNER : 300°C<br>TEMPERATURE OF FACTORY COOLING WATER : 25°C | | |
| | PRESENT INVENTION | PRIOR ART |
| PRESET TEMPERATURE OF COOLANT COOLING UNIT | 10°C | ---- |
| PRESET TEMPERATURE OF MOLD TEMPERATURE ADJUSTING UNIT | 15°C | 35°C |
| PRESSURE OF BOOSTER PUMP | 6kgf/cm$^2$ | ---- |
| FLOW RATE (INDICATED BY FLOWMETER) | 10~18 l/min | NOT AVAILABLE |
| NUMBER OF BRANCHES OF COOLANT BRANCHING UNIT | 20 | 20 |
| INJECTION PRESSURE | 1400kgf/cm$^2$ | 1400kgf/cm$^2$ |
| INJECTION TIME | 4.5sec | 4.2sec |
| DWELL PRESSURE | 600kgf/cm$^2$ | 600kgf/cm$^2$ |
| DWELL TIME | 4.5sec | 6.5sec |
| COOLING TIME | 8.0sec | 45.0sec |
| MOLD OPENING TIME | 3.5sec | 3.5sec |
| MOLD CLOSING TIME | 4.0sec | 4.0sec |
| MOLDED ARTICLE REMOVING TIME | 3.5sec | 5.0sec |
| MOLDED ARTICLE CHUCKING FORCE | 2.0kgf | 6.0kgf |
| TEMPERATURE OF MOLDED ARTICLE | 45~110°C | NOT AVAILABLE |
| PRESSURE OF RESIN IN MOLD | 240~450kgf/cm$^2$ | NOT AVAILABLE |
| TEMPERATURE OF MOLD | 45~65°C | NOT AVAILABLE |
| MOLDING CYCLE | 28sec | 68.2sec |
| FRACTION NON-DEFECTIVE | 99% | 92% |
| MAXIMUM SIZE VARIATION | 0.1mm | 0.3mm |

[CORRELATION DURING MOLDING BETWEEN FLOW RATE OF COOLING WATER AND MOLD TEMPERATURE]

[CORRELATION DURING MOLDING BETWEEN FLOW RATE OF COOLING WATER AND CHANGE IN TEMPERATURE OF MOLDED ARTICLE]

[RELATIONSHIP DURING CONTINUOUS MOLDING BETWEEN PRESSURE OF RESIN IN MOLD]

— INNER PRESSURE OF RESIN

[RELATIONSHIP DURING CONTINUOUS MOLDING BETWEEN CHANGE IN SIZE]

— SIZE PRECISION

[RELATIONSHIP DURING CONTINUOUS MOLDING BETWEEN PRESSURE OF RESIN IN MOLD]

NUMBER OF MOLDING SHOTS
— PRESSURE kg/mm$^2$

[RELATIONSHIP DURING CONTINUOUS MOLDING BETWEEN CHANGE IN SIZE]

NUMBER OF MOLDING SHOTS
— SIZE PRECISION

[RELATIONSHIP DURING CONTINUOUS MOLDING BETWEEN CHANGE IN MOLD TEMPERATURE]

[RELATIONSHIP DURING CONTINUOUS MOLDING BETWEEN CHANGE IN SIZE OF MOLDED ARTICLE]

[RELATIONSHIP DURING CONTINUOUS MOLDING BETWEEN CHANGE IN MOLD TEMPERATURE]

NUMBER OF MOLDING SHOTS
— MOLD TEMPERATURE

[RELATIONSHIP DURING CONTINUOUS MOLDING BETWEEN CHANGE IN SIZE OF MOLDED ARTICLE]

NUMBER OF MOLDING SHOTS
— SIZE OF MOLDED ARTICLE

F I G. 34
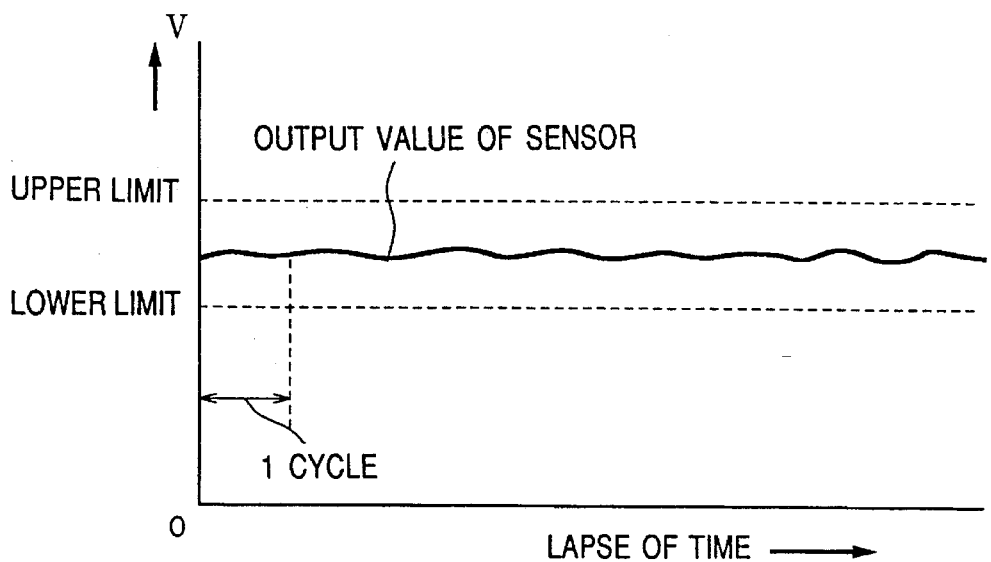
F I G. 35
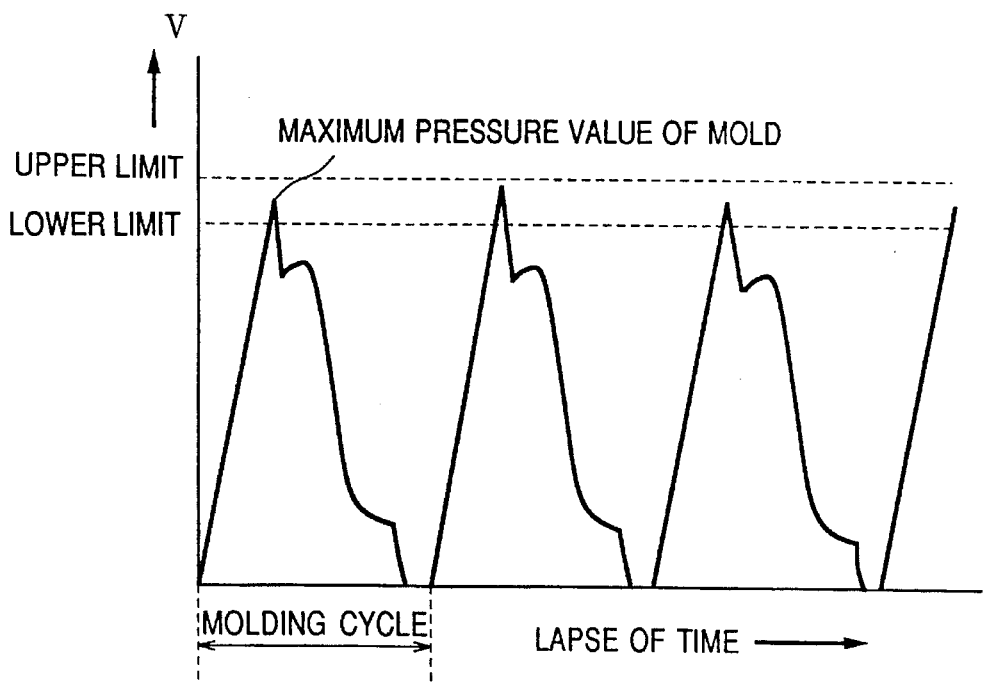

|  | PRESENT INVENTION | PRIOR ART |
|---|---|---|
| GATE SEAL TIME | 4s | 8s |
| DWELL TIME | 4s | 8s |
| MOLDING CYCLE | 20s | 24s |

FIG. 50
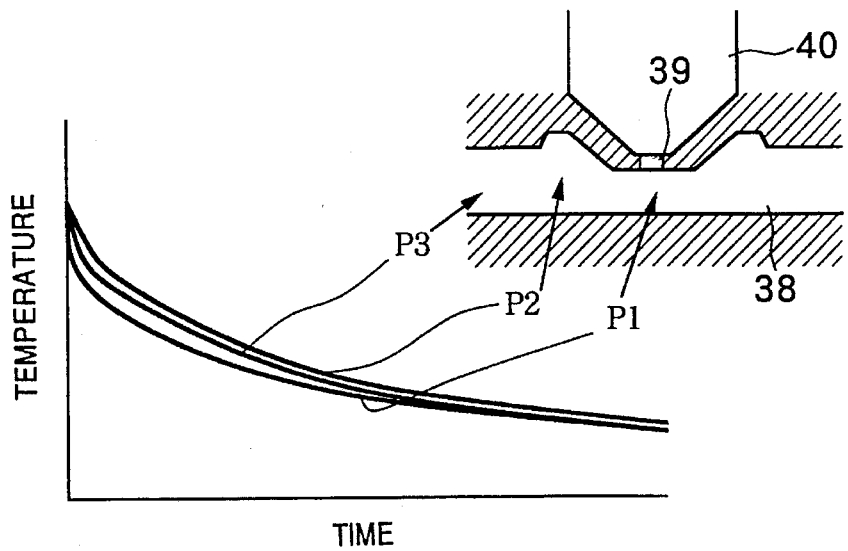
FIG. 51
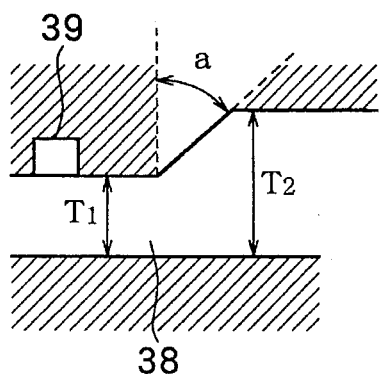
| T1 mm | T2 | a(DEGREE) | OUTER APPEARANCE | RECESS |
|---|---|---|---|---|
| 1.5 | 2.0 | 30 | NG | PRESENT |
| 1.5 | 2.0 | 45 | OK | ABSENT |
| 1.5 | 3.0 | 45 | NG | PRESENT |
| 1.5 | 3.0 | 60 | OK | ABSENT |
FIG. 52
T1/T2 ≥ 0.75 → a < 45 DEGREE
0.75 ≥ T1/T2 ≥ 0.5 → 60 DEGREE > a > 45 DEGREE
T2/T1 ≤ 0.5 → a > 60 DEGREE

METHOD FOR COOLING INJECTION MOLDING MOLDS

BACKGROUND OF THE INVENTION

The present invention relates to a plastic molding system for obtaining a resin molded article having high size precision and used in, e.g., an optical system, in accordance with injection molding, a plastic injection mold for injection-molding a thermoplastic resin by using a hot runner, and a plastic molded article; and a plastic molding method for forming a boss to project from a surface of the main body of a molded article so that the molded article is connected to another article, a mold for the same, and a molded article of the same.

A conventional plastic molding system uses an injection molding apparatus and accompanying facilities. In an injection mold used in a molding system of this type, the gate of its hot runner has a section as shown in FIGS. 66 and 68.

Referring to FIG. 66, in a hot runner 40, a gate 39 is provided to be directly continuous to a cavity 38 that forms the thick-walled portion of a molded article 38A (see FIG. 67).

Referring to FIG. 68, in a hot runner 40, a gate 39 is contiguous to a cavity 38, which corresponds to the thick-walled portion of a molded article 38A (see FIG. 68), through a land portion 100 provided as a dummy.

When a plastic molded article is to be connected to another article, a boss is integrally formed to project from mainly the lower side surface, which is one surface of the molded article main body, and the connecting hole portion of the mating article is fitted on this boss, or the mating article is integrally assembled with the boss of the molded article main body through engagement of a mounting screw.

Often, a boss 150 having a shape as shown in FIGS. 70 and 71 is integrally formed on one surface of the main body of a flat molded article 38A, and the mating article is integrally assembled with this molded article 38A such that the connecting hole portion of the mating article is in slidable contact with an outer circumferential surface 200 of the boss 150. When the boss 150 is to be fitted in the connecting hole portion of the mating article in this manner, in order to maintain the gap with respect to the mating article, an annular base portion 202 is sometimes formed on the base of the boss 150, as shown in FIGS. 72 and 73. In this case, the diameter of the boss 150 is increased as compared to the wall thickness of the molded article main body. Since the base portion 202 is formed, it is known that during the cooling process the temperature drop in the boss 150 and base portion 202 is delayed as compared to the temperature drop in the molded article main body.

For this reason, when the boss 150 has a large diameter, a recessed hole 208 is formed in the central portion of the boss 150, as shown in FIGS. 74 and 75, in order to quicken the temperature drop. Especially, when the connecting portion of the mating article is to be mounted on the boss through engagement of a mounting screw, the recessed hole 208 is utilized as the screw-locking lower hole.

However, the conventional plastic molding system described above has drawbacks as follows.

(1) Usually, the temperature of factory water is about 25° C. and varies by an annual average of about 3° C. The temperature of the factory water at branching outlets also varies. The water temperature varies daily or hourly depending on, e.g., the number of injection molding apparatuses to which the factory water is branched or the number of machines that are simultaneously operated.

When the factory water is used as the cooling water for cooling the mold to a predetermined temperature, as the difference between the pressure of water supplied to the mold and the pressure of water returning from the mold is as small as about 1 kg/cm$^2$ to 2 kg/cm$^2$, the flow rate of the coolant flowing through the mold is greatly decreased by the pressure loss caused by the line resistance of the coolant and the branching line resistance in the mold. As a result, the cooling efficiency of the mold is degraded.

In order to control the temperature of the coolant in the mold, thereby stabilizing the temperature change in the mold repeated during the continuous molding processes to a predetermined pattern, a temperature controller is sometimes interposed between the mold and the cooling water supply source (central chiller). However, since the factory water usually has a temperature of 25°±3° C., as described above, the temperature of the factory water as the coolant can only be stabilized at 30° C. or more by a temperature controller having only a pressure adjusting function. In addition, since the capacity of the conventional temperature controller is 60 to 80 (l/min.) at maximum discharge, when the pressure loss in the line of the coolant is 3 to 4 kg/cm$^2$ or more, a desired flow rate cannot be actually maintained.

From these circumstances, conventionally, the quantity of heat of the resin supplied into the mold is empirically set from a cycle required for transmitting the heat by the coolant communicating through the branching lines, such that a change in mold temperature is converged to a predetermined pattern during the continuous molding processes.

More specifically, countermeasures have been taken so that the heat balance of the mold in the respective cycles, ranging from the molding temperature to the removing temperature in continuous molding, is set at equilibrium. According to this conventional system, however, the heat exchange efficiency in the cooling process is very low. Thus, the molding cycle is prolonged, and the productivity is undesirably suppressed.

(2) In the conventional molding system, data concerning an article under molding are not acquired. Therefore, injection molding is performed in advance under several kinds of molding conditions. The sizes of the obtained molded articles are measured. The condition under which an article having the highest size precision, among the measured values, was molded is selected. The injection molding apparatus and accompanying facilities are set in accordance with the selected molding condition. As a result, the setting operation of the optimum condition requires a large amount of labor and time.

Especially, since decisive information necessary for setting the large number of parameters (the temperature of the plasticizing cylinder, the temperature of the hot runner, the preset temperature of the cooling water temperature controller, the injection speed, the injection pressure, the dwell pressure of the mold, a time during which the dwell pressure should be maintained, the cooling time, the mold opening/closing speed, the control speed, operation, and position of the automatic molded article removing unit, and the like) of the molding condition to appropriate values cannot be obtained, the respective parameters are empirically set in accordance with a trial-and-error manner.

(3) In the conventional molding system, although the temperature of the coolant before supplied to the mold can be obtained from the preset temperature of the cooling water temperature controller, the temperature and flow rate of the coolant actually flowing in the branching lines in the mold cannot be obtained. Accordingly, when a molded article is actually removed from the mold, the temperature distribution of the entire molded article cannot be obtained, and the correspondence between the coolant used for temperature control in the mold and the temperature distribution of the molded article cannot be obtained. As a result, even when the molded article has a partial deformation due to a difference in partial heat shrinkage caused by the non-uniform temperature distribution of the molded article in the cooling process, no practical countermeasures can actually be taken to search the cause of the deformation or to prevent the deformation. As an effective countermeasure, at most merely the cooling time is prolonged to maintain the thermal uniformity of the molded article in the mold.

(4) The main causes of the deformation of the molded article in injection molding are the non-uniformity in the density distribution of the resin when filled in the mold and the non-uniformity of the temperature distribution of the molded article in the mold during the cooling process after filling. In other words, regarding the density distribution of the resin in the mold, the higher the density, the smaller the amount of shrinkage; the lower the density, the larger the shrinkage.

For this reason, it is assumed that a local stress is generated in the molded article due to the difference in local shrinkage, thereby causing deformation. Regarding the temperature distribution, a portion where the temperature is low reaches the setting temperature of the resin faster than other portions, and causes shrinkage in the mold in accordance with the thermal expansion coefficient of the resin. A portion where the temperature is high causes similar shrinkage after this to pull the portion which is set in advance, and causes local stress. When the molded article is to be removed from the mold, this portion causes deformation. In this case, however, the practical cause for the shrinkage cannot be obtained, and no effective countermeasures are taken.

(5) In the conventional molding system, the preset values of the injection molding apparatus and cooling water temperature controller can be selectively set as daily management and molding condition management performed after a change in procedure (e.g., mold exchange) of the molded article. In the conventional molding system, however, management concerning whether or not the actual molding states (the flowing state of the resin in the mold, the pressure distribution, the temperature distribution, the temperature and flow rate of the coolant, and the like) are reproduced in accordance with the required condition cannot be performed.

Accordingly, when, e.g., an error occurs in connection of the cooling water supply pipe which is to be connected to the mold, the line to flow the coolant therethrough clogs, and the capability of the heater for heating the plasticizing cylinder of the injection molding apparatus is changed and thus the actual mold temperature, molded article removing temperature, the viscosity of the resin, flowability of the resin, and the pressure distribution are changed, these changes cannot be instantaneously noticed, and countermeasures for them are delayed.

(6) In the conventional molding system, usually, an automatic molded article removing machine is operated based on a mold open completion (so-called mold opening) signal from the injection molding apparatus. A hand is inserted in the mold to hold the molded article, and thereafter the hand is retracted from the mold. The injection molding apparatus awaits to perform a mold closing operation until it receives a retreat completion signal from the automatic molded article removing machine. It is pointed out that an injection molding apparatus of this type has a considerably long loss time after it receives a mold closing signal until it starts an actual mold closing operation.

(7) In the conventional molding system, the automatic molded article removing machine is used to remove the molded article from the mold, as described above. An air cylinder type chuck operated by compressed air supplied in the factory is used as the hand of the removing machine. However, when molding is performed in one injection molding apparatus while sequentially exchanging a plurality of molds, every time a mold is exchanged, the chuck must be exchanged, and the chucking force and the like of the chuck must be adjusted. When an error occurs in this chuck adjustment (e.g., the chucking force), a molded article having an abnormal shape may be obtained. When the molded article removing temperature is high, the molded article is unexpectedly deformed by the chucking force acting on the molded article. As a result, the size precision of the molded articles varies, or a defective article is obtained.

With the conventional injection mold shown in FIG. 66, a sink is formed in the vicinity of the gate 39 of the molded article. With the conventional mold shown in FIG. 68, so-called stringing occurs when the mold is opened. In the mold shown in FIG. 66, a countermeasure may be taken, e.g., the thickness of the portion of the molded article around the gate 39 is decreased. Then, however, a flash or a silver stream occurs at a portion of the molded article corresponding to the vicinity of the gate 39, thus degrading the outer appearance. A flash is caused when the resin temperature is increased more than necessary to decompose the resin or to evaporate or decompose an additive in the resin. A silver stream is caused when the resin temperature is increased more than necessary to evaporate or decompose the water content in the resin, thereby hydrolyzing the resin or evaporating the additive in the resin. These defects pose a serious problem when, in particular, an outer surface of a plastic molded article that requires high precision and a good appearance is to be molded.

In FIGS. 70 and 73, when the columnar or cylindrical boss 150 is integrally formed by injection molded, several problems arise.

More specifically, in spite that the molded article 38A is cooled, after molding, to a temperature that enables releasing from the mold, the boss 150 and the base portion 202 are not sometimes cooled to the temperature required for releasing from the mold. Then, the molding cycle (cooling step) must be prolonged, leading to a decrease in productivity.

A recess may be formed in an fitting surface 200 of the boss 150 due to a difference in temperature drop among portions of the molded article. This degrades fitting precision or causes formation of a recess in a surface of the molded article main body 38A opposite to the boss forming portion, thereby degrading planar precision and outer appearance. As shown in FIGS. 74 and 75, when a recessed hole is formed in the boss, a decrease in strength of the boss 150 becomes a problem. Furthermore, on the side of the mold, when the position of the boss is to be changed, a female die portion of the boss 150 and a male portion forming the recessed hole 208 must be corrected simultaneously. Both the female and male dies must be altered, and alignment of the female and male dies becomes difficult, leading to an increase in cost.

SUMMARY OF THE INVENTION

The present invention has been made in view of the above problems and situations, and has as its object to provide a plastic molding method in which a flow rate of a coolant, e.g., cooling water, to be supplied to a mold is maintained, so that the molding cycle in continuous molding is shortened and the productivity is improved.

It is another object of the present invention to provide a plastic molding method in which a flow rate of a coolant in a communication line of a mold is measured, and a measurement result is fed back, so that a necessary and sufficient supply flow rate of the coolant can be maintained.

It is still another object of the present invention to provide a plastic molding method in which a temperature at a necessary portion in a mold is measured, and the flow rate control of a coolant, which is necessary for temperature control, is performed.

It is still another object of the present invention to provide a plastic molding method in which a temperature distribution and a pressure distribution in a mold are measured, so that determination concerning non-defectiveness and defectiveness of a molded article in molding and cooling processes can be realized.

It is still another object of the present invention to provide a plastic molding method in which a temperature distribution and a pressure distribution in a mold are measured, measurement results are fed back to correct various parameters of an injection molding apparatus and accompanying facilities, so that a countermeasure can be taken instantaneously for a change in the parameters.

It is still another object of the present invention to provide a plastic molding method in which temperatures at necessary portions of a molded article removed from the mold are monitored, thereby performing determination concerning non-defectiveness and defectiveness of the molded article.

It is still another object of the present invention to provide a plastic molding method in which an opening/closing operation of a mold and an operation of a molded article removing means are performed without a loss time, thereby improving the productivity of the molded articles.

It is still another object of the present invention to provide a plastic molding method in which a chucking force of the molded article removing means is adjusted and controlled from the removing temperature of the molded article removed from the mold, so the molded article will not deform.

It is still another object of the present invention to provide a plastic molding method in which a temperature at a necessary portion of a molded article removed from a mold is monitored, thereby allowing determination concerning non-defectiveness and defectiveness of the molded article.

A thermoplastic resin injected from a hot runner into a cavity is heated at a gate discharge portion due to a shearing heat during injection. It is still another object of the present invention to provide a plastic mold in which the contiguous portion between the hot runner and the cavity is formed to suppress this temperature increase, so a recess will not be formed in a completed molded article.

It is still another object of the present invention to provide a plastic molded article the outer appearance of which has no problem as a molded article and in which a recess will not be formed in the surface of the molded article during injection molding.

It is still another object of the present invention to provide a plastic molded article in which a boss can be formed to have a wall thickness equal to or smaller than that of a molded article main body regardless of the fitting diameter of the boss.

Other objects of the present invention will become apparent from preferred embodiments thereof to be described later.

In order to achieve the above problems and to achieve the above objects, according to the present invention, there is provided a plastic molding system which, in injection molding of a resin, injects a resin from an injection molding apparatus into a mold, molds the resin, cools the resin to a predetermined temperature in the mold, and removes a molded article, wherein a supply pressure control unit for the coolant to be supplied to the mold is provided to a coolant line that cools the mold, to forcibly supply the coolant cooled to a required temperature to set steep the gradient of temperature drop in the cooling step, thereby maintaining the equilibrium of heat balance of the mold in the respective cycles ranging from a molding temperature to a removing temperature in continuous molding.

In this case, a cooling unit for cooling the coolant, a temperature control unit for the coolant, and a flow rate measuring unit provided to a coolant return line extending from the mold may be further provided along the coolant line, and the supply pressure control unit may be controlled based on a measurement result of the flow rate measuring unit.

The coolant line is preferably branched into a plurality of branching lines in the mold. A coolant branching unit is preferably provided respectively to the branching lines in the mold. The supply pressure control unit preferably controls the supply pressure of the coolant to the coolant branching unit of each of the branching lines. The flow rate measuring unit preferably comprises a plurality of flow rate measuring units for the respective branching coolant return lines. A measurement result obtained by the flow rate control unit is preferably input to a control unit. The control unit preferably outputs a drive signal for the supply pressure control unit based on a measurement result obtained by a mold temperature measuring unit provided to the mold and the measurement result obtained by the flow rate measuring unit.

Furthermore, throttle valves are preferably provided midway along supply lines extending from the coolant branching unit to the mold. A measurement result obtained by the flow rate measuring unit is preferably supplied to the control unit, and the control unit preferably outputs opening degree control signals for the throttle valves based on the measurement result obtained by the mold temperature measuring unit provided to the mold and the measurement result obtained by the flow rate control unit.

According to the present invention, there is provided a plastic molding system which, in injection molding of a resin, injects a resin from an injection molding apparatus into a mold, molds the resin, cools the resin to a predetermined temperature in the mold, and removes a molded article, wherein a supply pressure control unit for the coolant to be supplied to the mold is provided to a coolant line that cools the mold, to forcibly supply the coolant cooled to a required temperature to set steep the gradient of temperature drop in the cooling step, thereby maintaining the equilibrium of heat balance of the mold in the respective cycles ranging from a molding temperature to a removing temperature in continuous molding. A pressure sensor and a mold temperature measuring unit are provided at necessary portions of the mold. The measurement results obtained by the pressure sensor and mold temperature measuring unit are supplied to a control unit. The control unit outputs, from the measurement results, a signal for adjusting the flow rate of the coolant in the coolant line, thereby uniforming heat of the mold under cooling. In this case, throttle valves are provided to supply lines extending from the coolant branching unit to the mold. The control unit preferably outputs opening degree control signals for the throttle valves to adjust the flow rate of the coolant.

According to the present invention, there is provided a plastic molding system which, in injection molding of a resin, molds a resin injected from an injection molding apparatus into a mold, cools the resin to a predetermined temperature in the mold, and removes a molded article, wherein mold temperature measuring units for measuring a temperature of the mold and pressure sensors for measuring a resin pressure in the mold are disposed at a plurality of necessary portions, and in a cooling process after injection molding, or from injection molding to a cooling process, whether a molded article is defective or not defective is determined by a control unit based on measurement results of the mold temperature measuring units and the pressure sensors. In this case, the molding system has a recording unit for recording output signals from the pressure sensors. Recorded information of the recording unit may be monitored, and an alarm signal may be output upon detection of an abnormality from output waveforms of the pressure sensors. A removing means for removing the molded article from the mold preferably has a pressure adjusting means for its holding portion so that a chucking pressure of the molded article is controlled based on a signal from the control unit.

Furthermore, according to the present invention, there is provided a plastic molding system which, in injection molding of a resin, molds a resin injected from an injection molding apparatus into a mold, cools the resin to a predetermined temperature in the mold, and removes a molded article, comprising holding means for holding the molded article in the mold from above and below. A transfer means is provided to a molded article unloading line. The transfer means places thereon and receives the molded article sent from the holding means as being held with the holding means, and transfers the molded article to the unloading line. In this case, the transfer means preferably comprises a rest table for placing the molded article thereon, a tilting means for tilting the rest table, and a sliding table member for sliding the molded article toward the unloading line when the tilting means performs tilting.

According to the present invention, there is provided a plastic molding system which, in injection molding of a resin, molds a resin injected from an injection molding apparatus into a mold, cools the resin to a predetermined temperature in the mold, and removes a molded article, wherein a molded article unloading line for conveying out the molded article unloaded from the mold is provided with monitoring means for monitoring temperatures at respective portions of the molded article, thereby determining whether the molded article is defective or not defective. In this case, flow rate control of the coolant in the branching lines of the coolant may be performed by a feedback signal sent from the monitoring means.

According to the present invention, there is provided a plastic injection mold used for injection molding a thermoplastic resin by using a hot runner, in which the land portion of the gate contiguous to the cavity is cylindrical, and forms a contiguous portion of the cavity to the gate such that the wall thickness of a portion of the molded article at the cavity portion which is contiguous to the gate through the land portion is gradually decreased toward the outlet of the land portion.

According to the present invention, the land portion of the gate contiguous to the cavity is constituted by a region extending in a direction perpendicular to an injecting direction of the hot runner at the gate, and a region for changing the flowing direction of the resin so as to be contiguous to the cavity through a portion of this second region remote from the gate.

According to the present invention, a projecting portion having a required size is formed in the cavity, through which the gate of the hot runner contiguous to the cavity projects into the molded article through a surface of the molded article. A wall thickness changing portion is also formed around the gate in the cavity to gradually increase the wall thickness of the molded article at this portion in a direction to be remote from the gate.

Furthermore, according to the present invention, a thin-walled portion of the molded article is formed in the cavity on a surface side opposing the gate of the hot runner contiguous to the cavity. A wall thickness changing portion is also formed in the cavity, which gradually increases the thickness of the molded article at this portion in a direction to be remote from the gate.

In a plastic molded article formed by injection molding according to the present invention, the wall thickness of a portion of the molded article, which corresponds to a cavity portion of the mold that is contiguous, upon molding, to the gate of the hot runner through the land portion, is gradually decreased toward the outlet of the land portion.

In the molded article according to the present invention, the land portion which is contiguous, upon molding, to the gate of the hot runner constitutes part of the molded article. This portion is constituted by a region extending in a direction perpendicular to the injecting direction of the hot runner, and a region extending in a bent direction to be contiguous to the molded article main body at a portion of the first region remote from the gate.

In the plastic molded article according to the present invention, upon molding, an inwardly recessed groove portion is formed in the surface of a portion of the molded article which is contiguous to the gate of the hot runner. A wall thickness changing portion is formed around the gate-corresponding portion of the molded article to gradually increase the thickness of this portion in a direction to be remote from the gate-corresponding portion.

Furthermore, in the plastic molded article according to the present invention, upon molding, a thin-walled portion is formed on a lower surface side opposing the gate of the hot runner. A thickness changing portion is formed to gradually increase the thickness in a direction to be remote from a portion thereof contiguous to the gate.

Therefore, according to the present invention, a boss, which projects from one surface of a molded article main body so as to be connected to the mating article, comprises a plurality of plate-like ribs extending radially from a fitting center, such that the ribs are in contact with the wall surface of a fitting hole of the mating article with at least three outer edge portions thereof.

According to the present invention, a boss, which projects from one surface of a molded article main body so as to be connected to the mating article, comprises a plurality of plate-like ribs extending radially from a fitting center, such that the ribs define a gap through which the boss is in contact with an outer edge portion of a fitting projection of the mating article with at least three inner edge portions thereof.

According to the present invention, a boss, which projects from one surface of a molded article main body so as to be connected to the mating article, comprises a plurality of plate-like ribs extending radially from a fitting center, such that the ribs define a gap around a mounting screw of the mating article, the gap serving as a screw lower hole with which the boss is threadably engaged with at least three inner edge portions thereof.

With the above arrangement, a difference in temperature drop does not occur in the cooling process between the molded article main body and the boss. A loss time in the molding cycle (cooling step) is eliminated, the productivity can be improved, and a recess will not be formed in the molded article, thereby maintaining high fitting precision with the mating article, high planar precision, and good outer appearance. Correction of the mold, e.g., minor correction of the position of the boss, can be locally performed, thereby facilitating correction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a table showing molding conditions of the apparatus of the embodiment shown in FIG. 1;

FIG. 34 is a graph showing determination of the temperature sensor;

FIG. 35 is a graph showing determination of the pressure sensor;

FIG. 50 is a graph showing temperatures at different portions of a mold;

FIG. 51 includes a diagram and a table showing comparison of the shape of the mold and molding results;

FIG. 52 shows inequalities indicating the practical values of FIG. 51;

DETAILED DESCRIPTION OF THE PREFERRED EMBODIMENTS

The preferred embodiments of the present invention will be described in detail with reference to the accompanying drawings.

Figure 1:
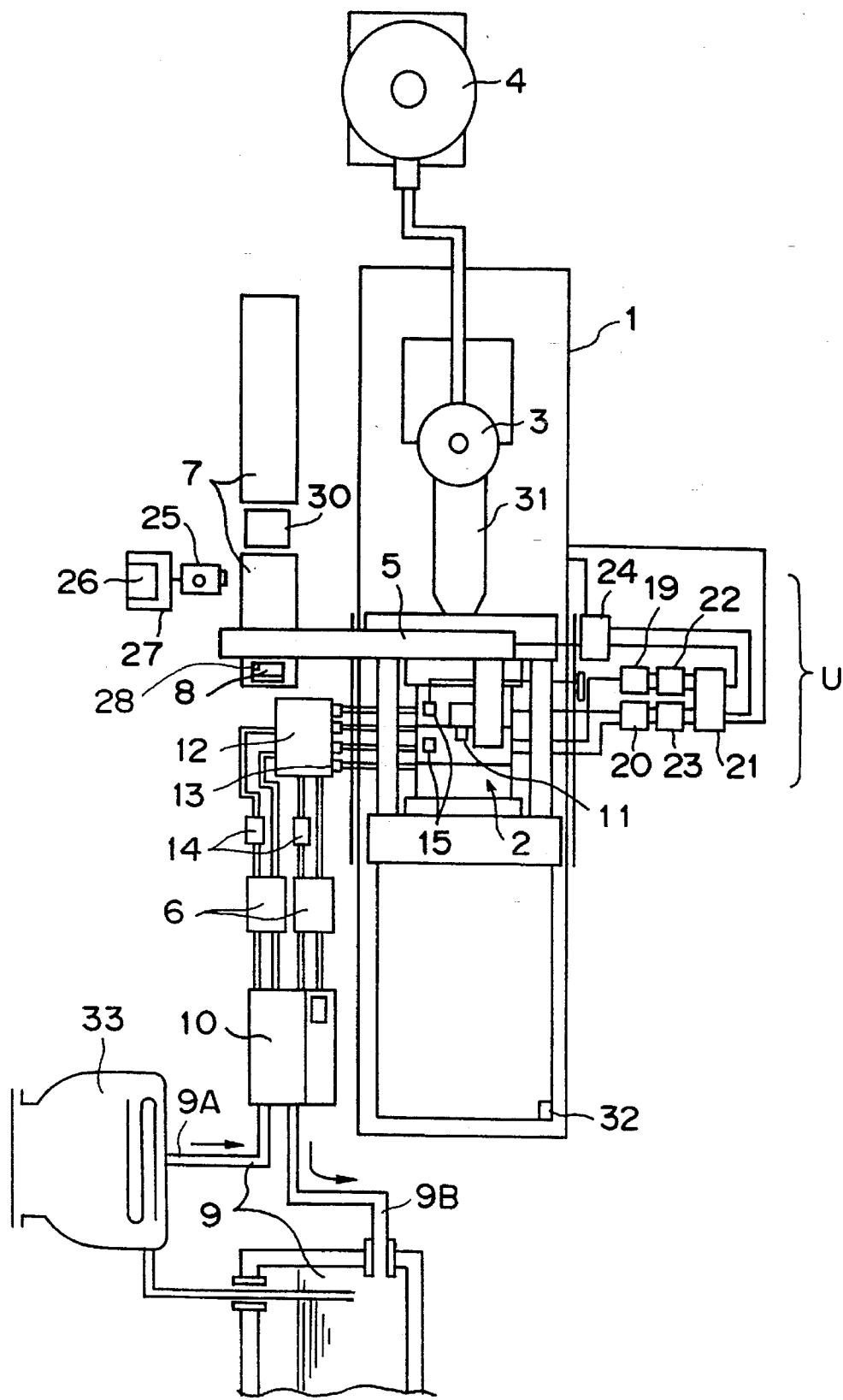
FIG. 1 is a schematic diagram showing an embodiment of the present invention.

FIG. 1 is a schematic diagram of an injection molding apparatus 1. Referring to FIG. 1, the injection molding apparatus 1 incorporates a plasticizing cylinder 31. A resin material dried by hot air is supplied by air from a material supply unit 4 to the plasticizing cylinder 31 through a hopper 3. The resin material heated to a predetermined temperature is filled from the plasticizing cylinder 31 into the cavity of a mold 2 mounted in the injection molding apparatus 1 at a predetermined pressure in the process of repeated predetermined cycles. The resin material is cooled in the mold, and is removed outside as a completed molded article by an automatic molded article removing means 5, e.g., a robot hand.

A plurality of cooling lines (not shown) are formed in the mold 2. A coolant, e.g., factory water or cooling oil, is supplied to and circulated in the mold 2 through pipe lines 9, thereby maintaining the mold 2 to a predetermined temperature. For this purpose, in the coolant line, for example, cooling water serving as the cooling is supplied from a central factory water chiller 33, heated to a required temperature by a temperature controller 6, branched by a branching unit 12, and supplied to the respective branching lines of the mold 2. The molded article is removed, after cooling, by the automatic molded article removing means 5 onto a conveyor 7 serving as an unloading line, and is automatically conveyed.

Supply pressure controllers 14 each incorporating a booster pump to supply the coolant to the mold 2 are provided, especially on the side of a plurality of supply lines 9A, in the coolant line for cooling the mold 2. The coolant cooled to the required temperature is forcibly supplied to the mold to abruptly decrease the temperature of the resin in the cooling step, thereby maintaining the equilibrium state of the heat balance of the mold 2 in the respective cycles, ranging from the molding temperature to the removing temperature in continuous molding.

The coolant line further incorporates a cooling unit 10 for cooling the coolant to a required temperature, e.g., 10° C., another temperature controller 6 for heating the cooled coolant, thereby performing precise temperature-control of the coolant to a predetermined temperature, and flow rate measuring units 13 corresponding to a plurality of coolant return lines 9B from the mold 2 to measure the flow rates of the coolant in the coolant return lines 9B in the real-time manner. With the above arrangement, the supply pressure controllers 14 are controlled in accordance with the measurement result of the flow rate measuring units 13. The cooling unit 10 employs, e.g., a scheme with which a pump is driven based on a detection signal sent from the incorporated temperature sensor, so that a compressed coolant gas is supplied to the heat exchanger, thereby cooling the coolant.

When the temperature of the mold 2 becomes abnormally high, the coolant supply pressure is controlled to change the flow rate at at least portions where the temperature is higher than a predetermined value, thereby restoring the temperature of the mold 2 to a normal level.

Figure 22:
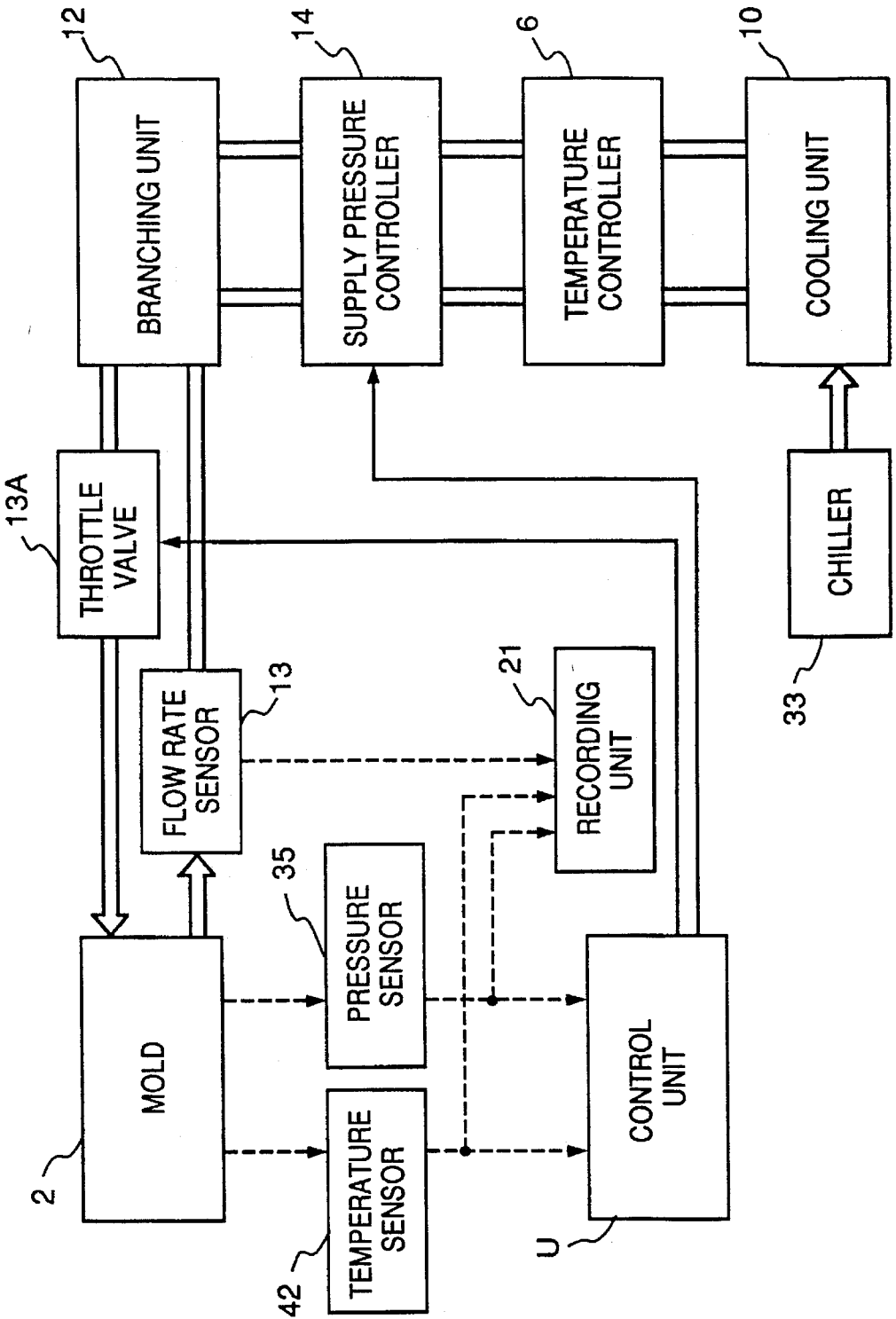
FIG. 22 is a block diagram showing another practical embodiment of the control form of the molding method.

The coolant line is branched into supply lines 9A and 9B so that the coolant line communicates with the mold 2 through the lines 9A and 9B on the way to and from the mold 2. The branching unit 12 is incorporated midway along the supply lines 9A and 9B to correspond to the respective branching lines in the mold 2. The pressure of the coolant in the branching lines to be supplied to the branching unit 12 is controlled by the supply pressure controllers 14. The measurement results of the flow rate measuring units 13 are sent to a control unit U (see FIG. 22) which is controlled by, e.g., a computer. The control unit U outputs a drive signal to the supply pressure controllers 14 in accordance with the measurement results of a mold temperature measuring unit 42 provided in the mold 2 and of the flow rate measuring units 13.

Throttle valves 13A are provided in the supply lines extending from the branching unit 12 to the mold 2. Opening degree control signals for the throttle valves 13A are output from the flow rate measuring units 13 directly, or through the control unit U, together with the measurement result of the mold temperature measuring unit 42.

With the above arrangement, when an abnormality occurs in the temperature of the mold 2, the supply amount of the coolant is decreased to appropriately change the flow rate at at least a portion where a temperature abnormality occurs, thereby restoring the temperature of the mold 2 to the normal level.

In this manner, since the cooling water is cooled by the cooling unit 10 to, e.g., about 10° C., even if the temperature of the factory water varies within a normal range of 25°±3° C., appropriate temperature control can be easily performed by the temperature controllers 6 connected to the cooling unit 10. Since the supply pressure controllers 14 are further provided, even if the pressure loss in the flow line exceeds 3 to 4 kg/cm$^2$, a maximum discharge amount of, e.g., 60 to 80 (l/min.) can be maintained, thereby increasing the heat exchange efficiency in the mold 2.

Figure 14A:
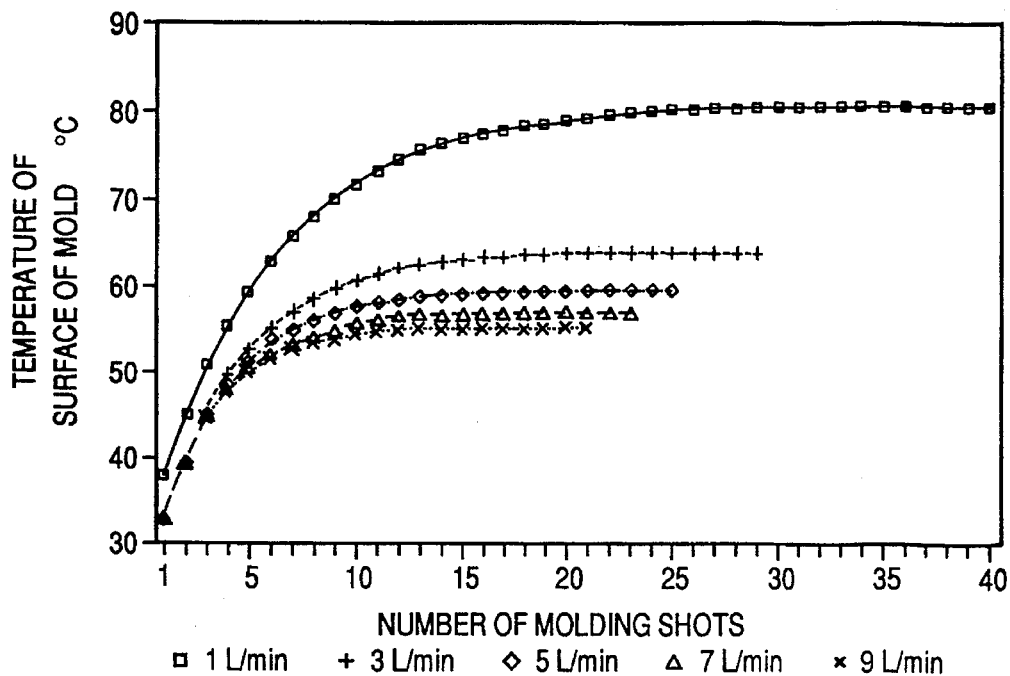
FIGS. 14A and 14B are graphs showing the correlation between the flow rate of the cooling water, the mold temperature during molding, and a change in temperature of the molded article.
Figure 14B:
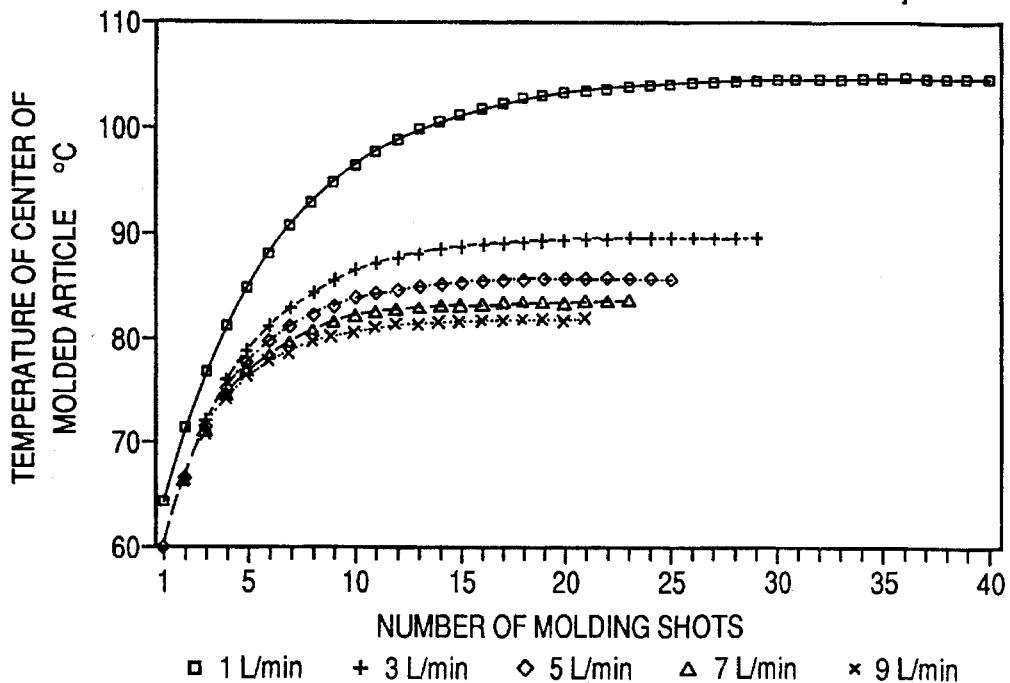

FIGS. 14A and 14B show the correlation between the flow rate of the cooling water, the mold temperature during molding, and the temperature of the molded article from the initial stage of the molding cycle with respect to the number of molding shots. Referring to FIGS. 14A and 14B, it is obvious that the larger the amount of the cooling water, the faster the convergence of the change in the mold temperature to a predetermined pattern in continuous molding.

Figure 15A:
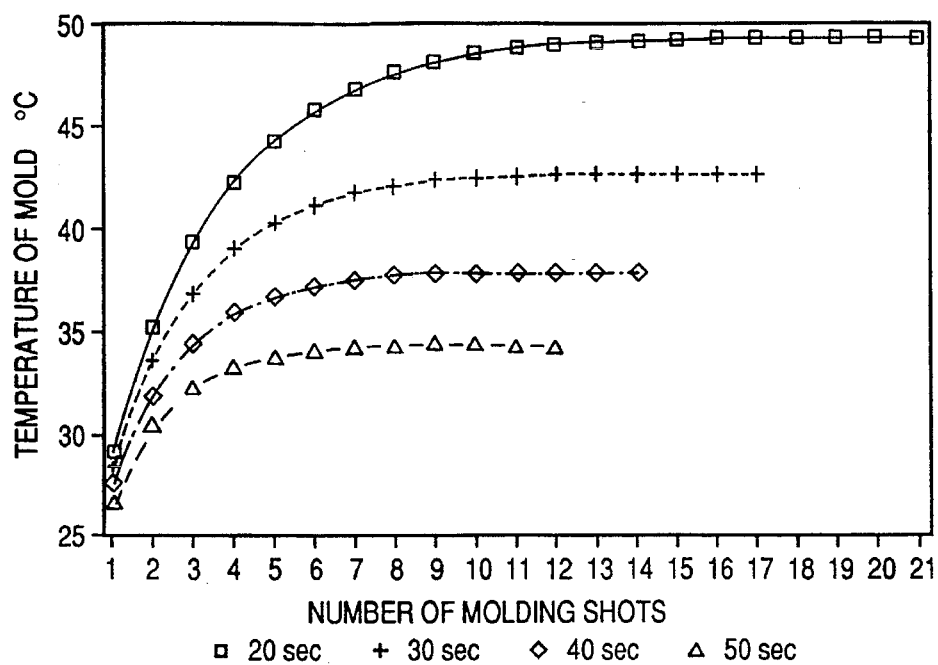
FIGS. 15A and 15B are graphs showing the correlation between the cooling time, the mold temperature after molding, and the temperature of the molded article.
Figure 15B:
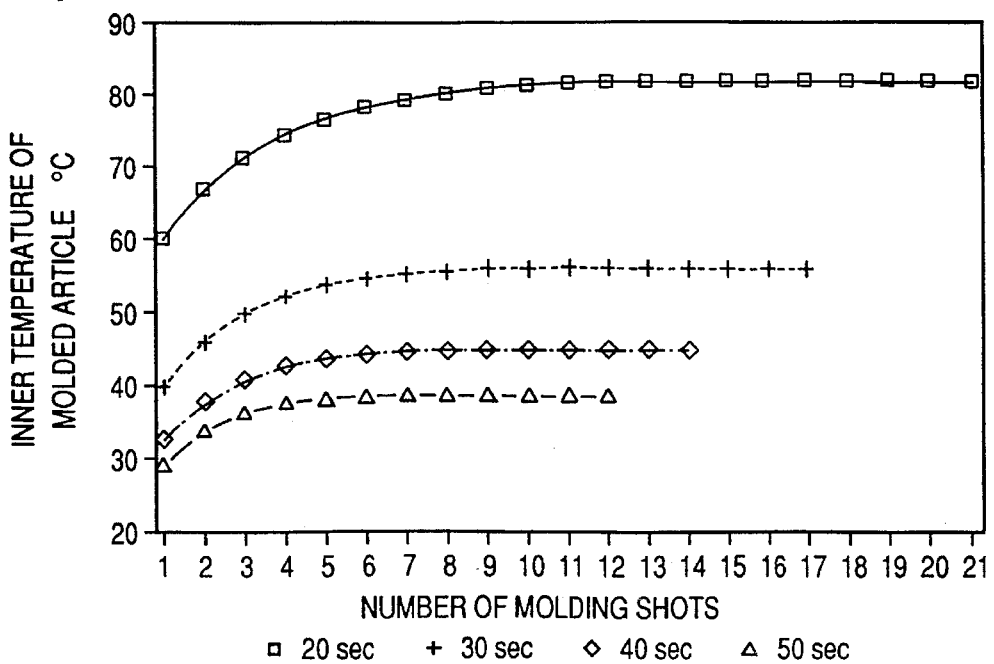

More specifically, the larger the amount of the cooling water, the smaller the number of molding shots required until the heat balance of the mold in the respective cycles, ranging from the molding temperature to the removing temperature in continuous molding, reaches an equilibrium. However, when compared to the supply of the cooling water in the conventional molding system, the number of molding shots becomes considerably large as the temperature of the cooling water is low. This can be understood from the correlation between the cooling time, the mold temperature, and the temperature of the molded article shown in FIGS. 15A and 15B. However, since the gradient of the temperature drop of the resin in the cooling step becomes steep, the cooling time that largely occupies the molding cycle can be shortened to, e.g., about ½ to ⅓ in the entire cycle. This can be understood from the fact that as the flow rate of the cooling water is increased, the equilibrium values of the mold temperature and the temperature within the molded article are decreased, as is apparent from FIGS. 15A and 15B.

The above control unit receives a temperature measurement signal from the mold temperature measuring unit 42 described above and a measurement signal of a resin filling pressure from a pressure sensor (not shown in FIG. 1) both provided within the mold 2. These measurement results are recorded by a recording unit 21, e.g., an analyzing recorder, in the real-time manner.

Figure 3:
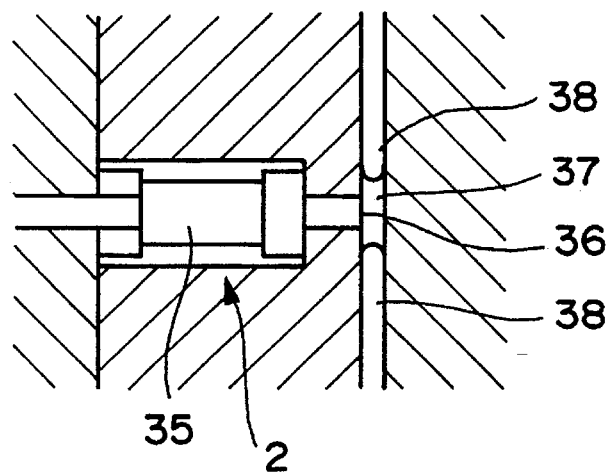
FIG. 3 is a sectional view showing a mounted state of a pressure sensor 35.
Figure 4:
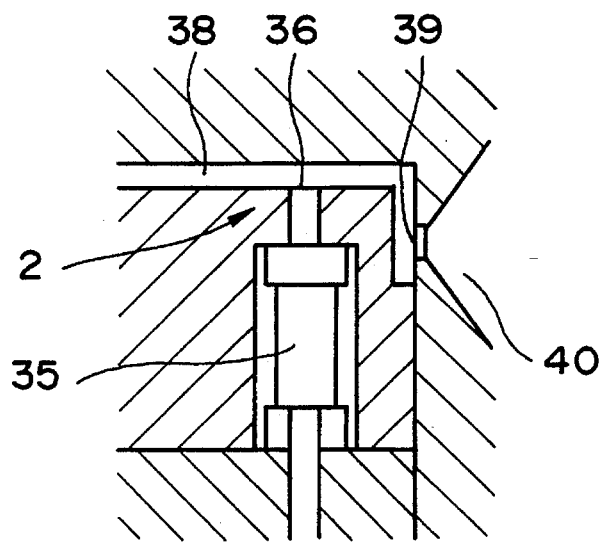
FIG. 4 is a sectional view showing another mounted state of the pressure sensor 35.
Figure 5:
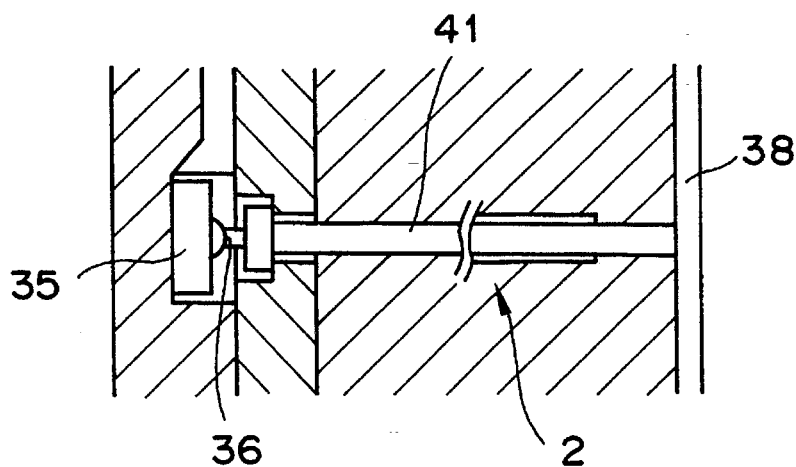
FIG. 5 is a sectional view showing still another mounted state of the pressure sensor 35.

In this embodiment, as shown in FIGS. 3 to 5, a pressure sensor 35 in the mold 2 is effectively installed. More specifically, in the embodiment of FIG. 3, a pressure-receiving surface 36 of a pressure sensor 35 opposes a welded portion 37 in a mold 2 into which a resin is supplied. In the embodiment shown in FIG. 4, a pressure-receiving surface 36 of a pressure sensor 35 opposes a portion of a mold 2, close to a gate 39 and a hot runner 40, to which a resin is supplied. In the embodiment shown in FIG. 5, a pressure-receiving surface 36 of a pressure sensor 35 is abutted against the outer end of an ejector pin 41 which is arranged to oppose the cavity of a mold 2 to eject a molded article.

These embodiments are made such that the resin pressure can be measured directly as much as possible. The position of the pressure sensor is not limited to those in these embodiments. If pressure sensors are provided at a plurality of locations (measurement points), it is more effective in improving measurement precision and in confirming the local pressure distribution.

Figure 6:
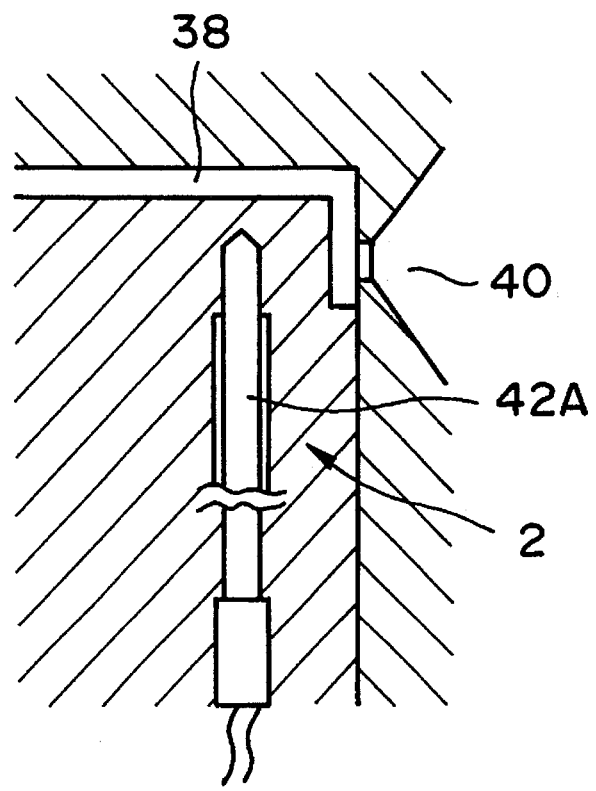
FIG. 6 is a sectional view showing a mounted state of a temperature measurement unit 42A.
Figure 7:
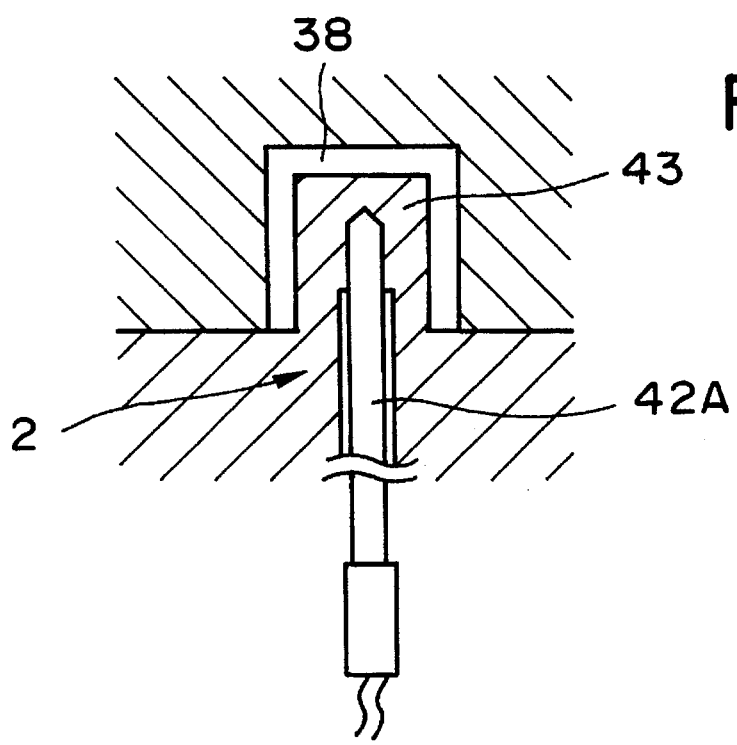
FIG. 7 is a sectional view showing another mounted state of the temperature measurement unit 42A.

The mold temperature measuring unit 42 (temperature sensor) in the mold 2 may effectively be provided as shown in FIGS. 6 and 7. More specifically, a sensing portion 42A of the mold temperature measuring unit 42 is set to oppose a resin supply portion close to the hot runner 40, or particularly a heat accumulating portion 43 (this preferably has a projecting shape so that it can have a large resin contact surface with a small volume) formed in the mold 2.

With this arrangement, the measurement results of the pressure sensor 35 and the mold temperature measuring unit 42 provided at the necessary portions of the mold 2 are recorded by the recording unit 21 in the real-time manner and supplied to the control unit U, as described above. The control unit U analyzes an abnormal value and outputs a signal from the analysis result to adjust the flow rate of the coolant in the above coolant pipe, so that, for example, heat-uniforming control is performed during mold cooling.

In the mold temperature measuring unit 42, even if no abnormality is detected, when the pressure in the mold 2 is abnormally increased, a control signal is sent from the control unit U to the supply pressure controllers 14 to control the mold temperature in accordance with flow rate control, thereby controlling the flowing state of the resin at at least a portion where a pressure abnormality occurs. The throttle valves 13A are also controlled in the same manner.

Figure 16A:
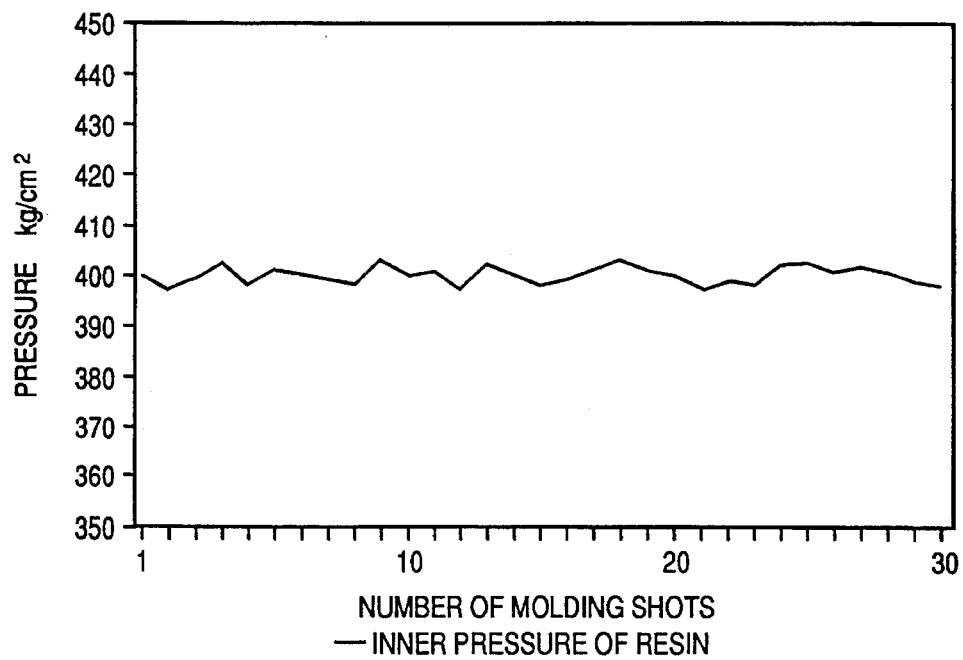
FIGS. 16A and 16B are graphs showing the relationship (normal) between the pressure of the resin in the mold and a change in size of the molded article during continuous molding.
Figure 16B:
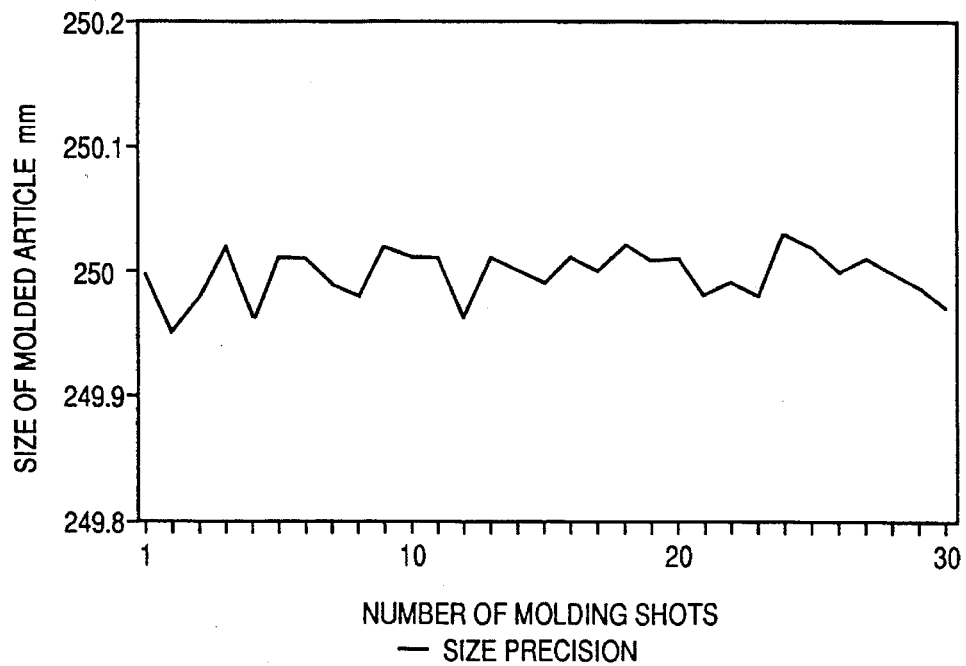
Figure 17A:
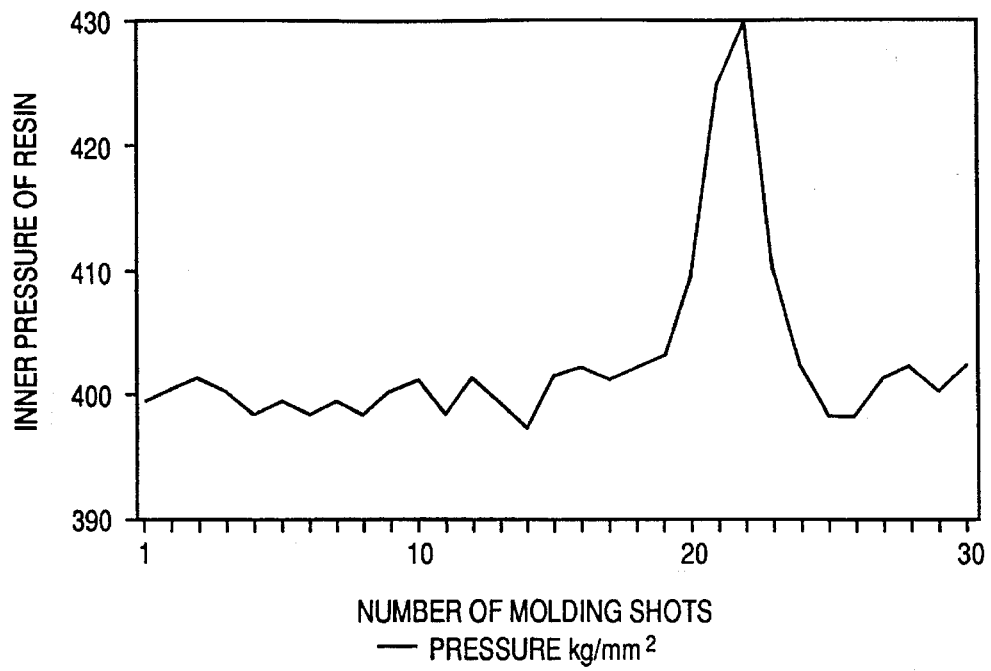
FIGS. 17A and 17B are graphs showing the relationship (abnormal) between the pressure of the resin in the mold and a change in size of the molded article during continuous molding.
Figure 17B:
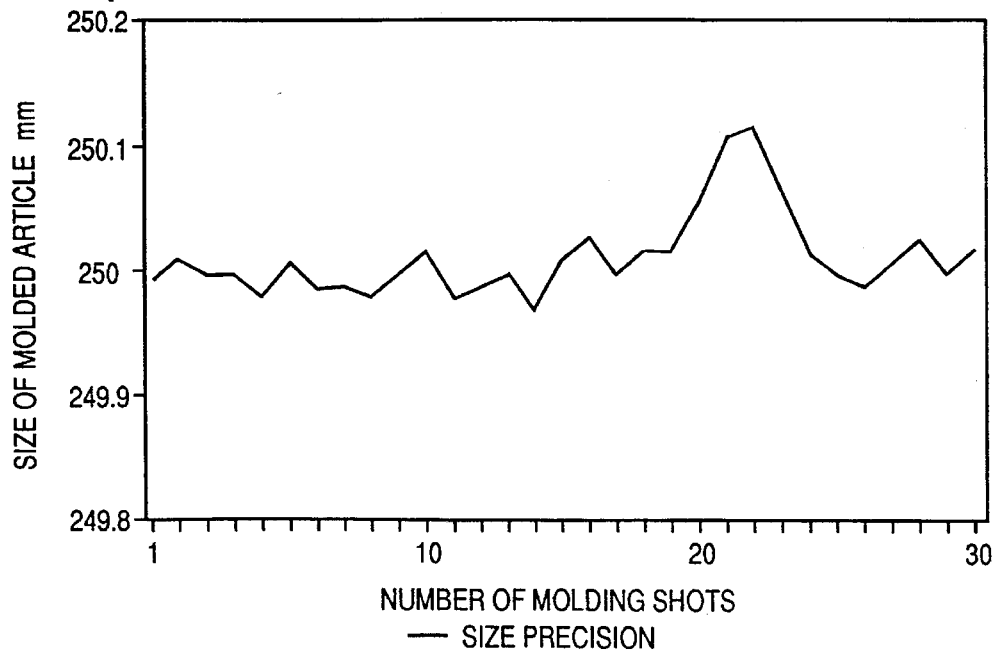
Figure 18A:
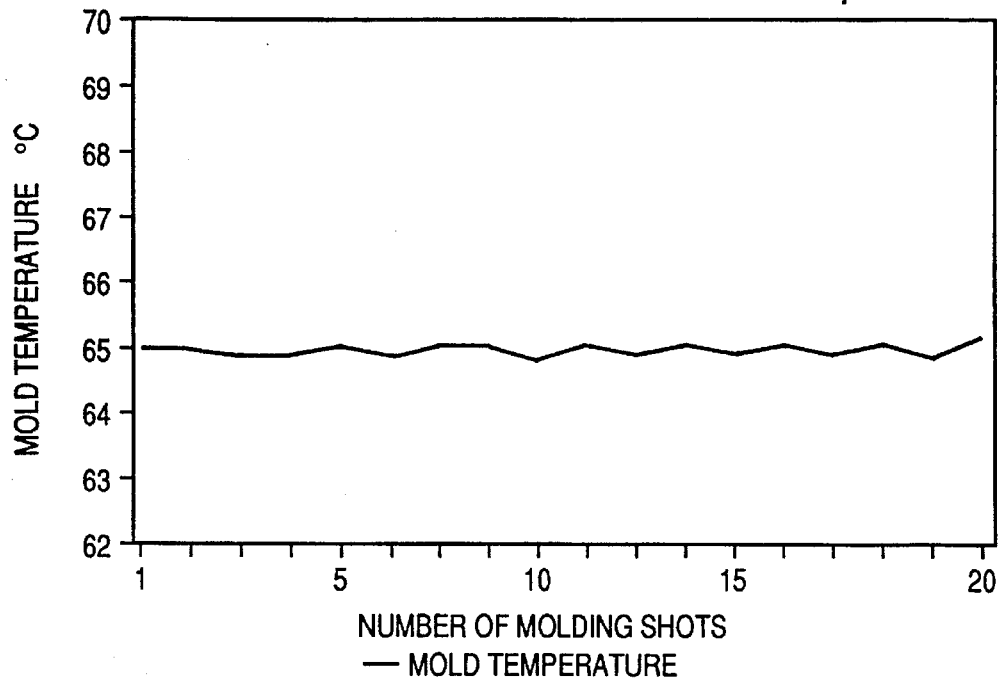
FIGS. 18A and 18B are graphs showing the relationship (normal) between the temperature of the resin in the mold and a change in size of the molded article during continuous molding.
Figure 18B:
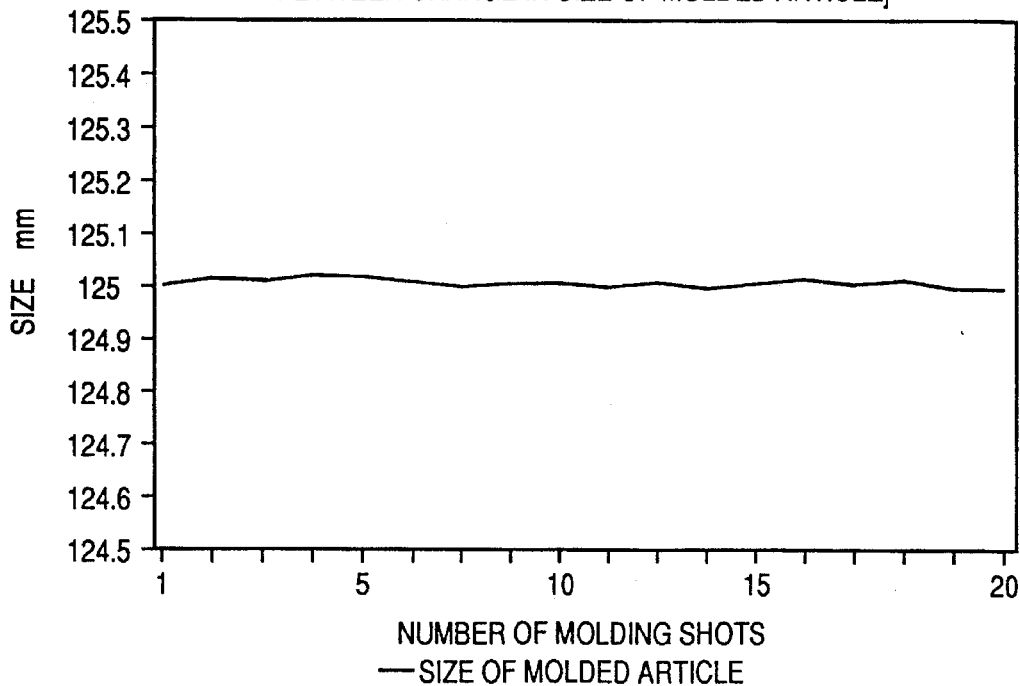
Figure 19A:
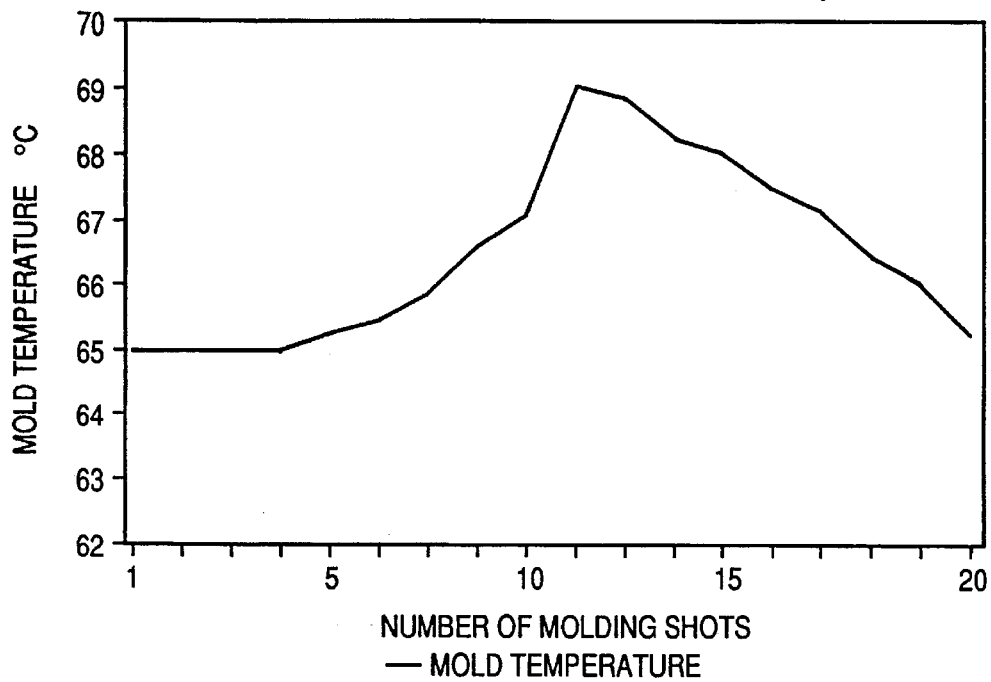
FIGS. 19A and 19B are graphs showing the relationship (abnormal) between the temperature of the resin in the mold and a change in size of the molded article during continuous molding.
Figure 19B:
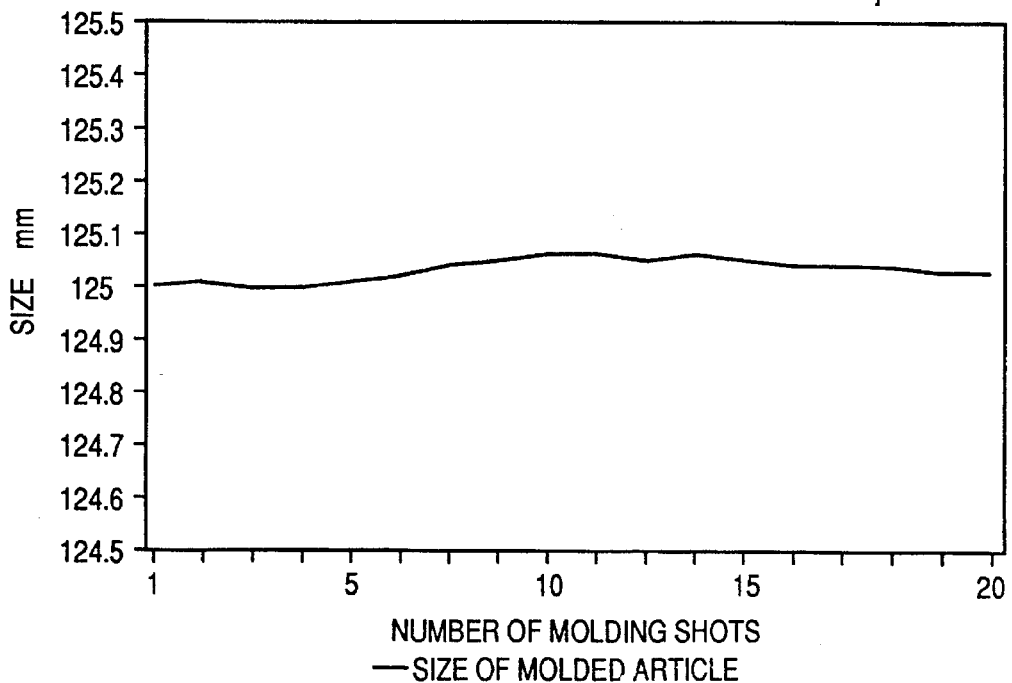

The control unit U can determine whether the molded article is not-defective or defective based on the measurement results from the pressure sensor 35 and mold temperature measuring unit 42 in the cooling process after injection molding, or from injection molding to the cooling process. In fact, according to the present invention, the correlation between the resin pressure in the mold and the size precision of the molded article in continuous molding is clarified by providing the pressure sensor 35 as described above, as shown in FIGS. 16A and 16B (both showing a normal state) and FIGS. 17A and 17B (both showing an abnormal state). Also, the correlation between a change in temperature in the molded article and size precision of the molded article in continuous molding is also clarified by providing the mold temperature measuring unit 42 as described above, as shown in FIGS. 18A and 18B (both showing a normal state) and FIGS. 19A and 19B (both showing a abnormal state).

The control unit U monitors information sent from the recording unit 21 that records an output signal from the pressure sensor 35 and an output signal from the mold temperature measuring unit 42. When it detects an abnormality in resin injection or in the cooling process from an output waveform, the control unit U outputs an alarm signal through an appropriate alarming unit. More specifically, for example, a rotary lamp (not shown) provided to the injection molding apparatus is rotated by this alarm signal, thereby informing the operator of an abnormality. Also, the control unit U can send control signals to the automatic molded article removing means 5, the injection molding apparatus 1, and the like (see FIG. 23).

The automatic molded article removing means 5 for automatically removing a molded article from the mold 2 can selectively convey only non-defective articles to the conveyor 7 serving as the molded article unloading line and defective articles to a predetermined defective article recovering section, based on the determination of the control unit U regarding the non-defectiveness/defectiveness of the molded article, as in a case wherein the mold temperature, the resin viscosity, the filling pressure, and the like are changed and the resin pressure in the mold varies exceeding a reference value.

The control unit U causes the recording unit 21 to record mold temperature information sent from the mold temperature measuring unit 42 to a temperature controller 23 through an amplifier 20, and resin pressure information sent from the pressure sensor 35 to a pressure controller 22 through an amplifier 19, and supplies a control signal to a controller 24 that controls the automatic molded article removing means 5.

Figure 8A:
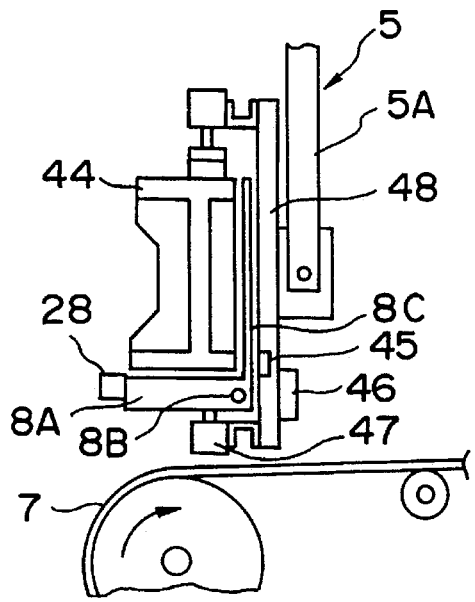
FIGS. 8A to 8C are side views showing an operating state of an automatic molded article removing means on a conveyor.
Figure 8B:
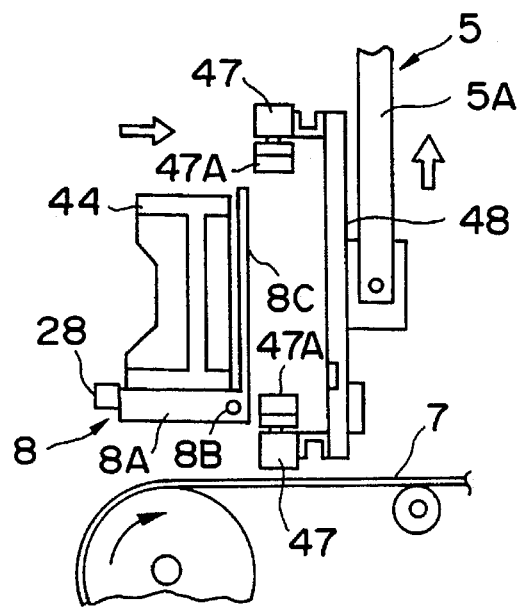
Figure 8C:
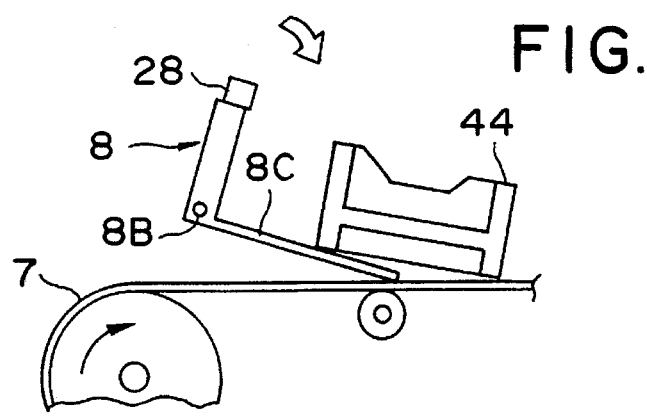

In this embodiment, as shown in FIGS. 8A to 8C, the automatic molded article removing means 5 has an autohand 5A comprising a holding means 48, e.g., a chuck, for vertically holding a molded article in the mold 2. The molded article unloading line is provided with a transfer means 8. The molded article sent from the holding means 48 is placed on and received by the transfer means 8 as it is vertically held. The transfer means 8 transfers the molded article onto the unloading line. The holding means 48 has upper and lower chucking air cylinders 47 respectively having holding portions 47A. The holding means 48 holds a molded article 44 in the mold 2, removes it, and conveys it onto the transfer means 8 on the conveyor 7 in the same posture.

In this embodiment, the holding means 48 has a chuck confirming sensor 45. For example, when the chuck confirming sensor 45 detects that the chucking force becomes abnormal, or when an abnormality in the amount of deformation of the molded article caused by the abnormal chucking force is detected by the chuck confirming sensor 45, the automatic molded article removing means 5 is controlled to control the chucking force or to cause hop-up of the defective articles. For this purpose, the holding means 48 has an adjusting means 46 for adjusting the chucking force of the holding portions 47A in accordance with, e.g., a signal sent from the controller 24. The chucking force adjusting means 46 uses a reducing valve and a flow regulator. The chucking force is regulated based on the temperature and strength of the molded article to be chucked upon removal.

Figure 20A:
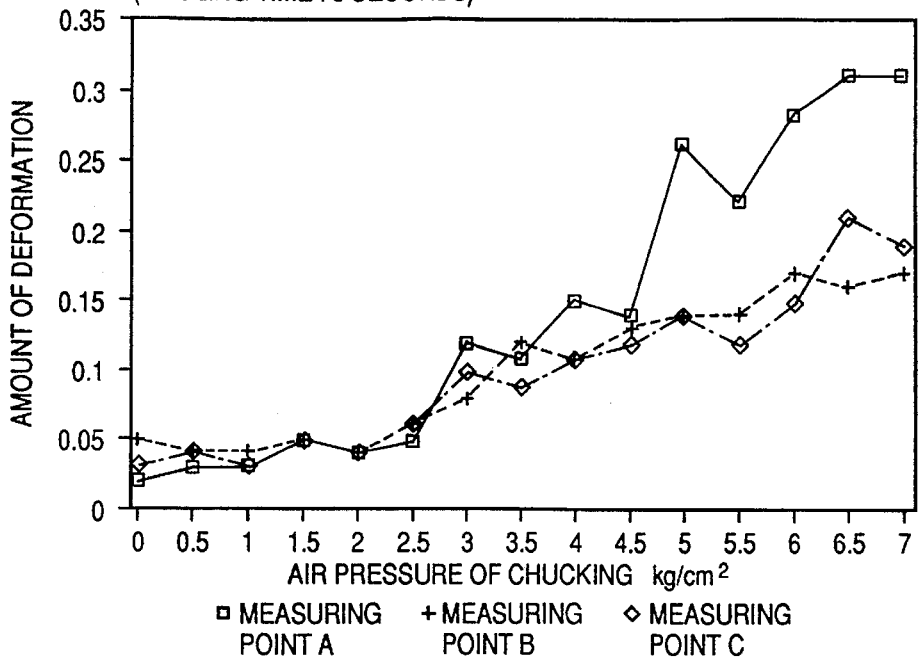
FIGS. 20A and 20B are graphs showing the relationship between the chucking force of the automatic molded article removing means and an amount of deformation of the molded article.
Figure 20B:
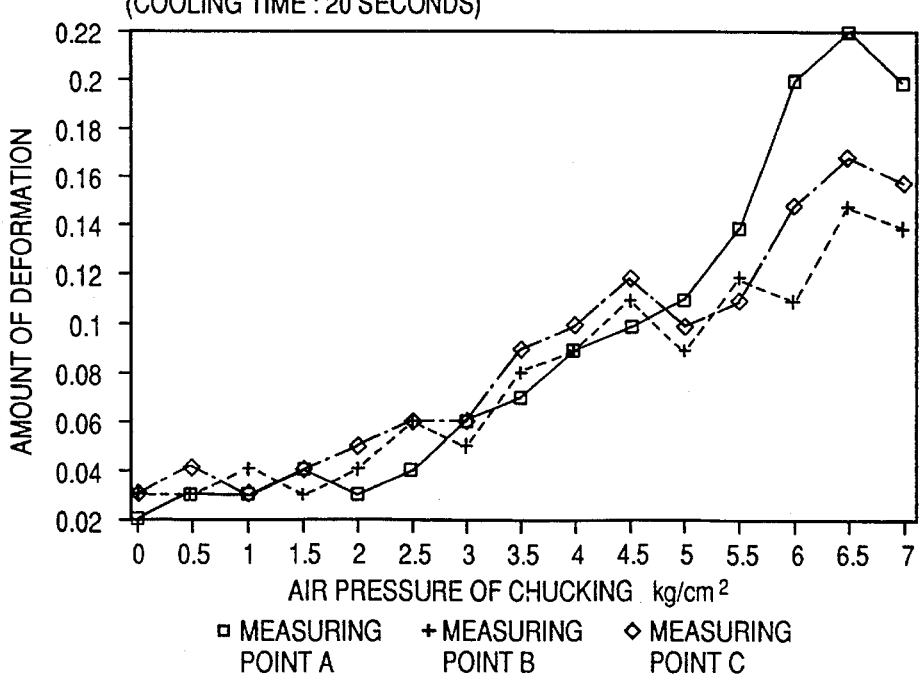

Since the chucking force can be adjusted by considering the cooling degree of the molded article, the molded article will not be deformed during the removing operation with the automatic molded article removing means 5. Especially, since the molded article can be transferred to the transfer means 8 as it is vertically held by the holding portions 47A, the direction of the holding portions 47A need not be changed by 90° to reach a horizontal state, unlike in the conventional apparatus. Since the holding portions 47A do not horizontally hold the molded article with frictional engagement but place the molded article directly on the conveyor 7, the operation time can be shortened. As the adjusting means 46 is employed, the chucking force can be greatly decreased. It is clarified that the pressure of the chucking air cylinders 47 and the amount of deformation of the molded article is related to each other depending on the cooling degree, as shown in FIGS. 20A and 20B.

As shown in FIGS. 8B and 8C, the transfer means 8 has a rest table 8A on which the molded article held by the holding portions 47A is placed, a tilting means (not shown) for pivoting the rest table 8A about a pivot shaft 8B as the center, and a sliding table member 8C on which the molded article 44 slides downward onto the conveyor 7 when the tilting means performs tilting. The transfer means 8 also has a molded article transfer confirming sensor 28, e.g., a contact sensor, on a side of the rest table 8A.

After it is removed by the automatic molded article removing means 5, the molded article is conveyed to the transfer means 8 and transferred onto the rest table 8A. In this case, the automatic molded article removing means 5 moves the molded article, as it is chucked from the mold, to the transfer means 8 without changing the chucking direction. When the molded article is transferred to the rest table 8A, the molded article transfer confirming sensor 28 confirms this and outputs a confirmation signal. The confirmation signal drives a driving means, e.g., the flow regulator, with a controller or the like provided to the transfer means 8 while the automatic molded article removing means 5 is retracted, thereby changing the posture of the transfer means 8. Then, the molded article is conveyed onto the conveyor 7.

As shown in FIG. 1, the conveyor 7 as the molded article unloading line for conveying the molded article has a monitor means including, e.g., a non-contact infrared temperature distribution measuring unit 25 for monitoring the temperatures at several portions of the molded article, a monitor 26, and a controller 27 of the monitor 26. Determination regarding the non-defectiveness/defectiveness of the molded article is performed by this monitor means.

Figure 23:
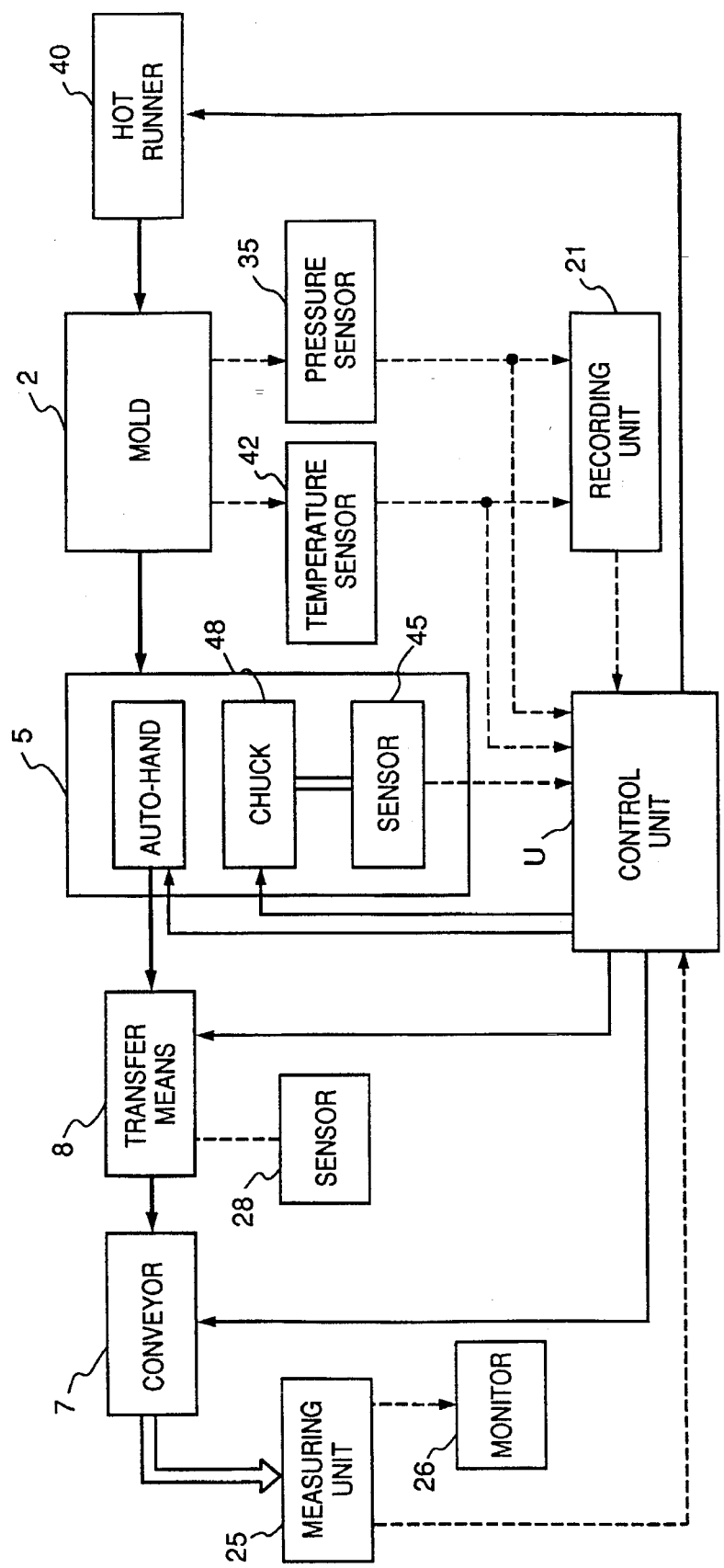
FIG. 23 is a block diagram showing still another practical embodiment of the control form of the molding method.

The monitor means is connected as shown in FIG. 23. The monitor means may perform resin filling control of the injection molding apparatus by a feedback signal or through a control unit U, and may control the flow rate of the coolant in the coolant branching lines by controlling the supply pressure controllers 14 or/and the throttle valves 13A. With this arrangement, formation of a defective molded article can be instantaneously prevented.

Figure 9:
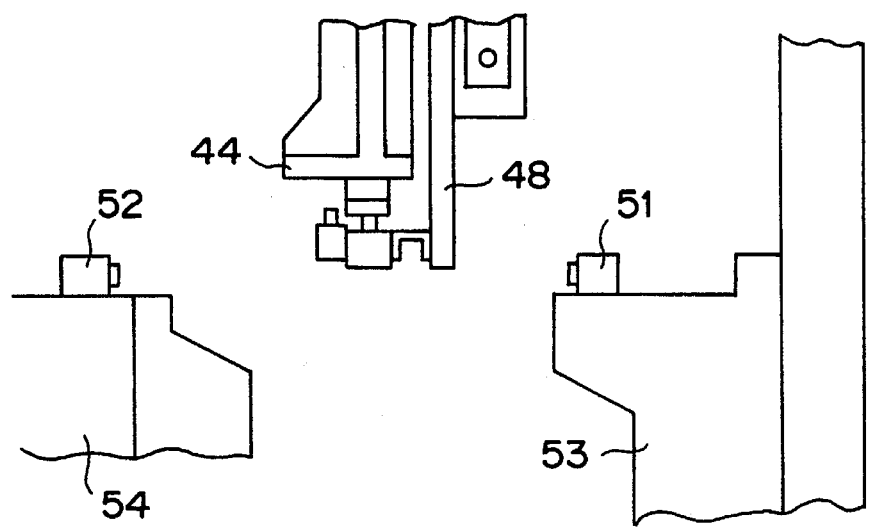
FIG. 9 is a front view showing a removal confirming means of the automatic molded article removing means with respect to a mold.
Figure 10:
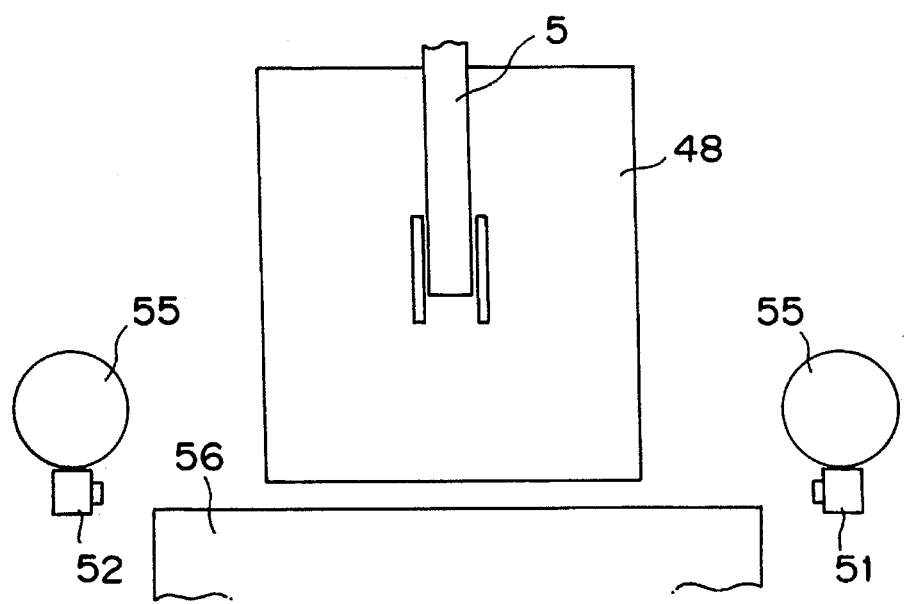
FIG. 10 is a plan view showing another arrangement of the removal confirming means.

As shown in FIG. 9, a stationary die 53 and a movable die 54 respectively have optical sensors, e.g., a light-emitting unit 51 and a light-receiving unit 52 at locations where the chuck 48 of the automatic molded article removing means 5 enters and retracts. Thus, when a molded article is to be removed, a time lag between a molded article removal timing of the automatic molded article removing means 5 and a mold closing operation is avoided, and a mold closing signal is output when the chuck 48 passes the light-emitting unit 51 and the light-receiving unit 52. As shown in FIG. 10, the sensors 51 and 52 may be mounted to die holding bars 55 provided on sides of a platen 56 that holds the mold.

Figure 11:
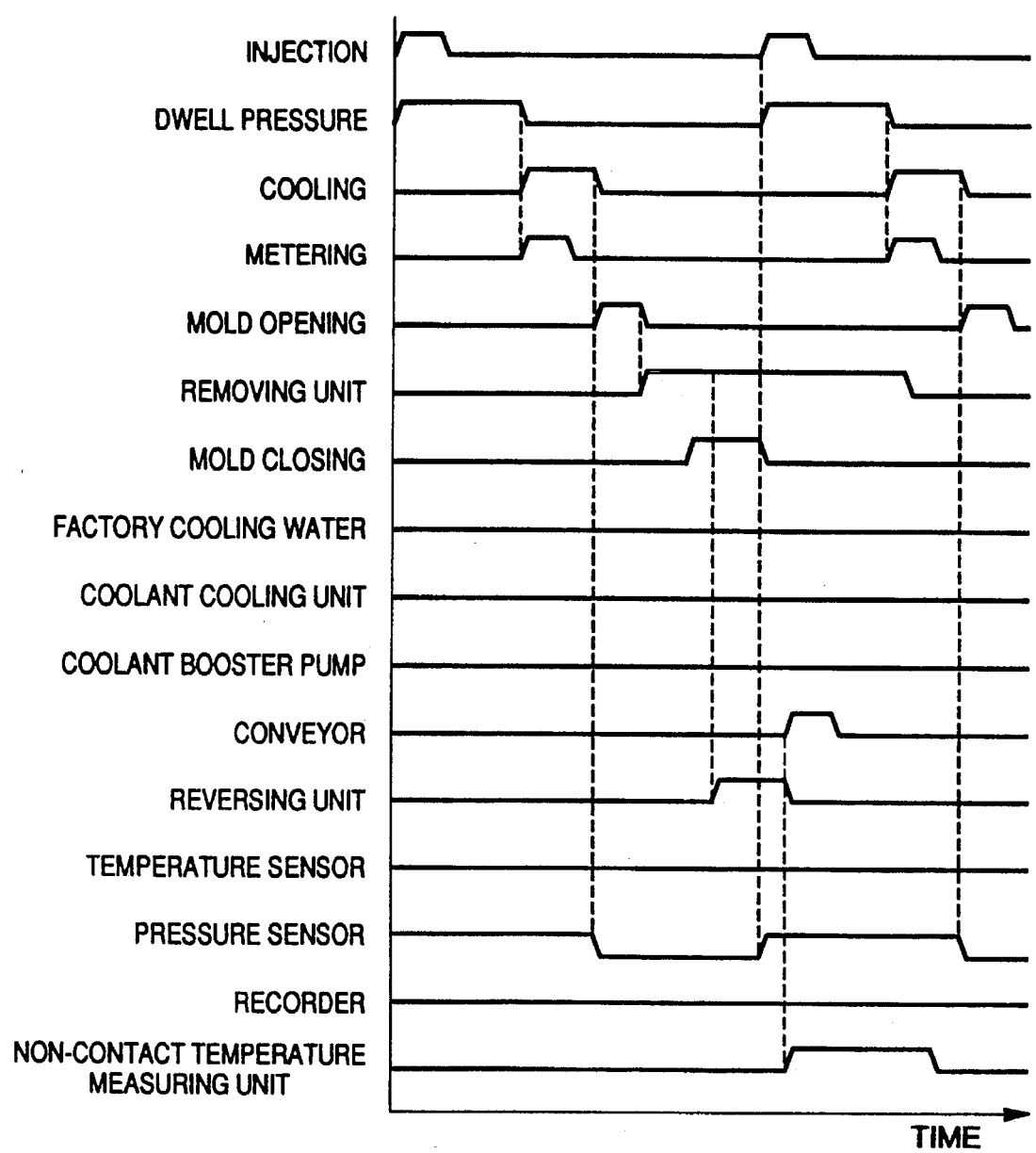
FIG. 11 is a timing chart showing the flow of a molding method.

The operation flow of a molding system according to the present invention will be described in detail with reference to FIG. 11. Resin injection from the plasticizing cylinder 31 to the mold 2 is performed at the beginning of the molding cycle. Simultaneously, the mold 2 is dwelled for mold closing. Thereafter, the interior of the mold 2 is cooled by the coolant. After mold opening, the molded article is removed by the automatic molded article removing means 5, and mold closing is performed. During this period of time, the cooling water as the coolant is cooled to a predetermined temperature by the cooling unit 10 through the pipe lines 9, and is controlled to at a constant temperature by the temperature controllers 6. The cooling water is boosted through the supply pressure controllers 14, and is supplied into the mold 2 through the branching unit 12. Flow rate measurement by the flow rate measuring units 13 is performed in the branching return lines of the coolant, and the opening degree of the throttle valves 13A is adjusted by the feed-back control of the flow rate measurement.

Figure 12:
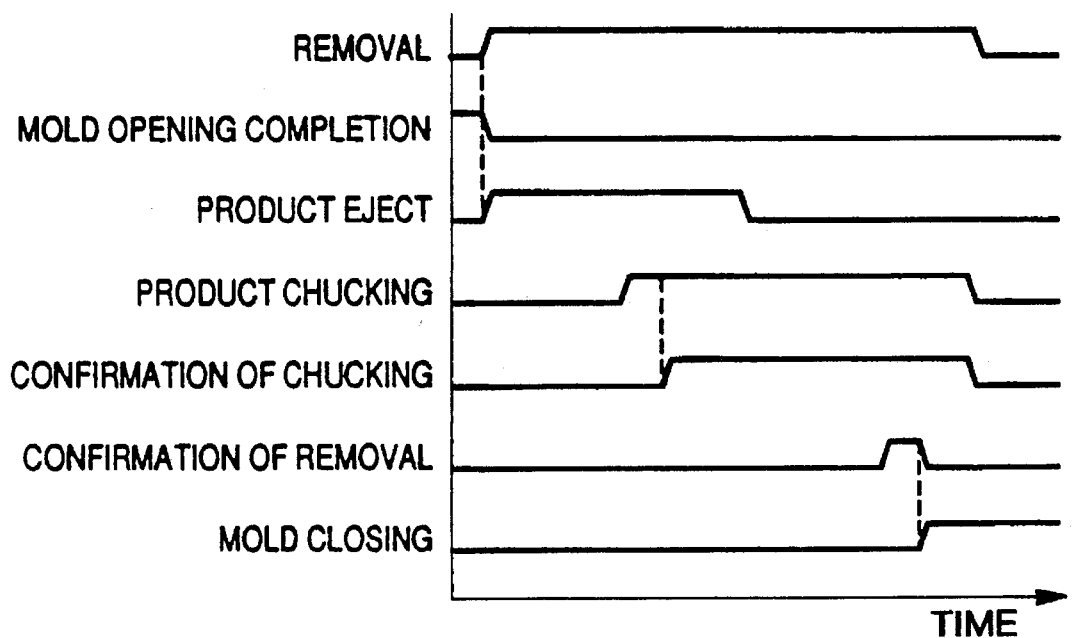
FIG. 12 is a timing chart showing the flow of the removing means.

The mold temperature measuring unit 42 constantly measures the mold temperature and records it in the recording unit 21. The pressure sensor 35 measures the resin pressure at a necessary portion in the mold during the process of from injection of resin to mold opening. The transfer means 8, the conveyor 7, and the like are operated at necessary timings during the operation of the automatic molded article removing means 5. Opening/closing control of the mold concerning the operation of the automatic molded article removing means 5 constitutes its flow as shown in, e.g., FIG. 12. In this case, chucking of the molded article with the chucks 47A is confirmed by the chuck confirming sensor 45, and then the molded article is removed to outside the mold by the automatic molded article removing means 5. Completion of removal to the outside of the mold is confirmed by the optical sensors 51 and 52. Immediately after that, mold closing is performed. For this reason, even if the automatic molded article removing means 5 is retreating from the mold, the mold closing operation is started when the chuck is moved away from the mold opening/closing area, so that the molded article removing time can be made short. This cycle is repeatedly performed to perform a continuous molding operation.

In the above embodiment, the supply pressure controllers 14 and the throttle valves 13A are directly controlled through the control unit by the feedback signal sent from the flow rate measuring units 13. However, when the actual flow rate, measured by the flow rate measuring units 13, of the coolant flowing in the respective branching return lines is deviated from a preset reference value, an alarm may be produced by an appropriate alarming means. In this case, if the flow line clogs or if the flow line is erroneously connected upon stage exchange, an alarm is produced in accordance with a change in flow rate. Thus, an abnormality can be detected instantaneously.

Figure 13:
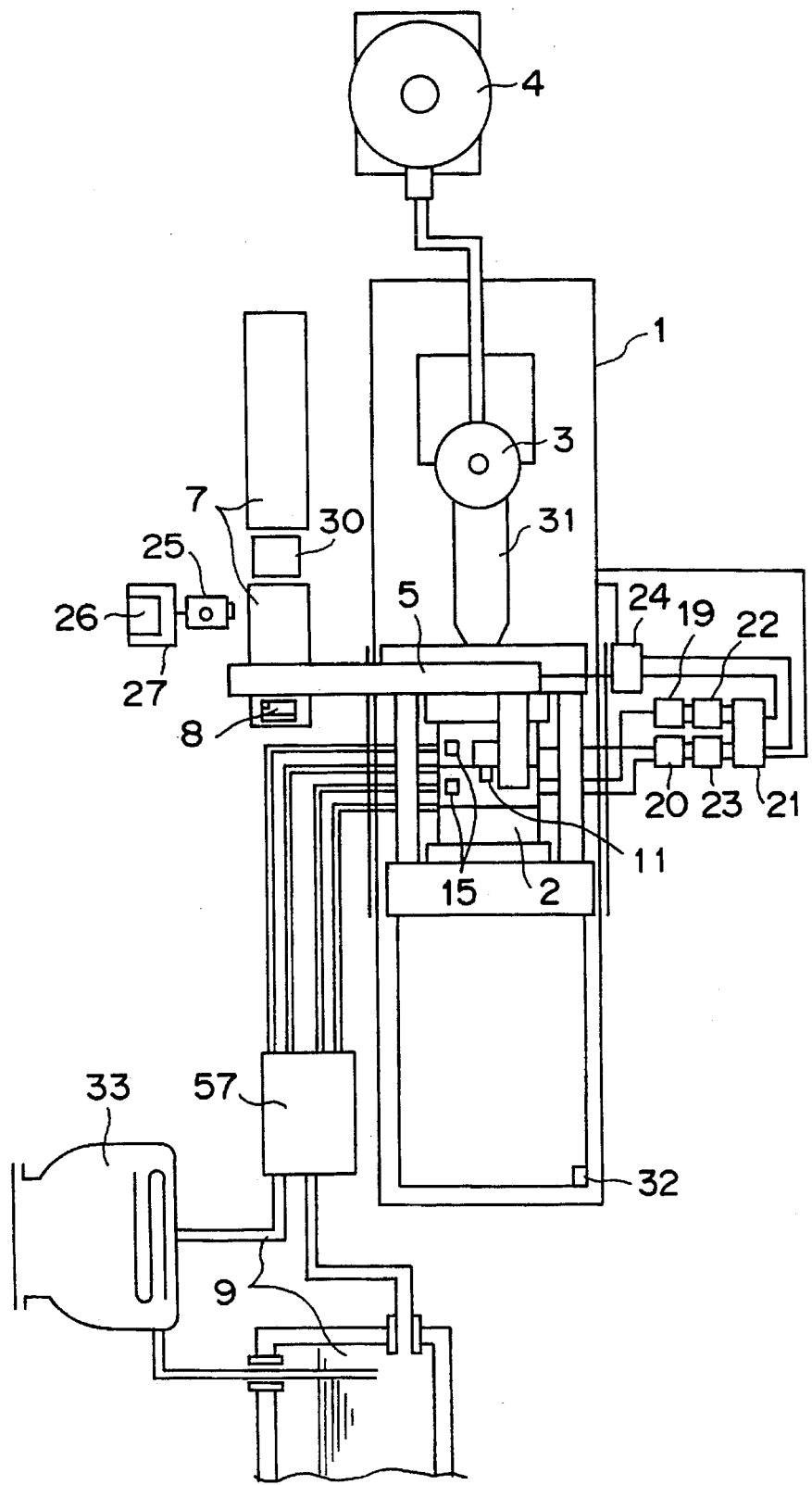
FIG. 13 is a schematic diagram showing another embodiment of the present invention.

FIG. 13 shows another embodiment in which a cooling unit, a temperature controller, a supply pressure controller, a coolant branching unit, a flow rate measuring unit, and the like identical to those shown in FIG. 1 are housed in one unit 57. Except for this, the arrangement of this embodiment is the same as that of FIG. 1.

Figure 21:
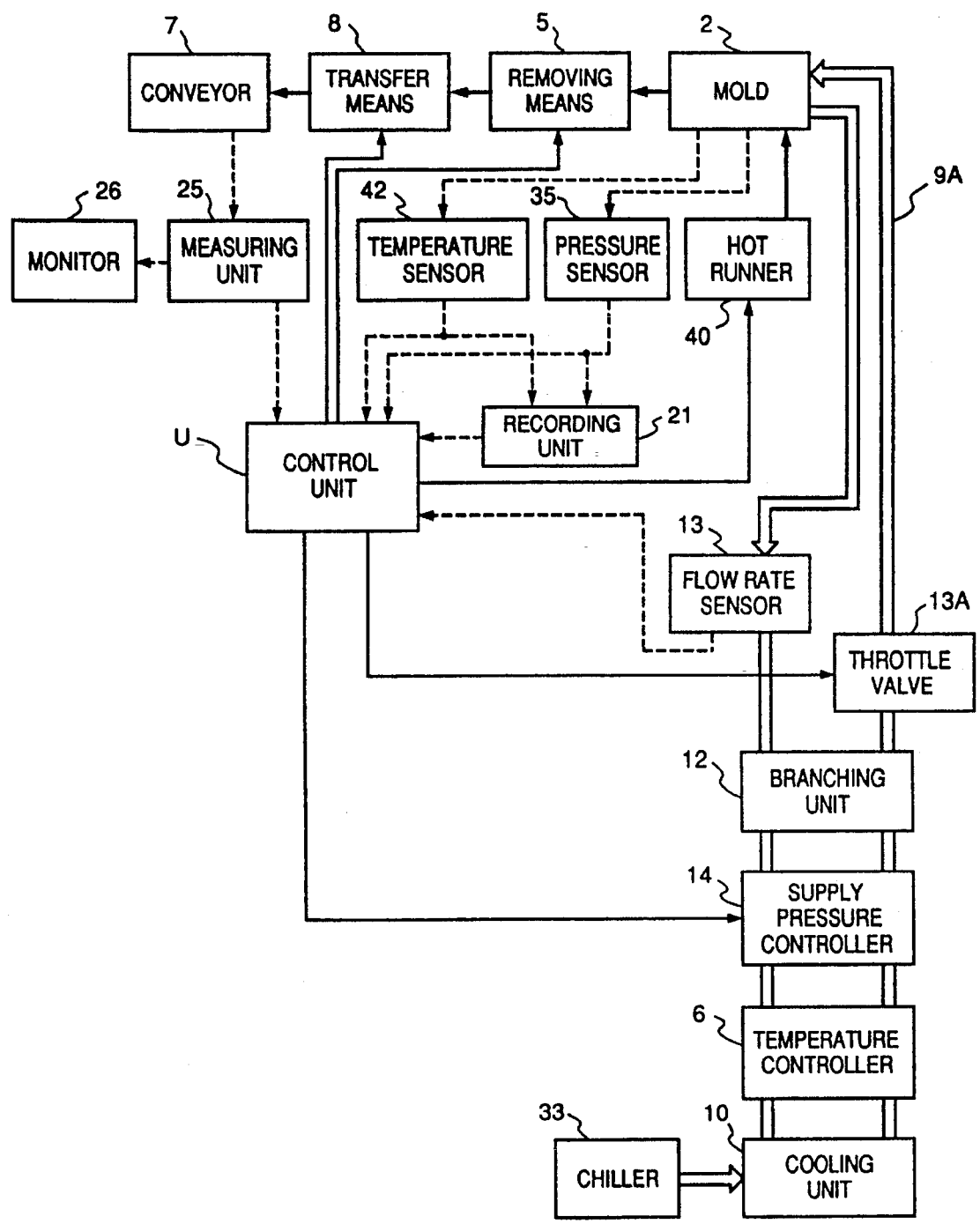
FIG. 21 is a block diagram showing an embodiment of the control form of the molding system.

FIG. 21 is a block diagram showing an example of the concept of control of the plastic molding system according to the present invention when total control is performed by the control unit as the center. The basis of this control follows that of the above embodiment.

FIG. 2 is a table showing a comparison between injection molding performed by using the molding system of the above embodiment and injection molding performed by using the conventional molding system. As is apparent from this table, when the system of the above embodiment is used, required molding can be performed with a cycle reduced to ½ to ⅓ that of the conventional system.

Figure 24:
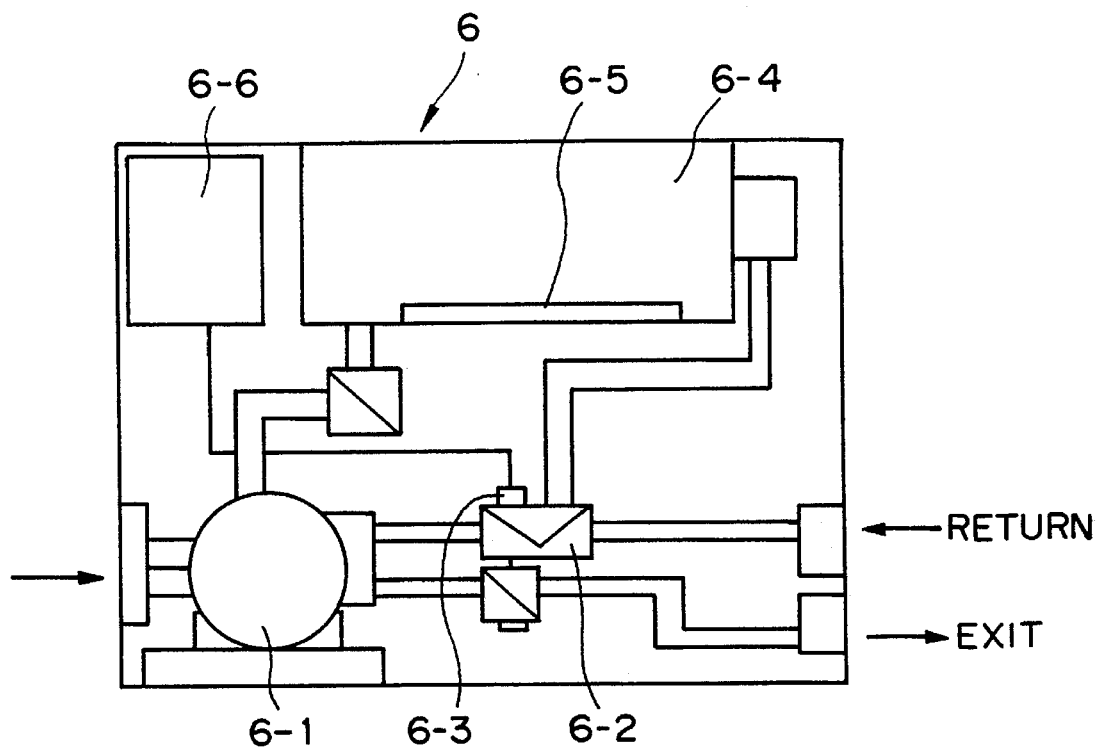
FIG. 24 shows the arrangement of a temperature controller 6.

FIG. 24 is a schematic block diagram of the temperature controller 6. Referring to FIG. 24, the cooling water from the cooling unit 10 is supplied to a pump 6-1 and a tank 6-4, and is sent to the branching unit 12 by the pump 6-1. At this time, an output from a temperature sensor 6-3 is input to the temperature controller 6 in advance and is compared with a preset temperature. When the temperature of the cooling water is low, supply from the cooling unit 10 is stopped through a solenoid valve 6-2, and the water in the tank 6-4 is heated by a heater 6-5. The cooling water in the tank is supplied to the branching unit 12 until the cooling water reaches the preset temperature. When a difference between the preset temperature and the actual temperature becomes about 1° C., the temperature of the heater 6-5 is lowered, and water supply is switched between the cooling water from the cooling unit 10 and the water in the tank by the solenoid valve 6-2. When the cooling water returns from the branching unit 12, the solenoid valve 6-2 is actuated by the temperature of the cooling water, so that the cooling water is supplied to the pump 6-1 and the tank 6-4. In this manner, the cooling water from the cooling unit 10 is heated by the heater 6-5 to supply cooling water having a predetermined temperature to the branching unit 12. Thus, the temperature of the cooling water flowing through a cooling pipe 2-1 is stabilized, thereby stabilizing the mold temperature.

Figure 25:
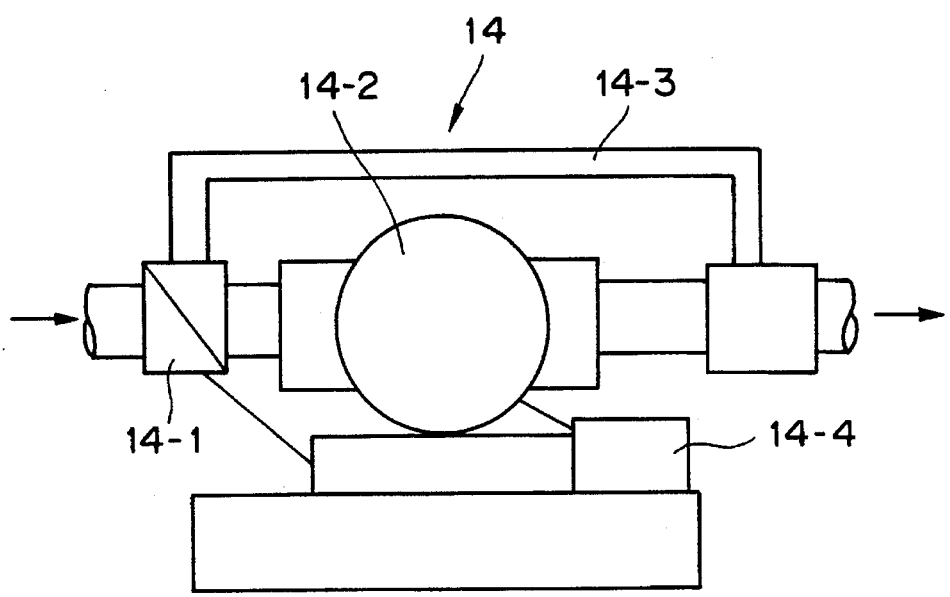
FIG. 25 shows the arrangement of a supply pressure controller 14.

FIG. 25 schematically shows the arrangement of the supply pressure controller 14. As described above, each supply pressure controller 14 is provided between the branching unit 12 and the temperature controller 6. The cooling water sent from the temperature controller 6 is boosted by the operation of a pump 14-2, and is sent to the branching unit 12. For this purpose, a solenoid valve 14-1 is provided at the downstream of the pump 14-2, and a bypass pipe 14-3 is connected to bypass the pump 14-2. Both the solenoid valve 14-1 and the pump 14-2 are connected to a power supply controller 14-4. With this arrangement, when the flow rate measuring unit 13 detects that the supply pressure of the cooling water is excessively high, the solenoid valve 14-1 is opened, and the cooling water is supplied through the bypass pipe 14-3. When the supply pressure is excessively low, the cooling water is boosted by the pump 14-2, and is supplied. The supply pressure of the cooling water is automatically adjusted in the above manner.

Figure 26:
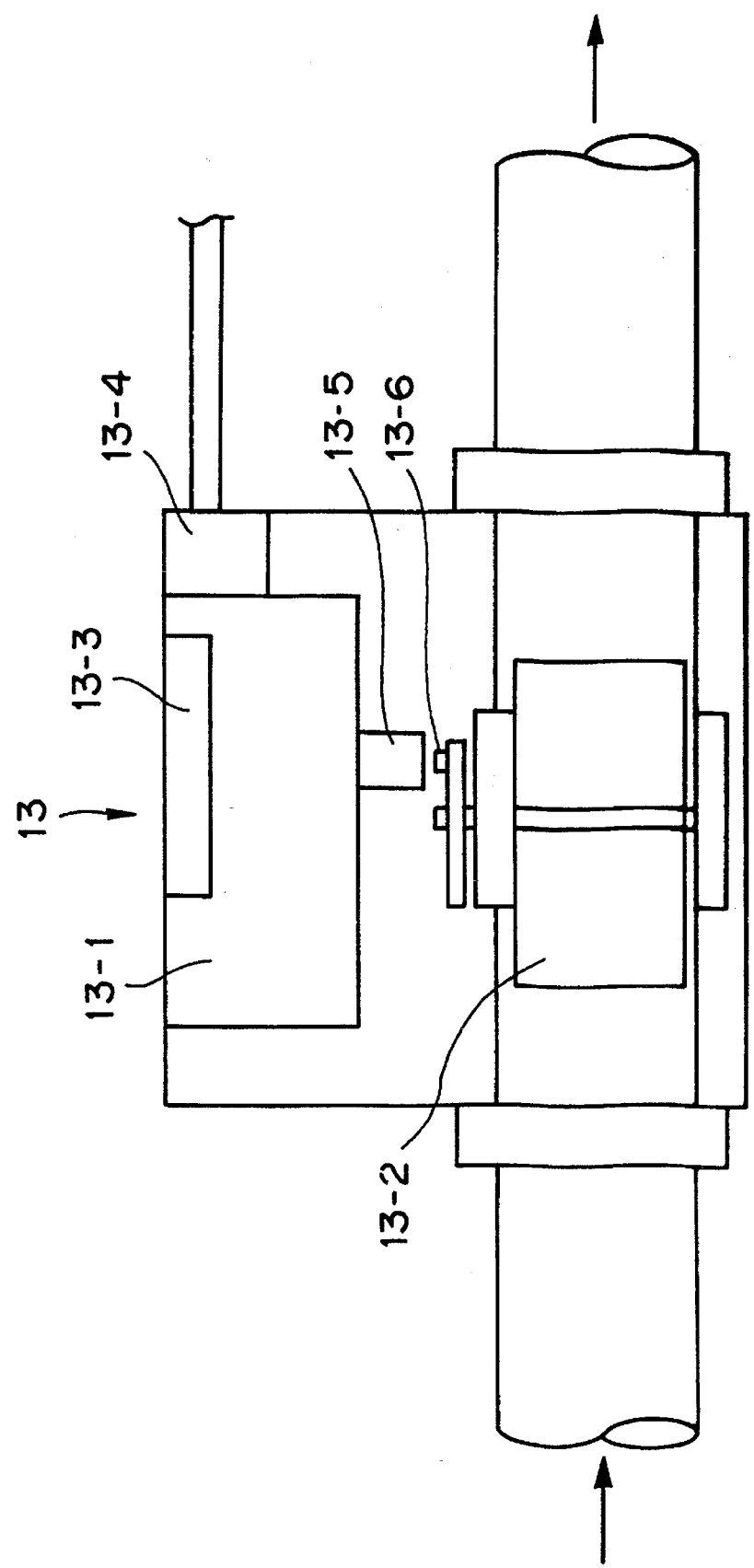
FIG. 26 shows the arrangement of a flow rate measuring unit 13.

FIG. 26 schematically shows the arrangement of the flow rate measuring unit 13. Referring to FIG. 26, a rotating body 13-2 which rotates in accordance with the speed of the cooling water and comprises a magnet 13-6 is rotatably provided midway along the pipe line 9. The movement of the magnet 13-6 is detected by a sensor 13-5 connected to a controller 13-1, is converted into an electric signal, and is displayed on a display 13-3. At the same time, this electric signal is sent to the control unit through an output unit 13-4.

Figure 27:
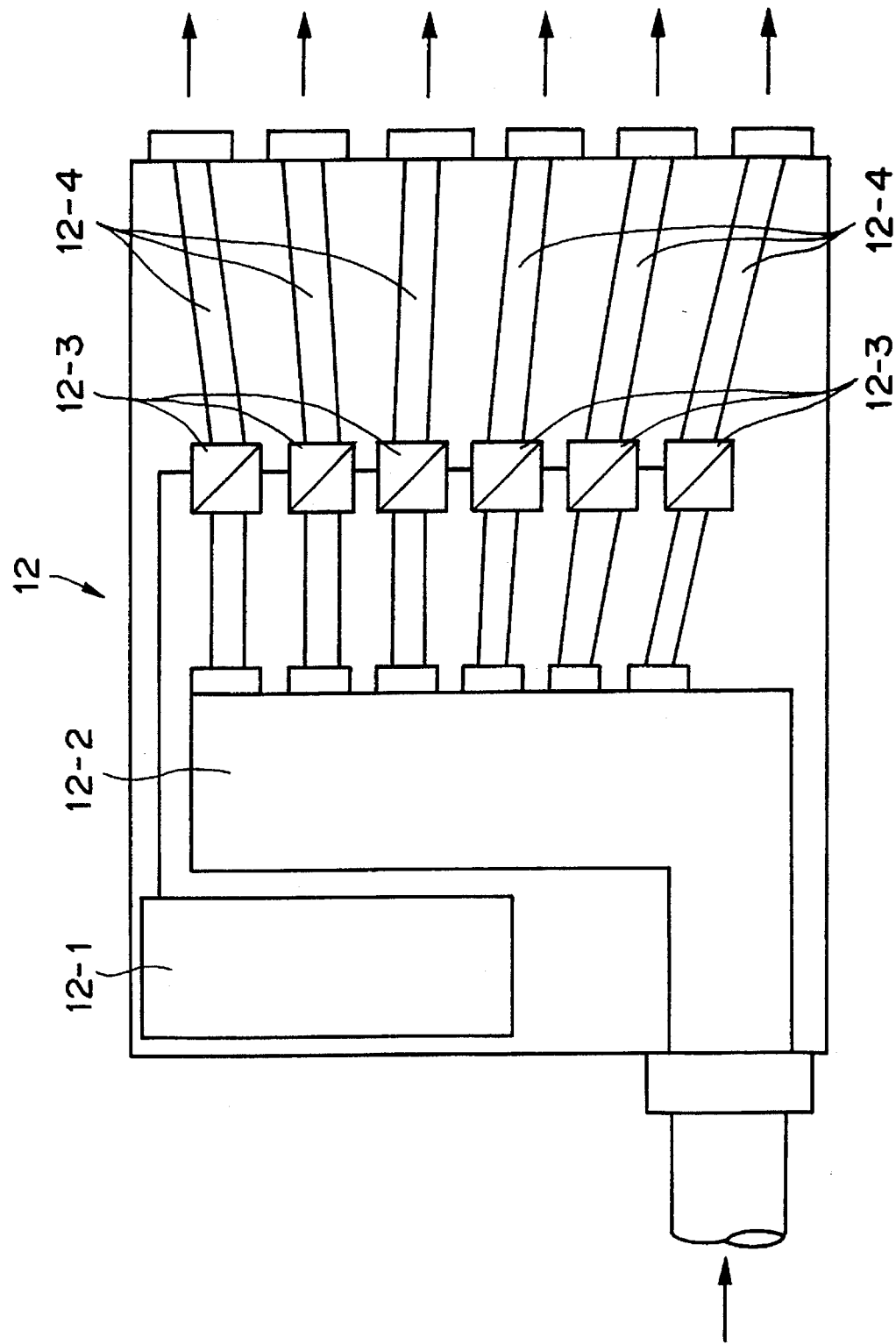
FIG. 27 shows the arrangement of a branching unit 12.

FIG. 27 schematically shows the arrangement of the branching unit 12. Referring to FIG. 27, the cooling water supplied from the supply pressure controllers 14 or the temperature controllers 6 described above is branched into a plurality of pipes by a manifold 12-2. The branched cooling water is then distributed to branching pipes 12-4 communicating with the cooling pipe 2-1 extending in the mold 2. Solenoid valves 12-3 connected to a controller 12-1 are provided between the branching pipes 12-4 and the manifold 12-2 in order to perform arbitrary flow rate control in the respective branching pipes 12-4.

Figure 28:
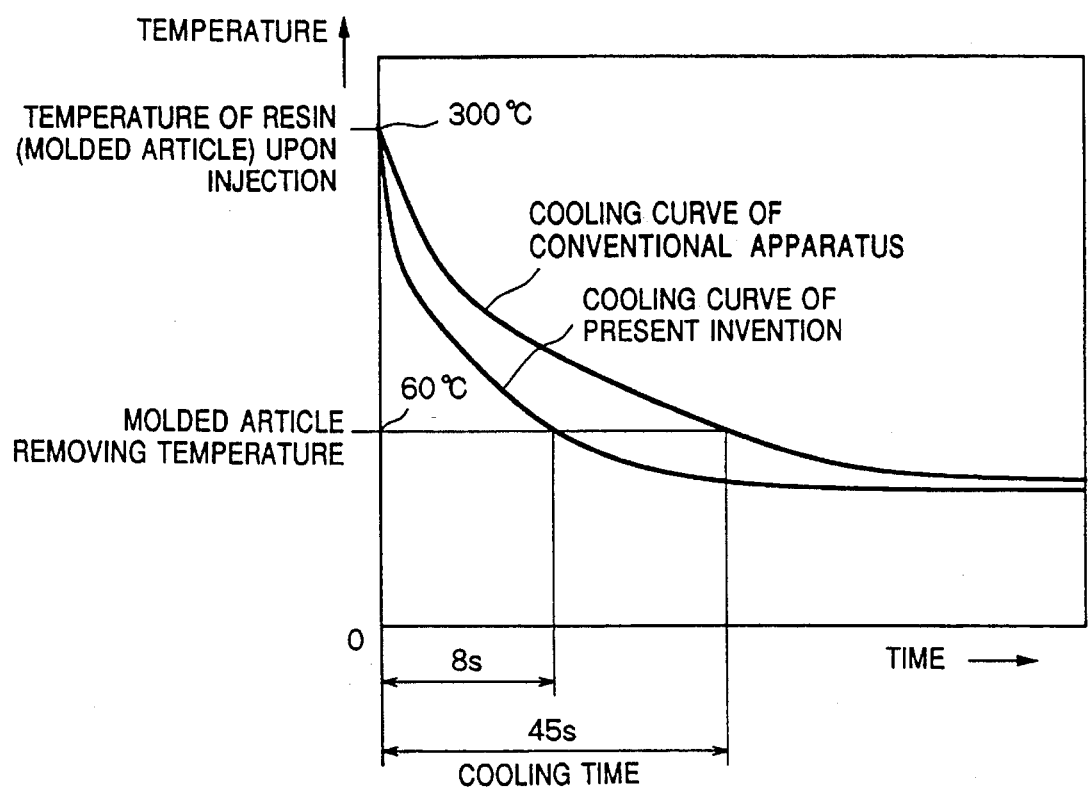
FIG. 28 is a graph showing cooling gradients.

FIG. 28 shows comparison between the cooling curve of this embodiment and a conventional cooling curve and indicates a difference in cooling gradient. Referring to FIG. 28, according to the conventional cooling curve, a time of about 45 seconds is required until a molded article removing temperature is reached, whereas according to the cooling curve of this embodiment, the removing temperature of 80° C. can be reached within about 8 seconds. A cooling gradient is calculated from (resin temperature during injection—molded article removing temperature)/cooling time. Thus, conventionally, the cooling gradient is (300–60)/45=5.33.

According this embodiment, the cooling gradient is (300–60)/8=30, which is about 6 times the conventional value. Thus, it is apparent that this embodiment is remarkably superior than the conventional case.

Figure 29:
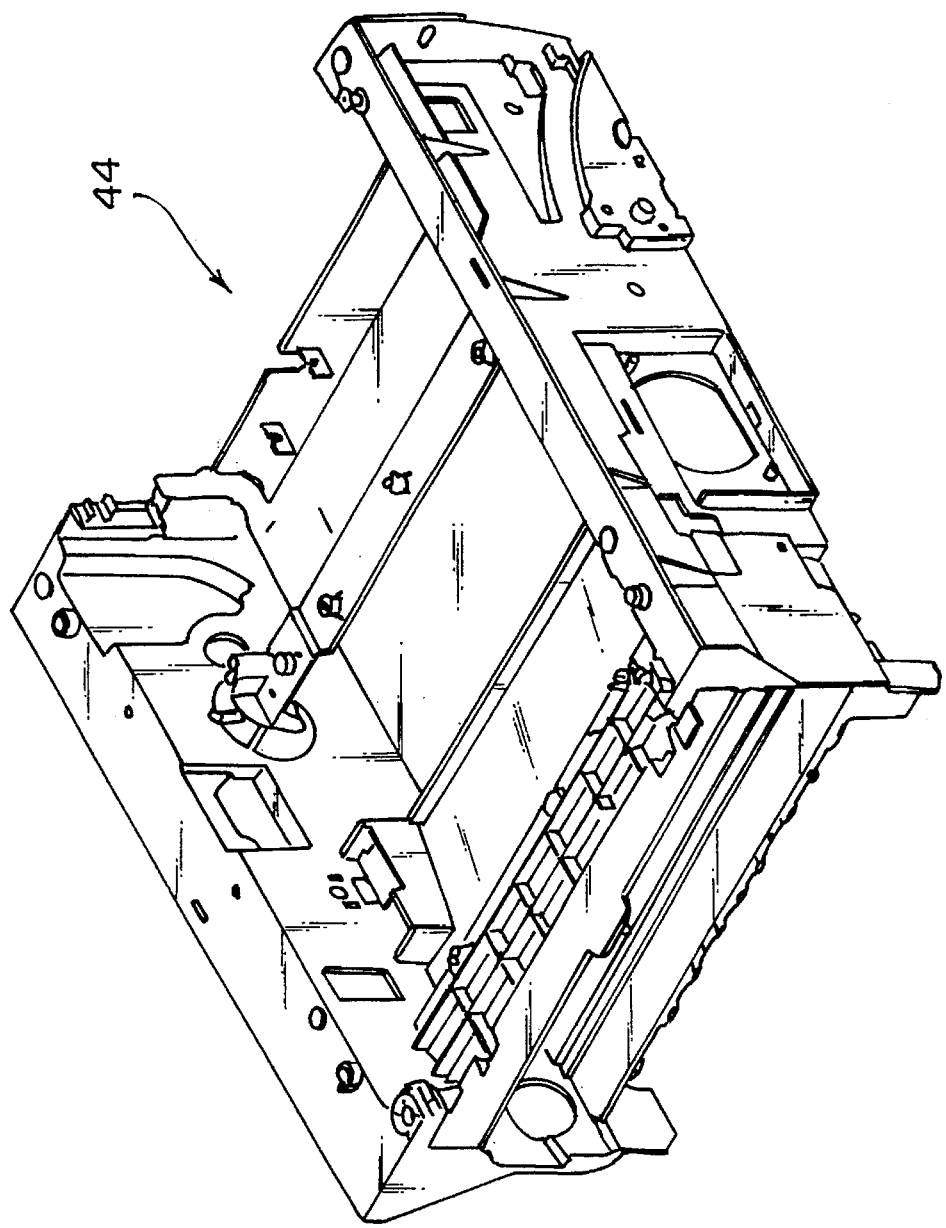
FIG. 29 is a perspective view showing the outer appearance of a molded article 44.

From the above description, when, e.g., the chassis of a laser beam printer shown in FIG. 29 is to be integrally molded as a molded article 44, it can be molded within a short period of time even if it has a complicated shape as shown in FIG. 29.

Regarding the molding condition for this, in the table of comparison shown in FIG. 2, the preset temperature of the cooling unit 10 is 10° C., and the preset temperature of the temperature controller 6 is 15° C. The temperature of the factory water is 25° C. Usually, a change in temperature of the factory water of about ±5° C. cannot be avoided. Thus, the factory water must be stabilized with a change of ±1° C., which is a smaller value. For this purpose, the factory water is cooled by the cooling unit 10 to about 10° C. and is then maintained at 25° C. by the temperature controllers 6. Twenty branching systems are obtained by the branching unit 12, and the flow rate in each branching system is 10 to 18 l/min. Meanwhile, in the conventional system, the flow rate is not obvious since no flowmeter is provided. When the flow rate in the conventional system is measured by experimentally connecting a flowmeter to it, the flow rate is about 3 l/min. Thus, the effect of providing the booster pump can be confirmed. The injection pressure during molding, the dwell pressure, the dwell time, and the mold closing time are set to be the same as in the conventional system. The injection times differ from each other due to the following reason. In the conventional apparatus, as the molding cycle is longer, the viscosity of the molding material is decreased, so that the molding material stays in the plasticizing cylinder for a longer period of time.

The reason for the long molding cycle in the conventional apparatus is as follows. As has been described with reference to FIG. 28, the cooling speed per unit time required after the resin is injected into the cavity of the mold till before the resin is cooled to a removing temperature by heat exchange is low.

The reason for the shorter dwell time of this embodiment than in the conventional apparatus is as follows. Since the cooling speed of the resin injected into the cavity of the mold is high, cooling of the resin progresses. After the resin reaches a non-flowable state, no pressure is applied to the resin, and the dwell pressure is removed to prevent a residual strain. The reason for the shorter molded article removing time is as follows. Since the cooling speed is higher in this embodiment, the temperature of the molded article upon removal is low, so that a high rigidity of the molded article can be maintained to a certain degree. Thus, the molded article can be held and removed to the outside at a comparatively early time point while preventing deformation of the molded article.

Since the holding portion has the adjusting unit 46, as described above, the chucking force is actually set to 2 kgf to minimize the strain in the molded article and to ensure the chucking operation.

The molded article temperature, which is the temperature immediately after the molded article is removed, is measured by the non-contact temperature measuring unit 25 described above. According to this embodiment, the temperature is 45° C. at the lowest-temperature portion, and 110° C. at the highest-temperature portion. The resin employed is a PPO resin manufactured by Nippon (JAPAN) GE Co., Ltd. The thermal deformation temperature is 124° C.

Figure 30:
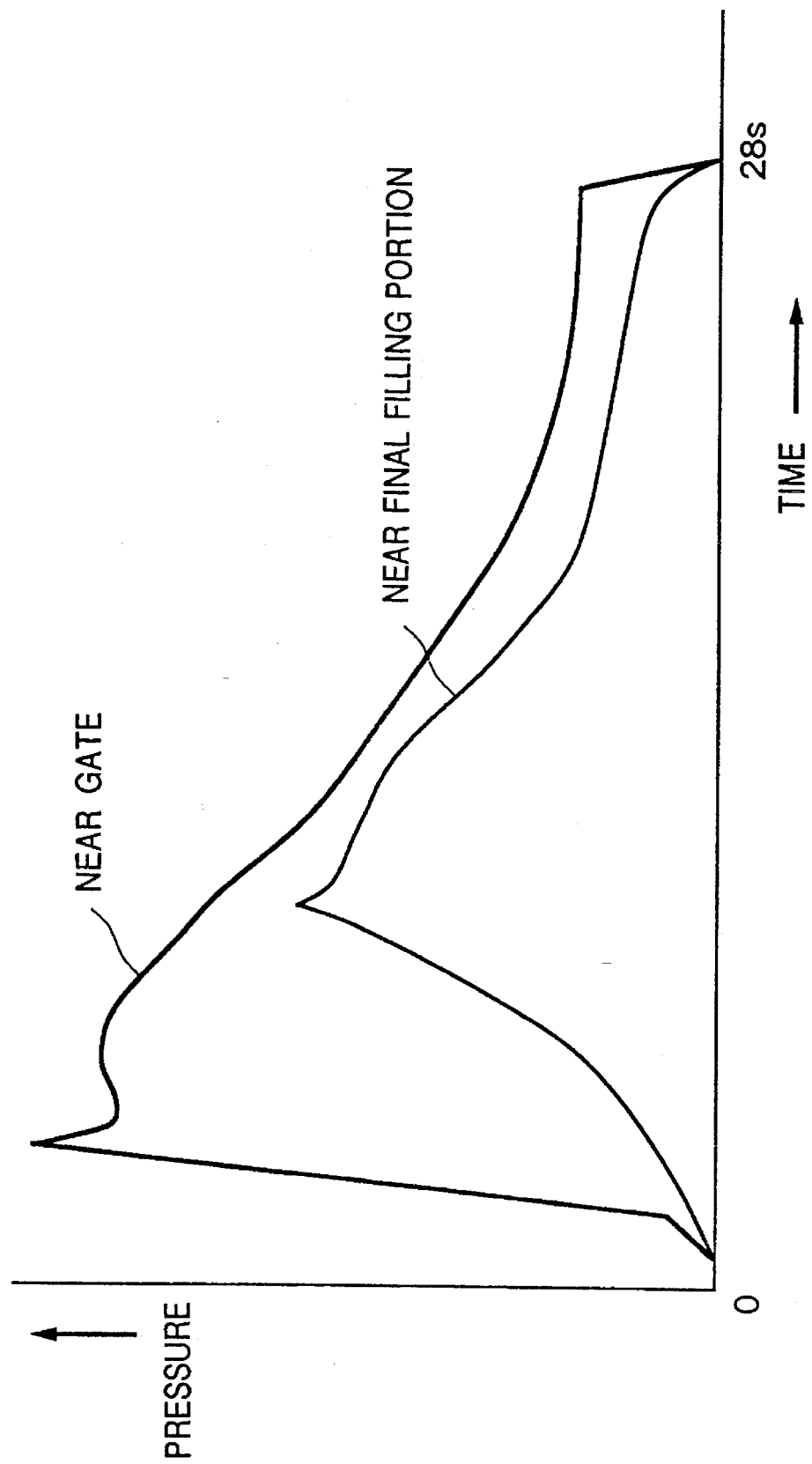
FIG. 30 is a graph showing changes in pressure at different portions of a cavity.

In the graph of FIG. 30 showing the pressure in the mold, the pressure becomes maximum immediately after resin injection, and becomes zero about 28 seconds after resin injection. This change in pressure in the mold is measured by the pressure sensor 35 (FIGS. 3, 4, and 5). Especially, the pressure is 450 kgf/cm$^2$ near the gate 39. When a portion of the molten resin which forms the final filling portion is measured by the sensor, the maximum pressure is 240 kgf/cm$^2$.

The mold temperature is the temperature measured by the in-mold temperature sensor 42A described with reference to FIGS. 6 and 7. Since sensors are arranged at a plurality of portions in the mold, a change in temperature accompanying the lapse of time as the molding shots are repeatedly performed can be measured. According to this measurement, the temperature is 45° C. at the lowest mold temperature portion, and 65° C. at the highest mold temperature portion.

Finally, the fraction defective is an important control means of the molded articles 44. The fraction defective is evaluated by measuring the size of the gap between portions where a mechanical component is to be mounted, and is indicated as a percentage of non-defective articles, the size errors of which are within a required size tolerance.

Figure 31:
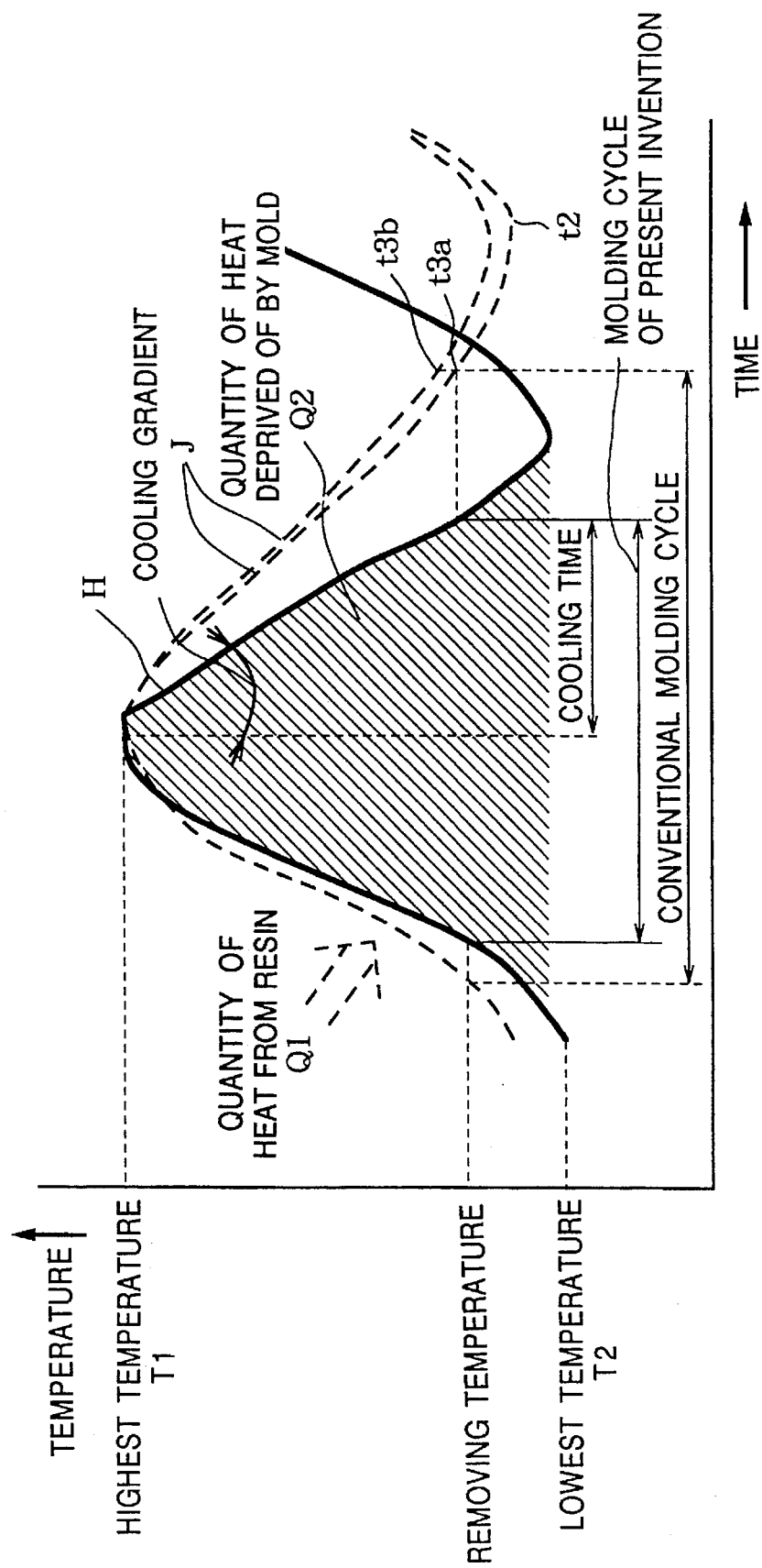
FIG. 31 is a graph showing the equilibrium state of heat balance.

FIG. 31 is a graph showing comparison between a conventional equilibrium curve J and an equilibrium curve H of this embodiment to explain the equilibrium of heat balance. Referring to FIG. 31, to maintain the equilibrium of the heat balance at high precision means to repeatedly maintain the relationship between demand and supply of generated heat at high precision, and to heat exchange a quantity Q1 of heat supplied by the resin in the molten state for a quantity Q2 of heat (hatched portion in FIG. 31), surrounded by a curve H, deprived of mainly by the mold cooling unit. More strictly, the quantity Q1 of heat from the resin can be calculated as the sum of the quantity Q2 of heat deprived of by the mold 2, a quantity Q3 of heat deprived of from the mold 2 into air, and a quantity Q4 of heat thermally conducted to the molding apparatus through the mold 2. The values of Q2, Q4, and Q3 are decreased in this order, as a matter of course.

Referring to FIG. 31, according to the curve H of this embodiment, as described above, the cooling time can be shortened, the cooling gradient can be made steep, the molding cycle can be made short, and the repetition precision can be improved. In contrast to this, according to the conventional curve J, the quantity Q2 of heat deprived of by the mold 2 is low, and a lowest temperature t2 becomes higher than T2 of this embodiment. As indicated by broken lines, a temperature error t3b–t3a is undesirably generated, leading to a low repetition precision.

Figure 32:
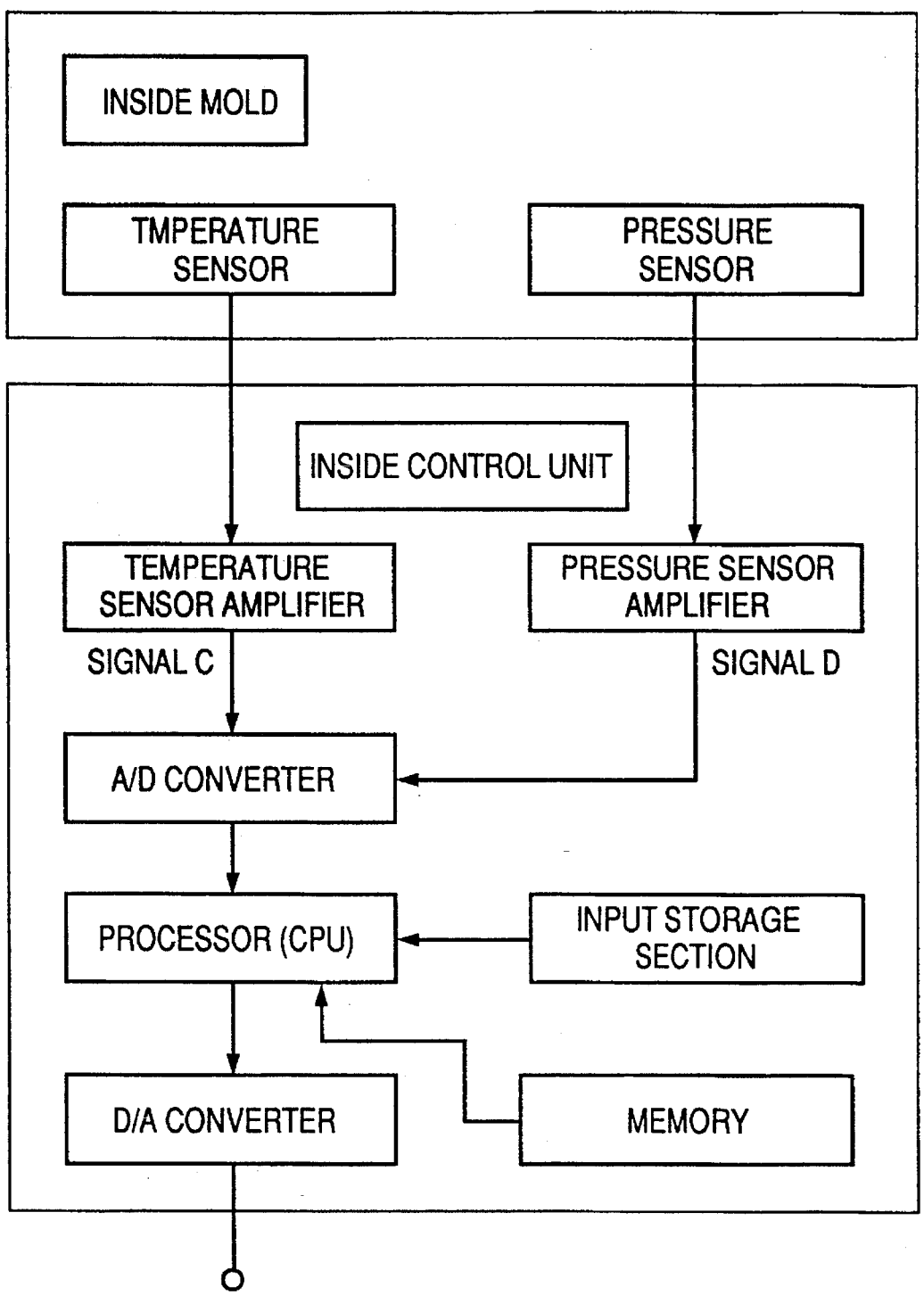
FIG. 32 shows the arrangement of a control unit.
Figure 33A:
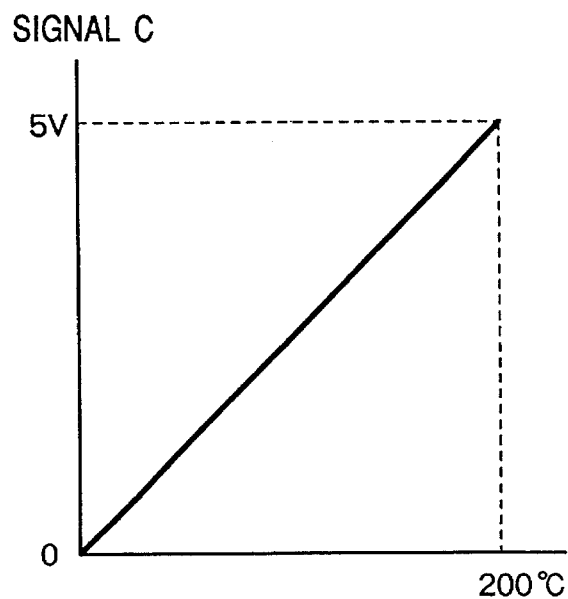
FIGS. 33A and 33B are output waveform charts of a temperature sensor and a pressure sensor, respectively.
Figure 33B:
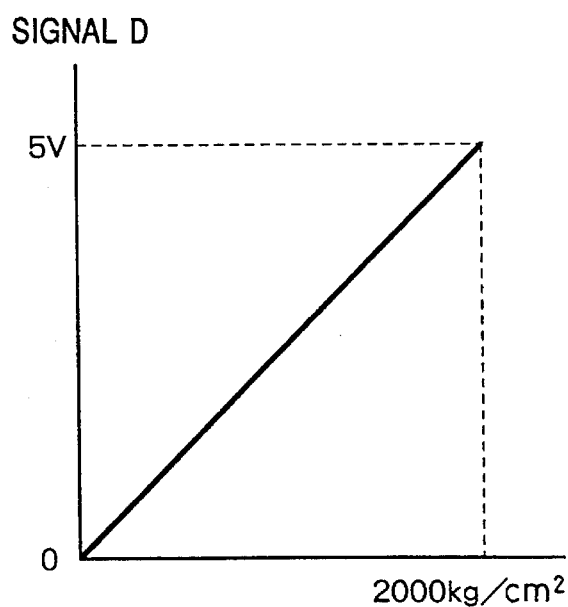

FIG. 32 is a block diagram showing a state wherein the temperature sensor and the pressure sensor provided in the mold are connected to the control unit. Referring to FIG. 32, the temperature sensor is connected to the temperature sensor amplifier in the control unit. As shown in FIG. 33A, as the temperature is increased, an output voltage from the temperature sensor amplifier changes linearly, and is input to an A/D converter. Similarly, the pressure sensor is connected to a pressure sensor amplifier. As shown in FIG. 33B, the output voltage from the pressure sensor amplifier changes linearly in proportion to an increase in pressure, and is input to the A/D converter. The two output voltages are converted to predetermined digital values by the A/D converter. The upper and lower limit digital values of the temperature and pressure are compared, by a processor connected to a storage, with a predetermined temperature and a predetermined temperature of the mold, which are stored in the storage. Thereafter, the digital signals are converted to analog signals by a D/A converter based on the comparison result, thereby controlling the respective units of the molding system described above.

FIG. 34 is a graph showing the relationship between a temperature sensor output obtained by measuring the mold temperature and determination of non-defectiveness/defectiveness. This determination is executed by the processor. An output from the temperature sensor changes in units of molding cycles, as shown in FIG. 34. When this temperature change falls within a range of upper and lower limit values (control value), the temperature is determined as normal.

FIG. 35 is a graph showing the relationship between a pressure sensor output obtained by measuring the pressure in the cavity of the mold, and determination of non-defectiveness/defectiveness. This determination is executed by the processor. An output from the pressure sensor abruptly changes from zero at the start of molding to the maximum value, and then to zero again at the end of one cycle. When this pressure change falls within a range of upper and lower limit values (control value), the pressure is determined as normal.

Figure 36:
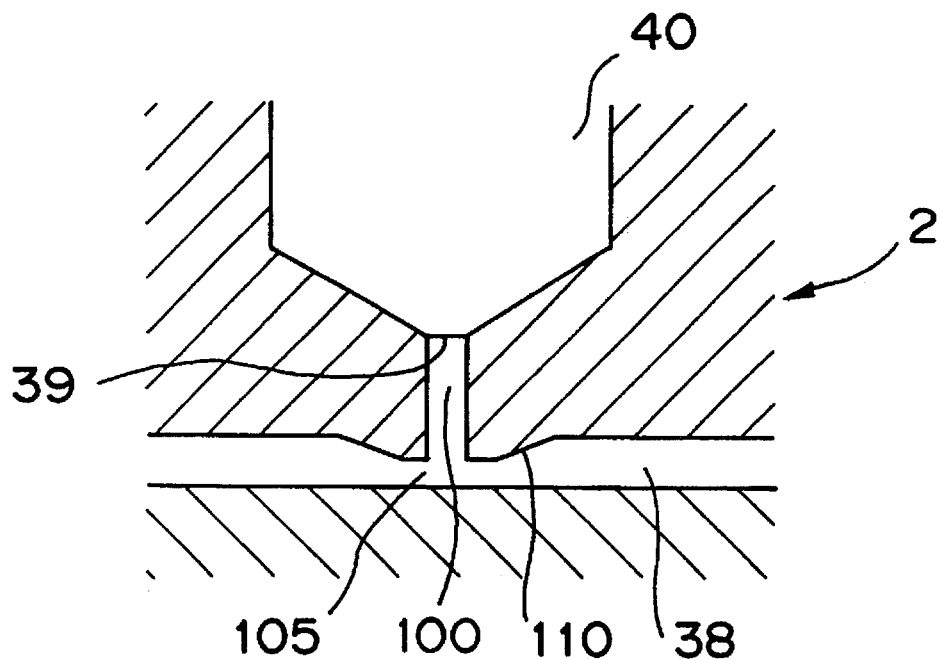
FIG. 36 is a schematic sectional view of the main part of a mold.

Preferred embodiments of the mold according to the present invention will be described in detail with reference to FIGS. 36 to 54. According to the embodiment shown in FIG. 36, in a plastic injection mold used for injection molding of a thermoplastic resin by using a hot runner 40, a land portion 100 of a gate 39 contiguous to a cavity 38 has a cylindrical shape. A contiguous portion (a thin-walled portion 105 and a thickness changing portion 110) of the cavity 38 to the gate 39 is formed such that the wall thickness of part of the molded article in the cavity 38 contiguous to the gate 39 through the land portion 100 is decreased from this portion toward the outlet of the central land portion 100.

For this reason, the molded article is cooled starting from its thin-walled portion (a portion close to the base of the contiguous portion 110), so that an increase in temperature caused by a shearing heat generated during injection of the thermoplastic resin near the gate 39 is suppressed. A difference in temperature between a portion of the resin in the cavity near the land portion and portions of the resin corresponding to other portions of the molded article having predetermined thicknesses is decreased, thereby decreasing a difference in resin shrinkage timing during cooling of the mold and a difference in amount of shrinkage. As a result, the gate seal time, the dwell time, and the molding cycle can be shortened, so that the productivity can be improved. Also, so-called stringing at the gate 39 will not occur upon mold opening.

Shearing heat is heat generated when a resin receives a shearing force. When a molten resin flows, the resin flowing speed is naturally different between its surface portion contacting the mold and its interior. Therefore, when a plate-like article is to be molded, a shearing force is generated due to the difference in resin flowing speed in the direction of thickness. The larger the resin flowing speed, the larger the difference in shearing force. Thus, the difference in shearing force is maximum near the gate. When a hot runner is used, heat is transmitted more to the gate than in a case wherein a cold runner is used, so that the shearing force can be minimized.

Figure 37:
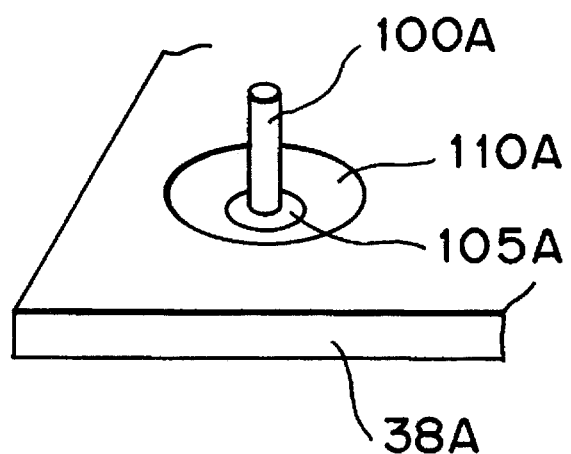
FIG. 37 is a schematic perspective view of part of an article molded by the mold shown in FIG. 36.

When the above mold is used, as shown in FIG. 37, the molded article is formed such that its wall thickness corresponding to a portion of the cavity of the mold contiguous to the gate of the hot runner through the land portion 100 is gradually decreased toward the outlet of the land portion 100, that is, such that a thin-walled portion 105A and a land portion 100A are formed to surround the land portion 100. Accordingly, no recess is formed in a portion of the molded article corresponding to a portion near the land portion 100. Also, an appearance defect, e.g., a flash or silver stream, will not be formed in a surface of the molded article opposite to the surface corresponding to the portion near the land portion 100.

Figure 38:
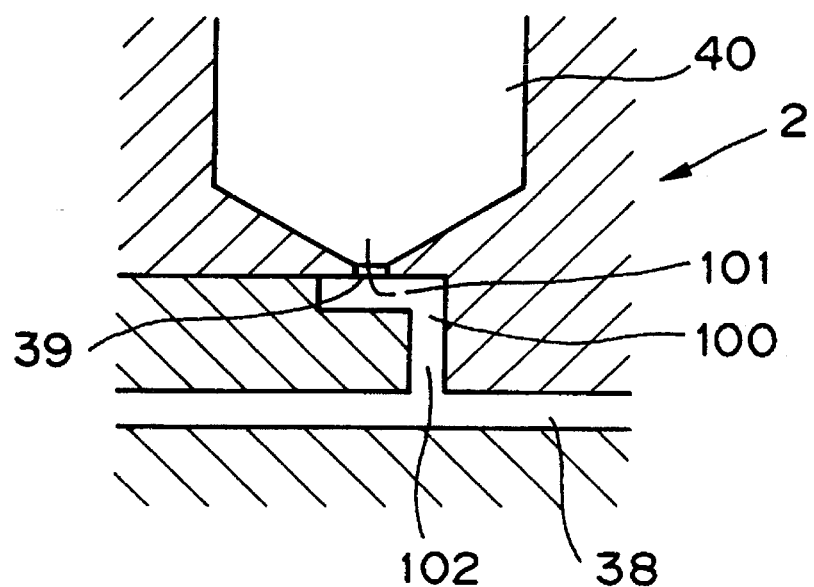
FIG. 38 is a schematic sectional view of the main part of a mold according to another embodiment.

As shown in FIG. 38, according to another embodiment, a land portion 100 contiguous to a cavity 38 is constituted by a region 101 extending perpendicular to the injecting direction of a hot runner 40 at a gate 39, and a region 102 for changing the flowing direction of the resin so that it is contiguous to the cavity 38 through a position remote from the gate position of the region 101. This arrangement is especially suitable for molding a thermoplastic resin having a comparatively poor heat stability, e.g., vinyl chloride, an alloy, or a composite plastic containing a large amount of a fire-retardant material. More specifically, with the arrangement of FIG. 38, upon injection, the resin flowing direction is changed to almost the right angle once and then the resin is filled in the cavity 38 that molds the molded article. Thus, even if a flow mark, e.g., a flash or silver stream, is formed near the gate 39 due to the shearing heat, the flow mark can be limited inside the land portion 100. The outer appearance of the product is not degraded if the lower surface of the molded article opposing the land portion 100 is set as the outer surface of the product.

Figure 39:
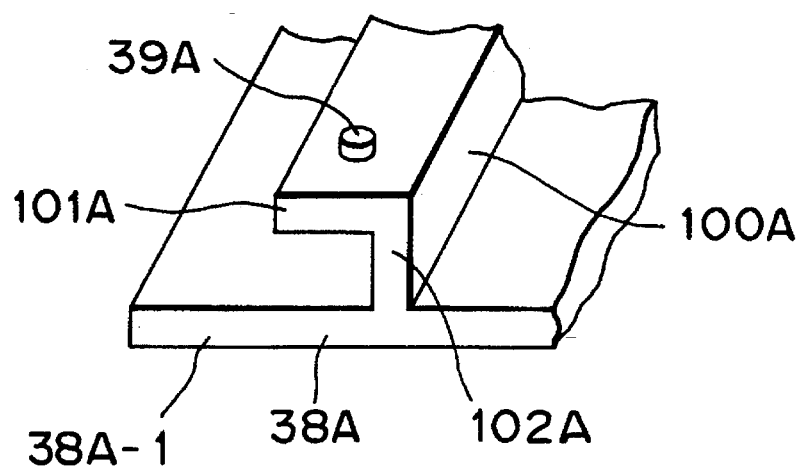
FIG. 39 is a schematic perspective view of part of an article molded by the mold shown in FIG. 38.

FIG. 39 is a perspective view showing part of a molded article which is injection-molded by using the mold shown in FIG. 38. Referring to FIG. 39, the land portion 100 shown in FIG. 38 contiguous to the gate 39 of the hot runner 40 forms part of the molded article, e.g., a harness mounting bracket. This portion may be constituted by a region 101A extending perpendicular to the injecting direction of the hot runner, and a region 102A extending in a bent direction so as to be contiguous to a molded article main body 38A at a position remote from the gate position. A surface 38A-1 of the molded article main body 38A may be used as the outer surface of the product.

Figure 40:
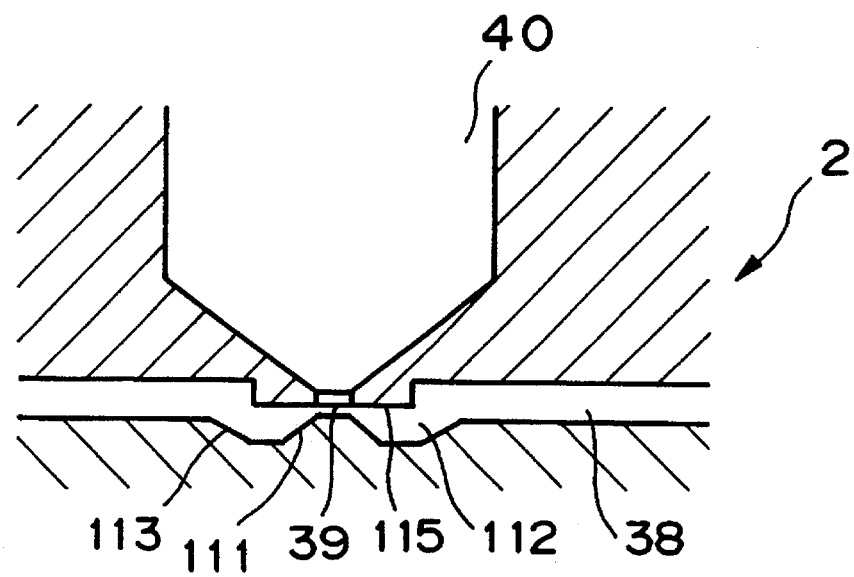
FIG. 40 is a schematic sectional view of the main part of a mold according to still another embodiment.

As shown in FIG. 40, according to still another embodiment, a projecting portion 115 having a required size, e.g., 0.2 to 0.5 mm, is formed so that a gate 39 of a hot runner 40 contiguous to a cavity 38 projects into the molded article through the surface of the molded article. A wall thickness changing portion 111 is formed around the gate 39 in order to gradually increase the wall thickness of this portion of the molded article in the radial direction to be remote from the gate. In this embodiment, the cavity 38 is formed such that a thick-wall portion 112 is formed to extend from the wall thickness changing portion 111 toward the thick-wall portion of the molded article. For this reason, a portion of a cavity surface side which is opposite to the outlet of the gate 39, where the temperature increase caused by the heat generated by the shearing force is the highest, can be formed as the thin-walled portion of the molded article, so that the temperature can be decreased at this portion. Inversely, since a portion around the thin-walled portion is thick, the temperature is increased to improve the flowability of the resin. On the outer side of this thick-wall portion, the wall thickness is gradually decreased so that the wall thickness of the product corresponding to this portion is gradually decreased, thus providing a moderate cooling gradient. As a result, a recess and the like in the molded article can be avoided while maintaining the high flowability of the molten resin.

In this manner, no difference in temperature occurs between a portion of the resin in the cavity 38 near the gate 39 and portions of the resin corresponding to other portions of the molded article having predetermined thicknesses, thereby decreasing a difference in resin shrinkage timing during cooling of the mold and a difference in amount of shrinkage. The gate seal time, the dwell time, and the molding cycle can be shortened, so that the productivity can be improved.

Figure 41:
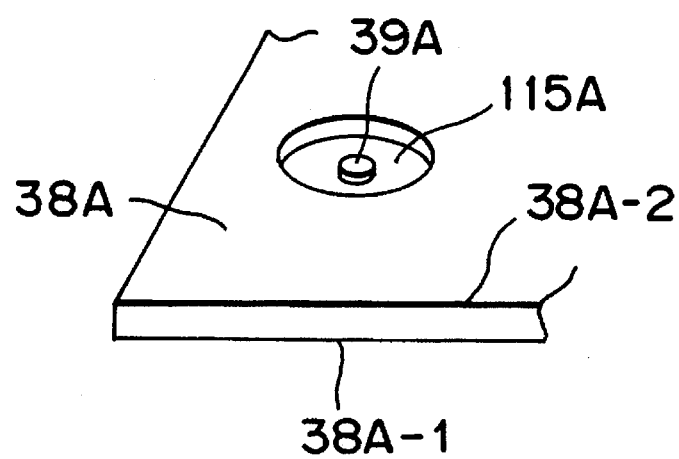
FIG. 41 is a schematic perspective view of part of an article molded by the mold shown in FIG. 40.

As a result, a molded article as shown in FIG. 41 can be obtained. More specifically, upon molding, a groove portion 115A which is recessed inside is formed in a surface of a portion of a molded article 38A which is contiguous to the gate 39 of the hot runner 40. On the lower side of the molded article 38A, a wall thickness changing portion is formed around this gate-corresponding portion in the radial direction to be remote from the gate-corresponding portion to gradually increase the wall thickness of this portion. Therefore, a recess will not be formed in a portion of the molded article corresponding to the gate portion, and an appearance defect, e.g., a flash or silver stream, will not be formed on a surface 38A-1 opposite to the surface of the molded article corresponding to the gate portion. Since a gate slug 39A formed in the gate 39 of the hot runner 40 will not project upward above a surface 38A-2 of the molded article, the mating articles can be abutted with each other by surface contact.

Figure 42:
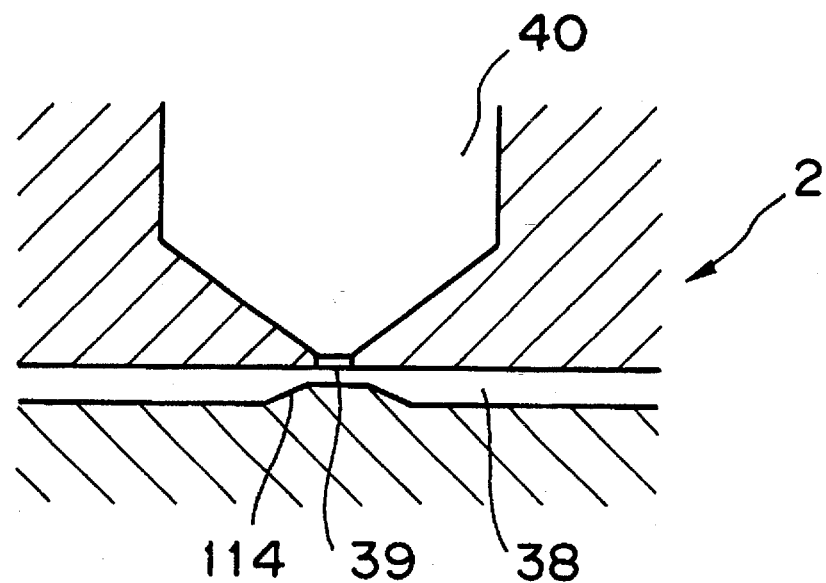
FIG. 42 is a schematic sectional view of the main part of a mold according to still another embodiment.

According to the embodiment shown in FIG. 42, a thin-walled portion 105 to form the thin-walled portion of the molded article is formed in a cavity 38 on a surface side opposing a gate 39 of a hot runner 40 contiguous to the cavity 38, and a wall thickness changing portion 114 that gradually increases the wall thickness of a corresponding portion of the molded article is formed in the radial direction to be remote from the gate 39.

Figure 43:
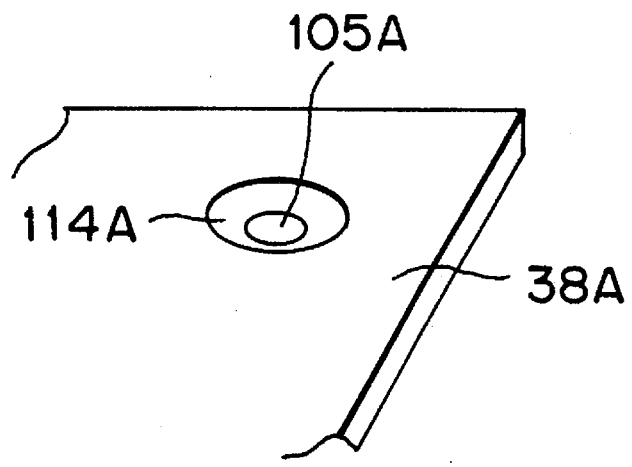
FIG. 43 is a schematic perspective view of part of an article molded by the mold shown in FIG. 42.

As a result, in the molded article formed with this mold, as shown in FIG. 43, a thin-walled portion 105A is formed by molding on a lower surface side opposing the gate of the hot runner, and a wall thickness changing portion 114A that gradually increases the wall thickness is formed in the radial direction to be remote from a portion contiguous to the gate.

Figure 44:
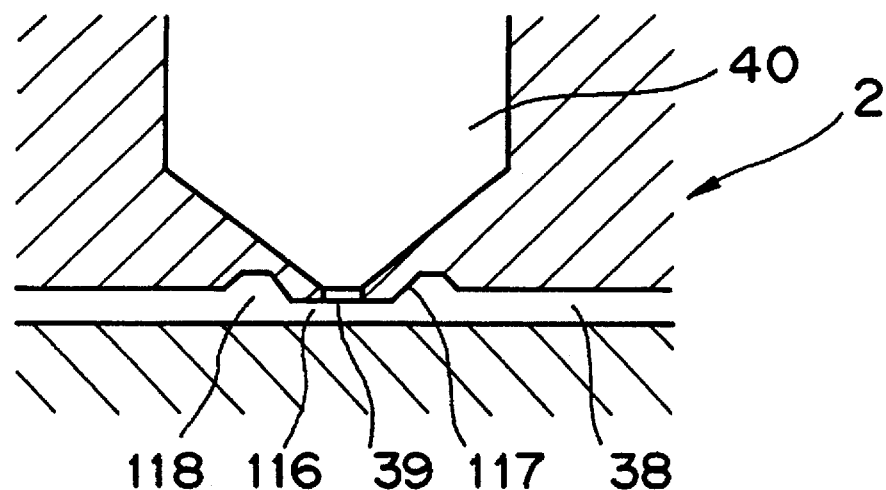
FIG. 44 is a schematic sectional view of the main part of a mold according to still another embodiment.

The embodiment shown in FIG. 44 is a modification of the embodiment shown in FIG. 40. A thin-walled portion 116 to form the thin-walled portion of the molded article is formed on a surface side opposing a gate 39 of a hot runner 40 contiguous to a cavity 38, and a wall thickness changing portion 117 that gradually increases the wall thickness of a corresponding portion of the molded article is formed in the radial direction to be remote from the gate 39. Furthermore, in this embodiment, the cavity 38 is formed to form a thick-wall portion 118 to extend from the wall thickness changing portion 117 toward the thick-wall portion of the molded article.

Figure 45:
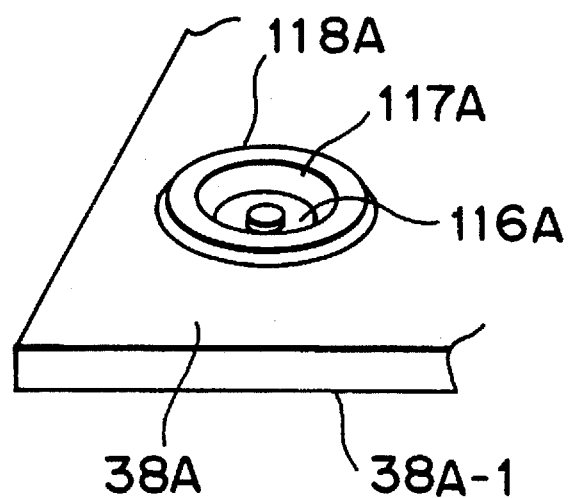
FIG. 45 is a schematic perspective view of part of an article molded by the mold shown in FIG. 44.

As a result, in the molded article formed by the injection mold shown in FIG. 44, a thin-walled portion 116A is formed by molding on a surface side opposing the gate 39 of the hot runner 40, as shown in the outer appearance perspective view of FIG. 45. A wall thickness changing portion 117A that gradually increases the wall thickness, and an annular portion 118A projecting from the surface are formed in the radial direction to be remote from a portion contiguous to the gate 39, thereby increasing the strength. An appearance defect, e.g., a flash or silver strain, will not be formed on an opposite surface 38A-1, and a recess can be prevented.

Figure 46:
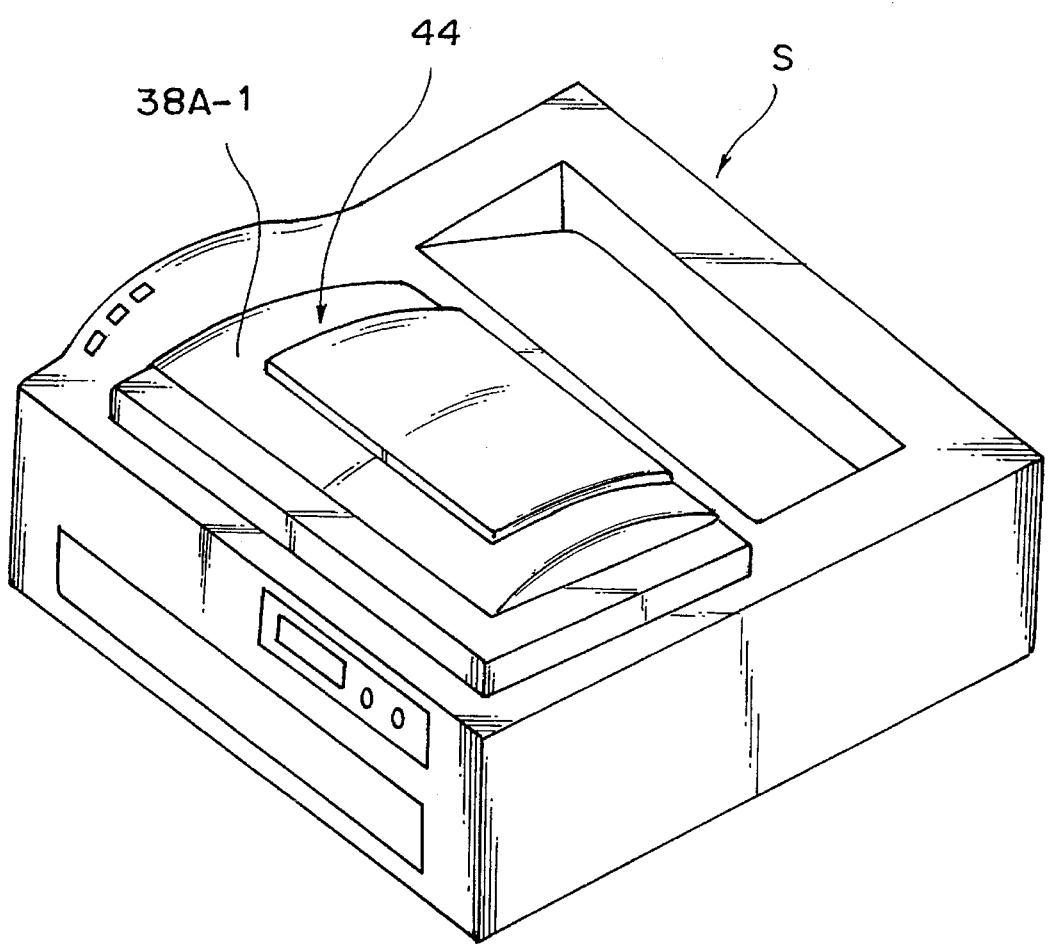
FIG. 46 is a perspective view showing the outer appearance of a molded article 44.
Figure 47:
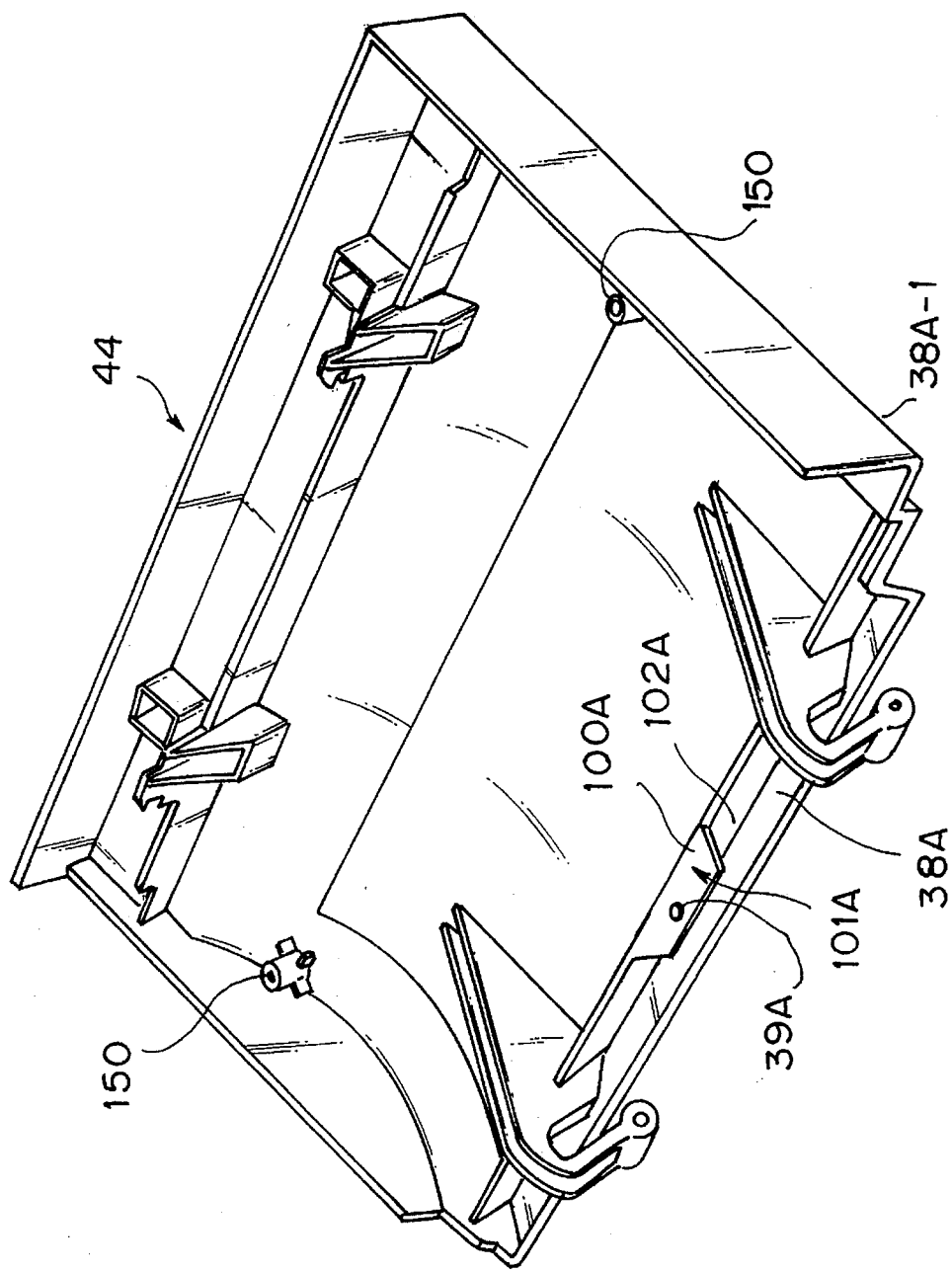
FIG. 47 is a perspective view showing the outer appearance of the lower side of the molded article shown in FIG. 46.

FIG. 46 is a perspective view showing the outer appearance of a laser beam printer unit S. The cover of the printer unit S is molded as a molded article 44 by the mold shown in FIG. 38, and its surface 38A-1 appears on the outer surface of the printer unit S. FIG. 47 is a perspective view showing the outer appearance of the cover seen from the lower side. A gate portion 39A is formed to be contiguous to the gate 39 of the hot runner 40 shown in FIG. 39, and a land portion 100A constitutes a wire harness mounting bracket. For this purpose, the land portion 100A is constituted by a region 101A extending in a direction perpendicular to the injecting direction of the hot runner 40, and a region 102A extending in a bent direction to be contiguous to a molded article main body 38A. The surface 38A-1 of the molded article main body 38A forms the outer surface. Bosses 150 are integrally formed on the inner surface of the printer unit S, as shown in FIG. 47. The mating article (not shown) is positioned and fixed by using these bosses.

Figures 48, 49:
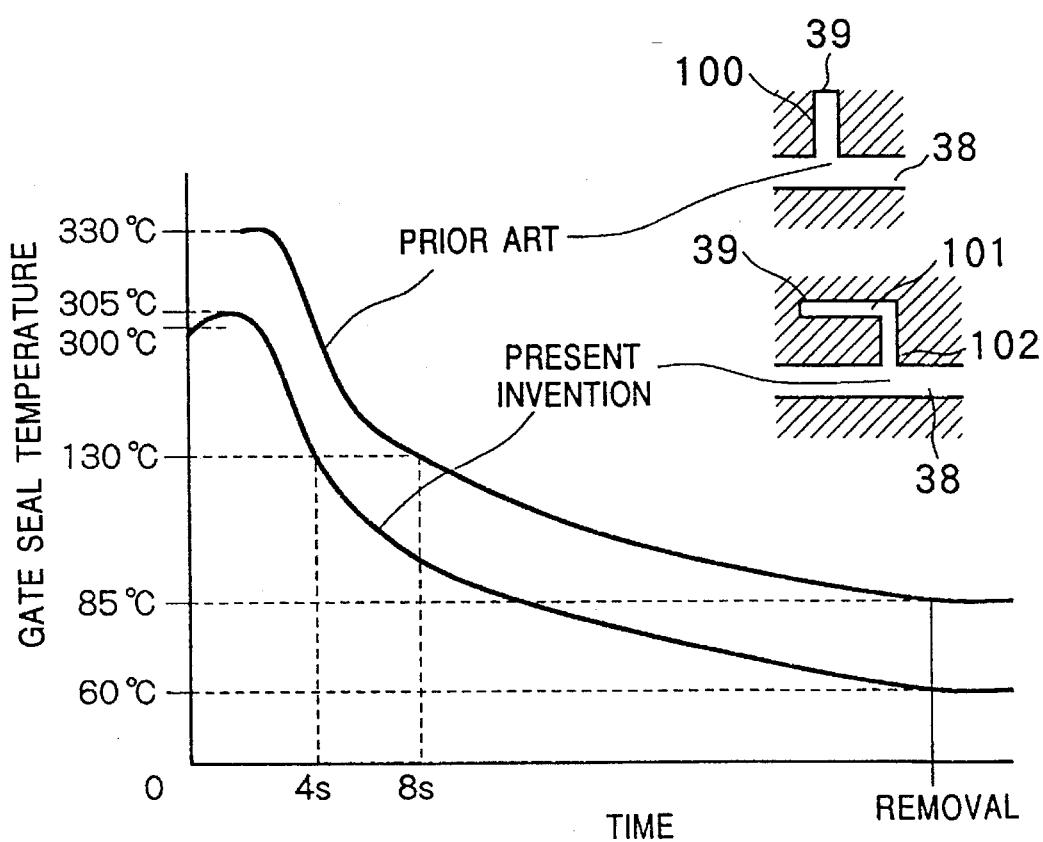
FIG. 48 is a table showing comparison in time required for molding.
FIG. 49 includes diagrams and a graph showing comparison of the gate seal temperature.

FIG. 48 is a table showing comparison between the gate seal time, the dwell time, and the molding cycle. In this table, the gate seal time, the dwell time, and the molding cycle are shortened to about half, thereby doubling the productivity.

FIG. 49 is a graph showing a change in shearing heat at the gate portion by comparison between the conventional mold and the mold shown in FIG. 48. Referring to FIG. 49, the temperature of the resin before being filled in the mold after closing is about 300° C. Hence, in this embodiment, the temperature of a portion contiguous to the cavity 38 is increased by the shearing force only by about 5° C. The resin can be cooled quickly. When the molded article is removed after a lapse of the same period of time as in conventional molding, the removing temperature is decreased by about 25° C. Thus, the strain in the molded article removed by chucking can be decreased.

FIG. 50 is a graph showing a temperature distribution near the gate 39 of the hot runner 40 as a function of the lapse of time. In FIG. 50, the wall thickness of a portion corresponding to a portion around the gate 39 is set larger than that of the cavity 38 in a convex manner. Referring to FIG. 50, resin cooling is delayed. As a result, a portion P1 immediately under the gate, a portion P2 below the projecting portion, and a thick-wall portion P3 are formed to have substantially the same cooling gradients.

FIG. 51 is a table showing the relationship between an angle a of inclination of the surface contiguously formed to extend from a portion around the gate 39, a wall thickness T, and a wall thickness T1 of a portion under the gate. FIG. 52 shows inequalities summarizing the result of FIG. 51. Referring to FIGS. 51 and 52, when the wall thickness T1 is 1.5 mm and the wall thickness T2 is 2 mm, if the angle a of inclination of the surface is set to 45°, the outer surface opposing the gate can be made flat, and a recess can be prevented. Similarly, when the wall thicknesses T1 and T2 are 1.5 mm and 3 mm, respectively, if the angle a of inclination of the surface is set to 60°, the outer surface opposing the gate can be made flat, and a recess can be prevented. Therefore, the inequalities shown in FIG. 52 can be obtained.

Figure 53:
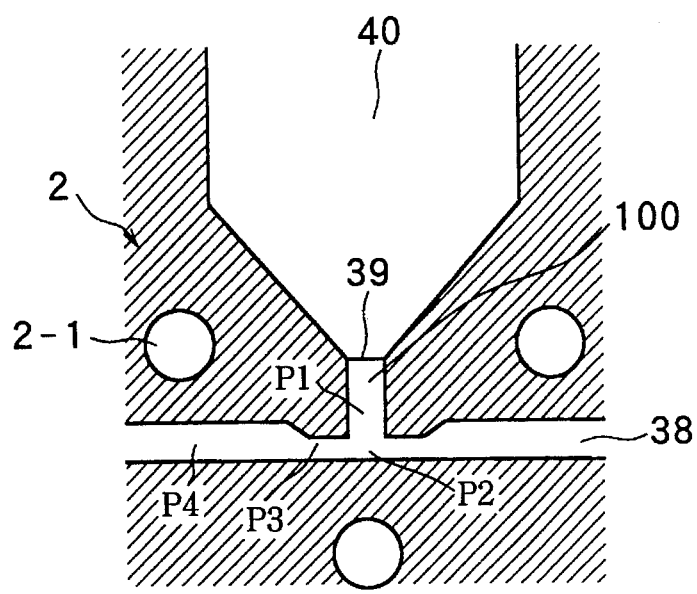
FIG. 53 is a diagram showing portions of a mold.
Figure 54:
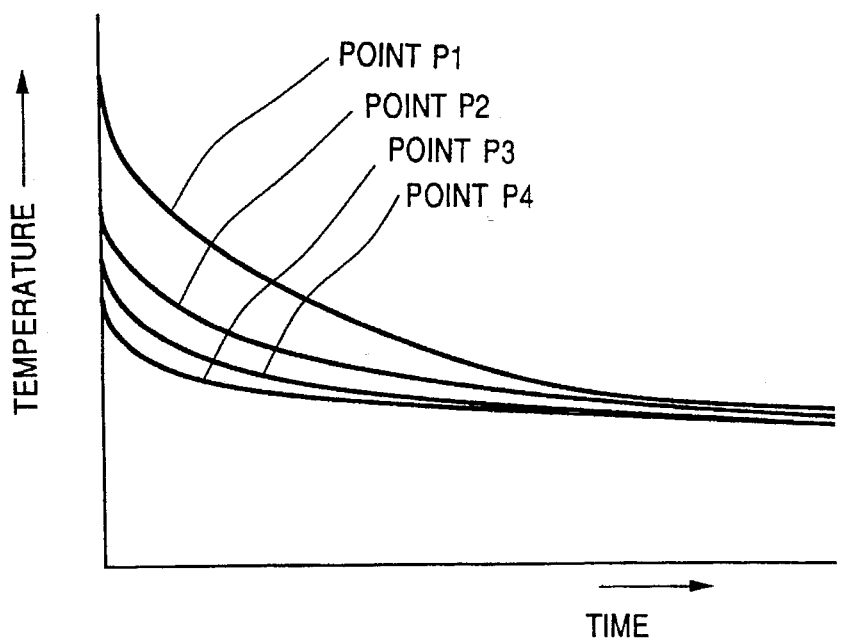
FIG. 54 is a graph showing temperatures at different portions of the mold shown in FIG. 53.

FIG. 53 is a sectional view of the main part of a mold and indicates portions P1 to P4. FIG. 54 is a graph showing the temperature tendencies of the respective portions of FIG. 53, after the molten resin is filled, as the function of time. From FIGS. 53 and 54, it is confirmed that the temperature near the gate is the highest immediately after resin injection with a large difference from the cavity 38, and that as time passes, temperatures at all the portions are converged to be substantially the same.

Figure 55:
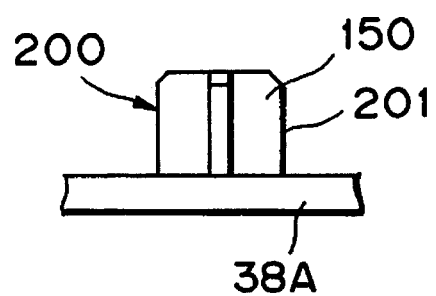
FIG. 55 is a front view of the main part of a molded article.
Figure 56:
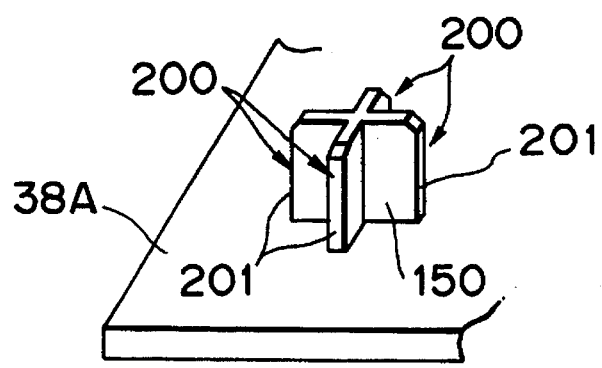
FIG. 56 is a perspective view showing the outer appearance of part of the molded article shown in FIG. 55.

The embodiments of the molded articles shown in FIGS. 55 and 56 will be described in detail with reference to these drawings. In a plastic molded article, a boss 150 is integrally formed to project from one surface side of a molded article main body 38A, so that this molded article can be connected to the mating article. This boss 150 forms a plurality of plate-like ribs 200 that extend radially from the fitting center, such that the ribs 200 are in contact with the inner wall surface of the fitting hole of the mating article with three or more (four in this embodiment) outer edge portions 201.

In this arrangement, the ribs 200 are thinner than the molded article main body 38A. Thus, in the cooling process, a difference in temperature drop between the molded article main body 38A and the boss 150 substantially disappears, so that a loss time does not occur in the molding cycle (cooling step). As a result, the productivity can be improved, a recess will not be formed in the molded article, and high fitting precision with the mating article, high planar precision, good outer appearance, and the like can be maintained. Minor correction of the position of the boss 150 and the like can be easily performed only by partially grinding or forming padding on the corresponding portion of the rib. More specifically, the position of the boss can be easily corrected only by correcting, e.g., the female die.

Figure 57:
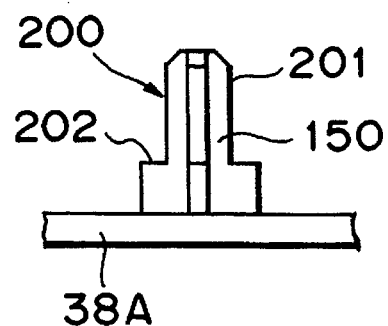
FIG. 57 is a front view of the main part of a molded article.
Figure 58:
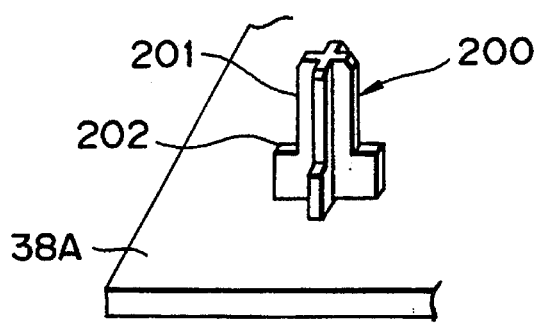
FIG. 58 is a perspective view showing the outer appearance of part of the molded article shown in FIG. 57.
Figure 59:
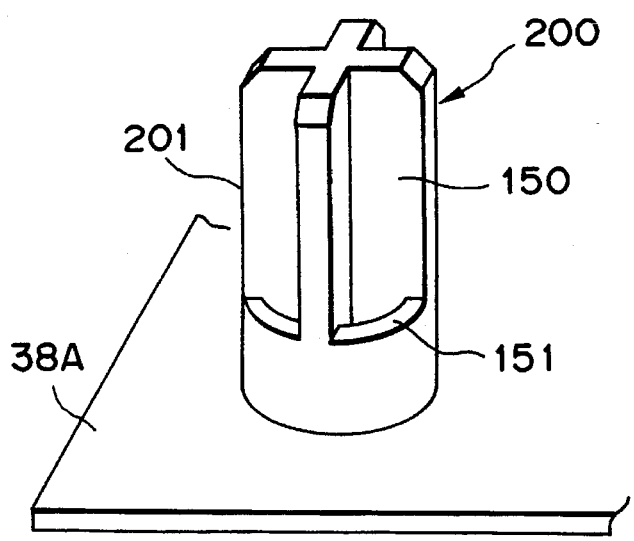
FIG. 59 is a perspective view showing the outer appearance of part of a molded article.

As shown in FIGS. 57 and 58, stepped portions 202 may be formed at the base portions of the respective ribs 200, and may be used as the seat portions for keeping the distance between a molded article main body 38A and the mating article to be mounted on the molded article main body 38A. As shown in FIG. 59, the base portions of adjacent ribs 200 may be connected with arcuated stepped portions 151 in an annular manner, and may be used as the seat portions. With the stepped portions 151, an effect of preventing a boss 150 from falling down can be further obtained.

Figure 60:
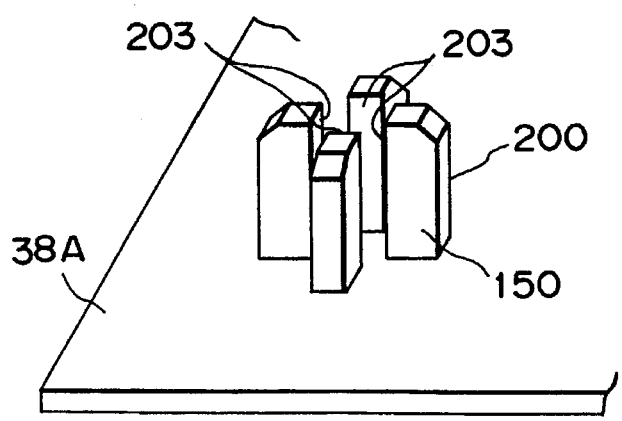
FIG. 60 is a perspective view showing the outer appearance of part of a molded article.
Figure 61:
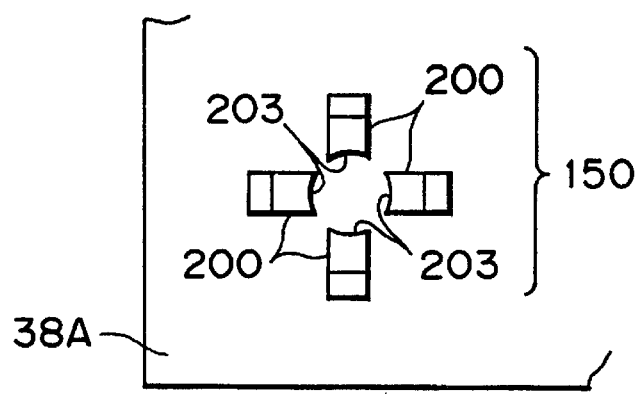
FIG. 61 is a plan view of the main part of the molded article shown in FIG. 60.

In still another embodiment, as shown in FIGS. 60 and 61, a boss 150 is integrally formed to project from one surface of a molded article main body 38A, so that the molded article can be connected to the other or mating article. The boss 150 is constituted by a plurality of plate-like ribs 200 that extend radially from the fitting center, such that they define a gap through which the boss 150 is in contact with the outer edge portion of the fitting projection of the mating article with its three or more (four in this embodiment) inner edge portions 203. The gap surrounded by the inner edge portions 203 may serve as a screw lower hole to be threadably engaged with the outer surface of the mounting screw of the mating article to connect the molded article main body 38A to the mating article.

Figure 62:
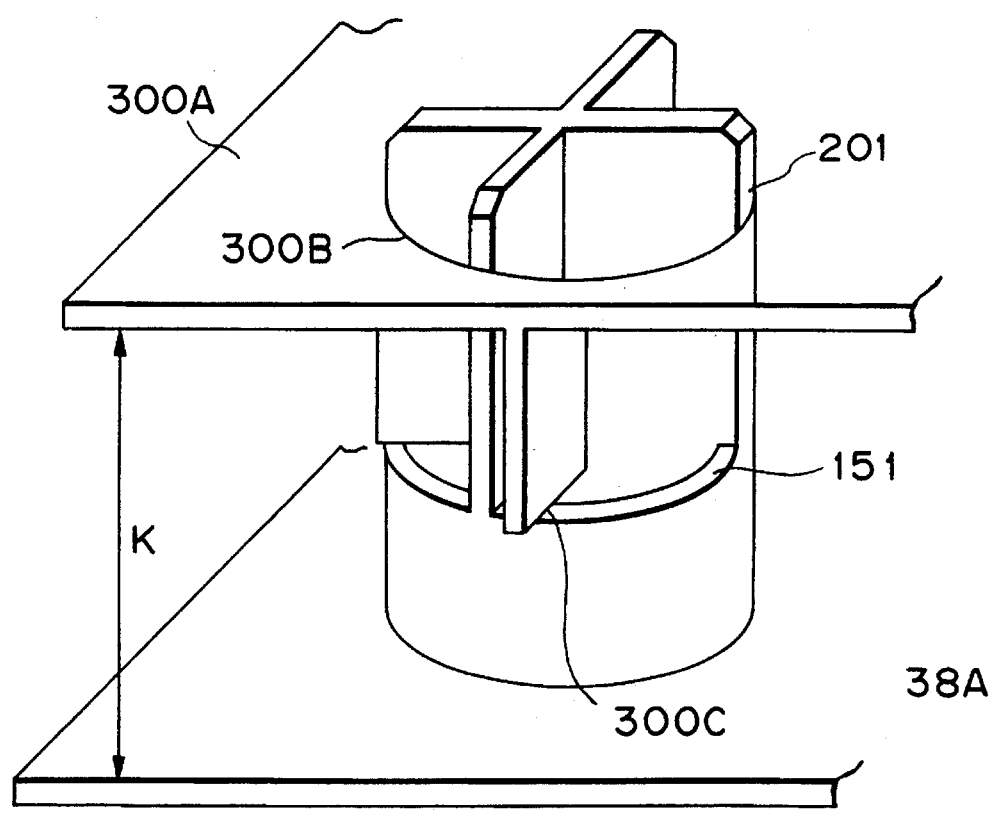
FIG. 62 is a perspective view showing the outer appearance of the main part of a molded article.

FIG. 62 is an outer appearance perspective view of still another embodiment. Referring to FIG. 62, an article 300A has a fitting hole 300B, and integrally forms projecting portions 300C which suspend vertically from the peripheral portion of the fitting hole 300B in the radial direction. Four ribs 201 and four stepped portions 151 are integrally formed in a molded article 38A to guide the fitting hole 300B of the article 300A along the circumferential surfaces of the respective ribs 201 in a position-regulated manner. The projecting portions 300C are abutted against the stepped portions 151 to regulate further movement of the molded article 38A, thereby forming a gap K.

Figure 63:
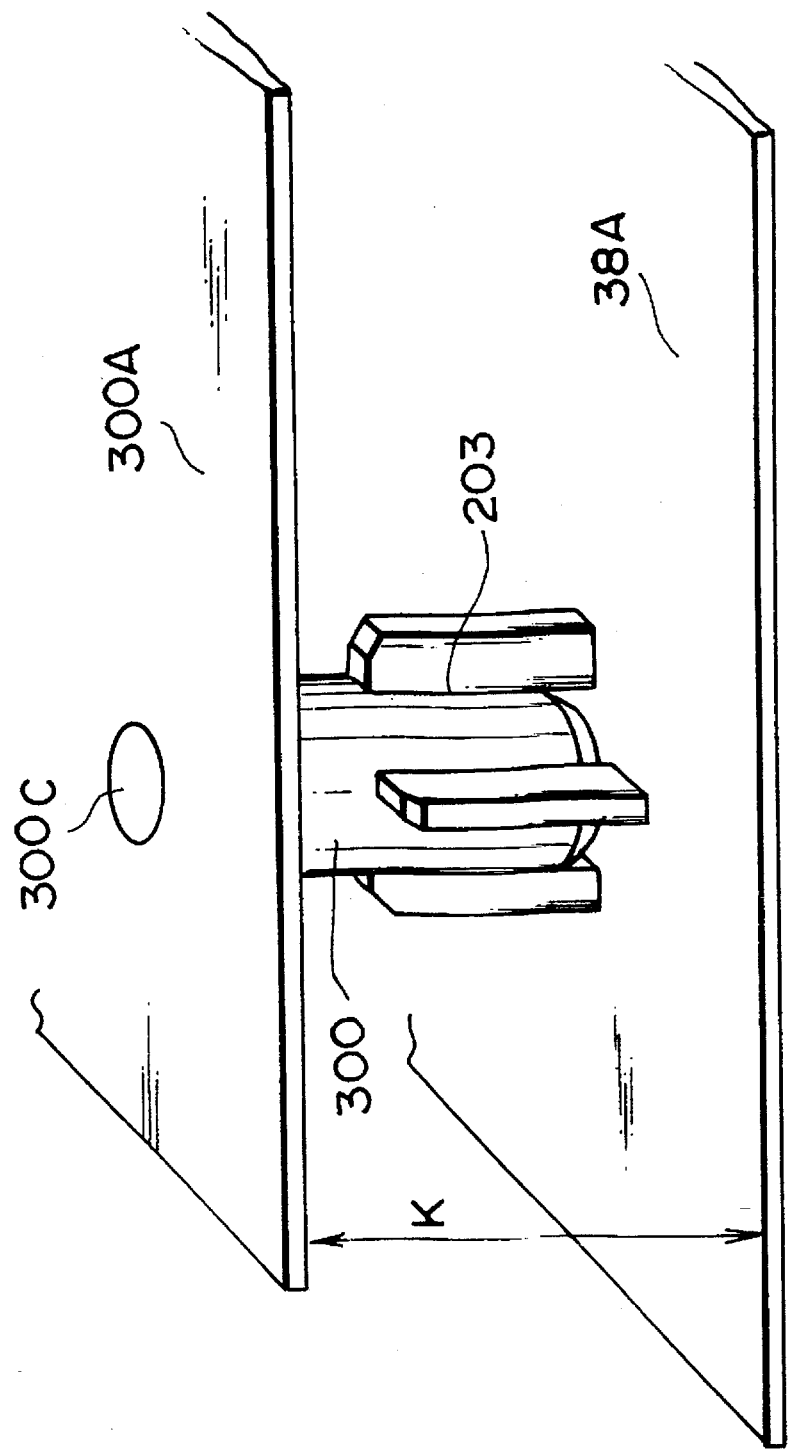
FIG. 63 is a perspective view showing the outer appearance of the main part of a molded article.

FIG. 63 is a perspective view showing the outer appearance of still another embodiment. Referring to FIG. 63, an article 300A integrally forms a columnar portion 300B suspending downward in the vertical direction such that a hollow portion 300C is formed in the central portion of the columnar portion 300B. A member having four inner edge portions 203 is integrally formed on a molded article 38A to guide the circumferential surface of the columnar portion 300B along the inner edge portions 203 in a position-regulated manner. The distal end portion of the columnar portion 300B is abutted against the surface portion of the molded article 38A to regulate further movement of the molded article 38A, thereby forming a gap K.

Figure 64:
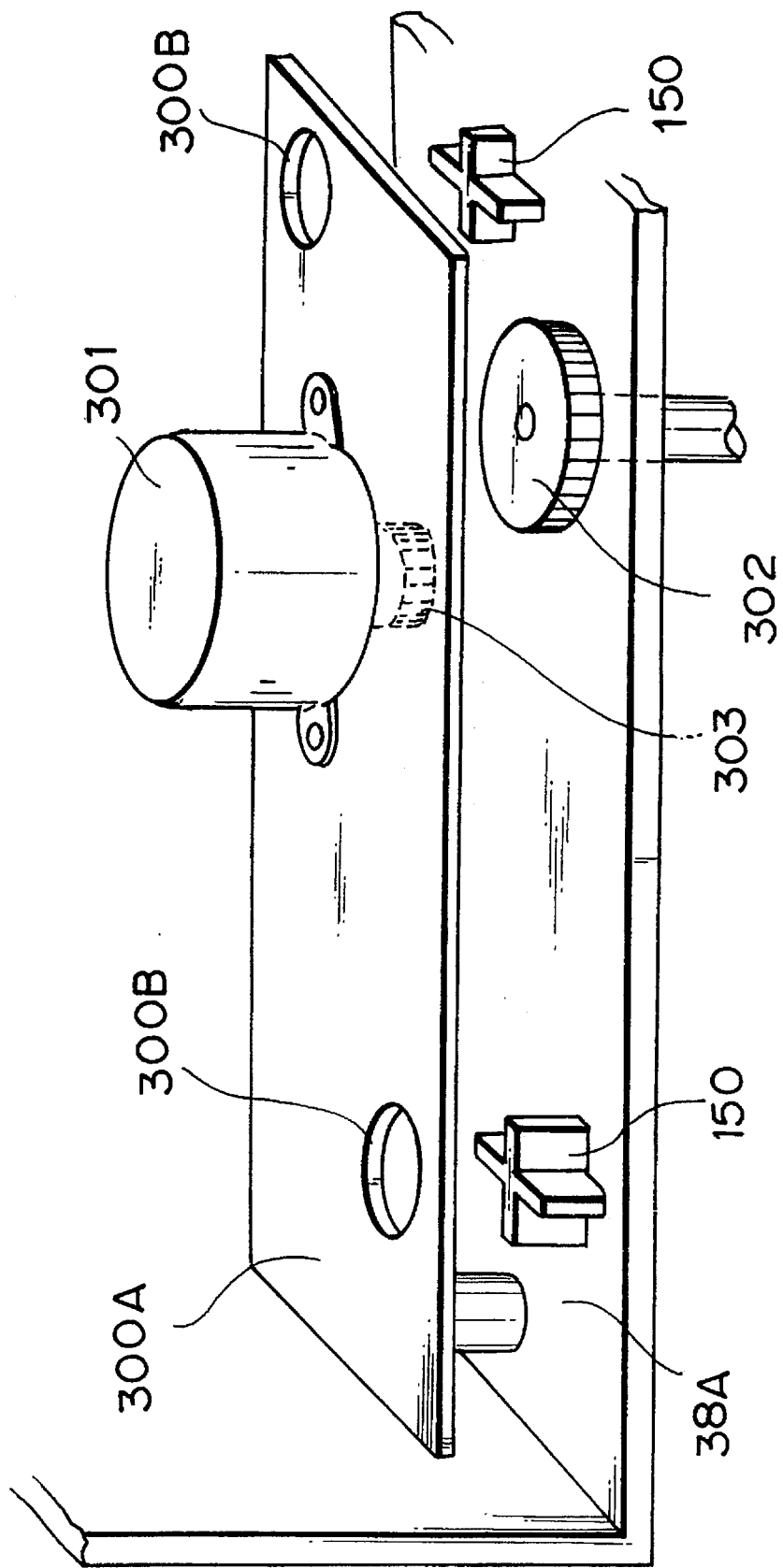
FIG. 64 is a perspective view showing the outer appearance of the main part of a molded article.

FIG. 64 is a perspective view showing the outer appearance of still another embodiment. Referring to FIG. 64, two fitting holes 300B are formed in an article 300A, and a motor 301 is fixed to the article 300A. A gear 303 is fixed to the output shaft of the motor 301. A molded article 38A integrally forms bosses 150, each made of four ribs, at positions corresponding to the fitting holes 300B, as shown in FIG. 64. The fitting holes 300B of the article 300A are guided by the outer edge portions of the bosses 150 in a position-regulated manner, so that the gear 303 meshes with a gear 302 fixed to the molded article 38A. Assembly of the molded article and the mating article is automatically completed by fitting the holes with the columns.

Figure 65:
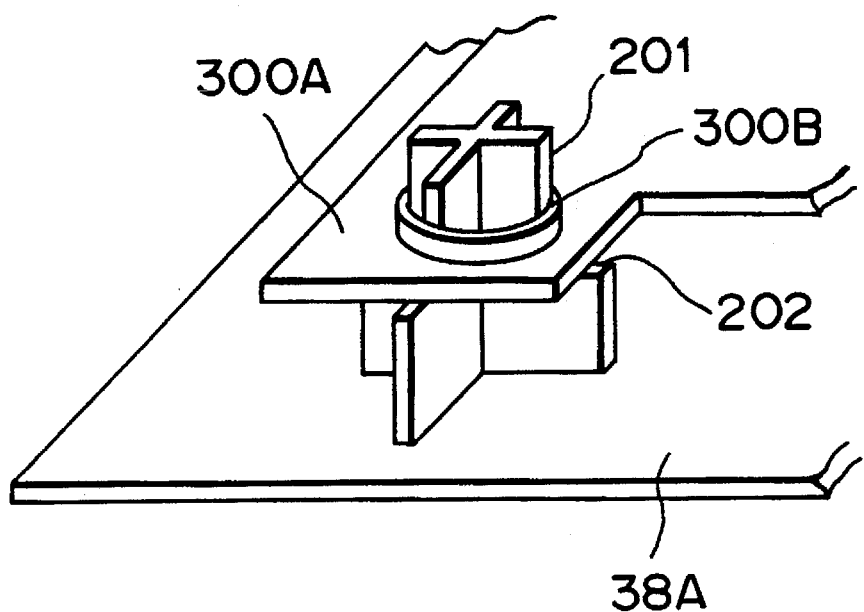
FIG. 65 is a perspective view showing the outer appearance of the main part of a molded article.
Figure 66:
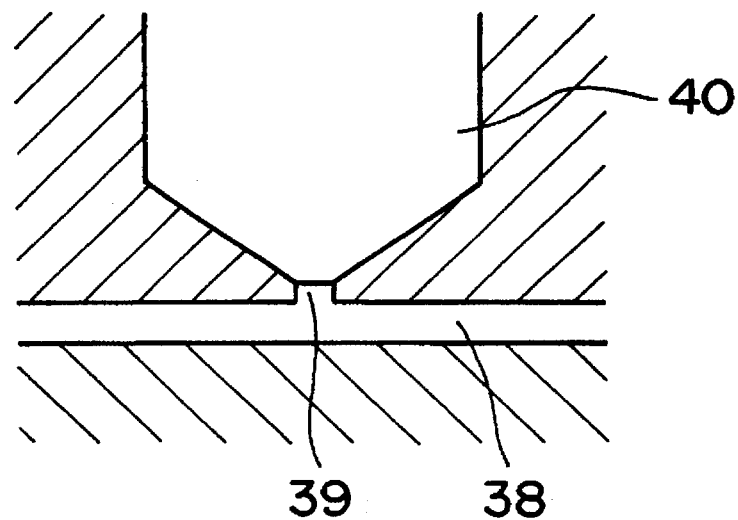
FIG. 66 is a schematic sectional view of the main part of a conventional mold.
Figure 67:
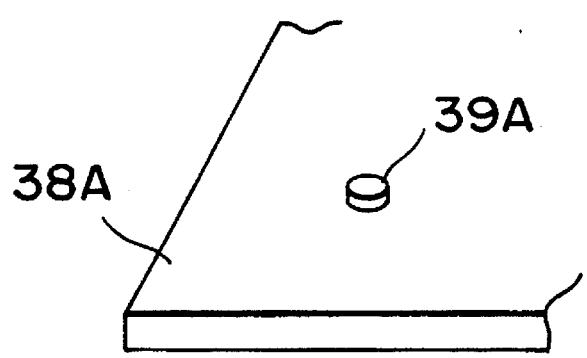
FIG. 67 is a schematic perspective view of part of an article molded by the mold shown in FIG. 66.
Figure 68:
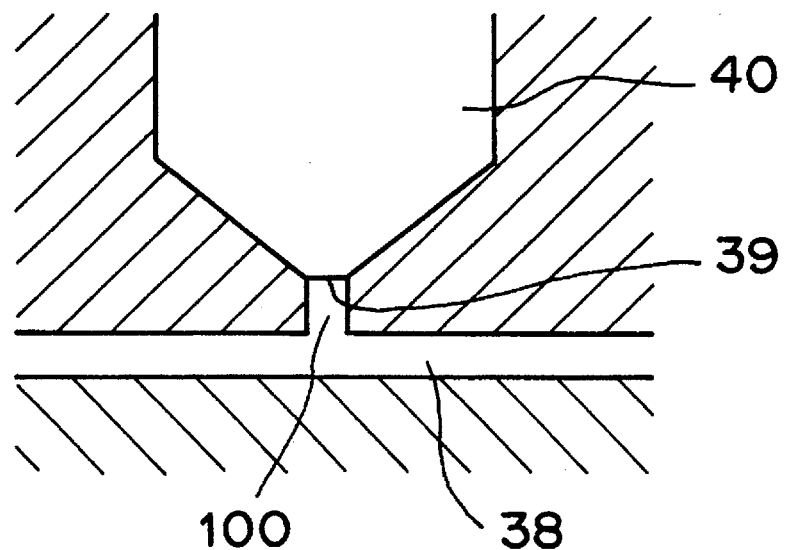
FIG. 68 is a schematic sectional view of the main part of another conventional mold.
Figure 69:
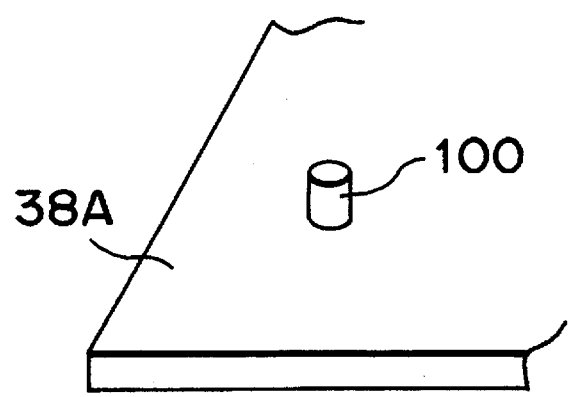
FIG. 69 is a schematic perspective view of part of an article molded by the mold shown in FIG. 68.
Figure 70:
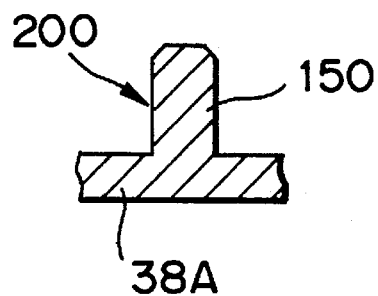
FIG. 70 is a sectional view of the main part of a conventional molded article.
Figure 71:
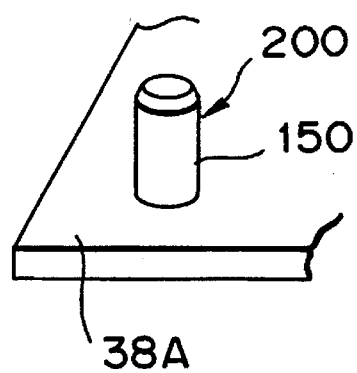
FIG. 71 is a schematic perspective view of the main part of the conventional molded article shown in FIG. 70.
Figure 72:
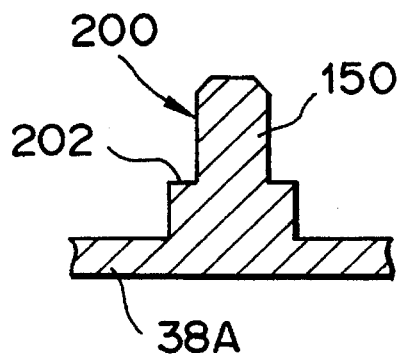
FIG. 72 is a sectional view of the main part of another conventional molded article.
Figure 73:
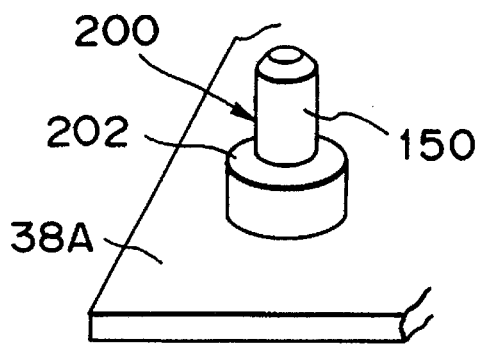
FIG. 73 is a schematic perspective view of the main part of the conventional molded article shown in FIG. 72.
Figure 74:
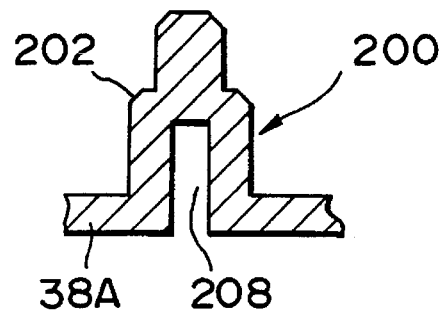
FIG. 74 is a sectional view of the main part of still another conventional molded article.
Figure 75:
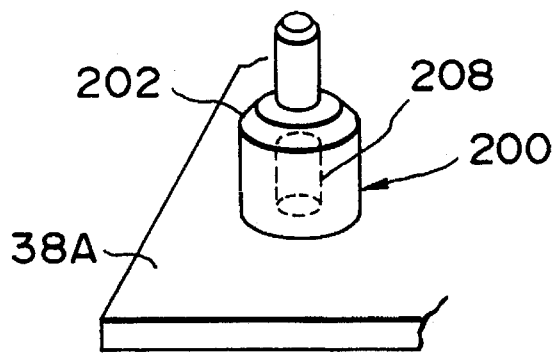
FIG. 75 is a schematic perspective view of the main part of the conventional molded article shown in FIG. 74.

FIG. 65 is a perspective view showing the outer appearance of still another embodiment. Referring to FIG. 65, a fitting hole 300B having a reinforced periphery, as shown in FIG. 65, is formed in an article 300A. An article constituted by four ribs 201, as shown in FIG. 65, which are respectively integrally formed with stepped portions 202, is integrally formed with a molded article 38A. The molded article 38A is abutted against and supports the article 300A with the stepped portions 202.

Products to be molded by the injection molding apparatus described above are not limited to the cover or chassis described above, but can be, e.g., the housing of an ink-jet printer, a copying machine, a CRT, or the like. Any product can be made by the injection molding apparatus as far as it is a product which should not have a gate mark.

As has been described above, according to the present invention, the flow rate of the coolant, e.g., cooling water, to be supplied to the mold can be maintained, and the molding cycle in continuous molding can be shortened to, e.g., ½ to ⅓ that in conventional molding, thereby improving the productivity.

According to the present invention, since the determination as to whether a molded article is molded without or with a defect is performed by the control unit, determination regarding the non-defectiveness/defectiveness of the molding condition can be performed during molding. The various parameters of the injection molding apparatus, the accompanying facilities, and the like can be corrected by feedback of the measurement result concerning the determination, so that a change in a parameter can be coped with instantaneously. Especially, since comparison of the flow rate of the coolant in the mold can be performed, the control performance of the mold temperature can be improved.

According to the present invention, the plastic molding system in injection molding of a resin, in which a resin injected from an injection molding apparatus is injected into a mold, the molded article is cooled to a predetermined temperature in the mold, and thereafter the cooled molded article is removed, comprises a holding means for vertically chucking the molded article in the mold. A transfer means, on which a molded article supplied from the holding means as it is vertically chucked, is placed and received, is provided to the molded article unloading line. Thus, upon removal of the molded article from the mold, the molded article will not be deformed, and the operation time can be shortened.

According to the present invention, a monitoring means for monitoring the temperatures at respective portions of the molded article is provided. Determination concerning the non-defectiveness/defectiveness of the molded article is performed by the monitoring means. Therefore, determination can be performed with a much higher efficiency than in a conventional case wherein the non-defectiveness/defectiveness of the molded article is determined by measuring a deformation, size precision, and the like of the molded article after the molded article is cooled to room temperature. Since the reason causing deformation of the molded article and a portion where deformation occurs are clarified, a countermeasure, e.g., cooling, can be easily taken.

According to the present invention, a temperature increase caused by a shearing heat which is generated upon injection of a thermoplastic resin near the gate can be suppressed by changing the shape of the cavity near the gate of the hot runner, so that a difference in temperature, caused during cooling, between a gate or land portion and another portion corresponding to a portion of the molded article which has a normal thickness can be decreased. As a result, an error in resin shrinkage timing and a difference in amount of shrinkage caused by the temperature difference can be decreased. Then, regarding the mold, the gate seal time, the dwell time, and the molding cycle are shortened, so that the productivity can be improved. When the mold is opened, stringing will not occur at the gate portion. Regarding the molded article, a recess will not be formed near the gate or land portion, and an appearance defect at this portion caused by a flash or silver stream can be avoided.

As has been described above, according to the present invention, a difference in temperature drop will not occur in the cooling process between the molded article main body and the boss, a loss time in the molding cycle (cooling step) is eliminated, the productivity can be improved, a recess will not be formed in the molded article, and high fitting precision with the mating article, high planar precision, good outer appearance, and the like can be maintained. Furthermore, since correction of the mold, e.g., minor correction of the position of the boss, can be easily performed locally, correction can be performed easily, leading to an excellent effect.

As many apparently widely different embodiments of the present invention can be made without departing from the spirit and scope thereof, it is to be understood that the invention is not limited to the specific embodiments thereof except as defined in the appended claims.

What is claimed is:

1. A continuous plastic molding method of injecting a predetermined resin into a cavity of a mold having a coolant line, cooling the resin to a predetermined temperature, and removing a molded article, and having a cooling unit for cooling the coolant, a temperature control unit for maintaining a coolant to a predetermined temperature, and a flow rate measuring unit provided to a coolant return line extending from said mold are provided along said coolant line, and said supply pressure control unit is controlled based on a measurement result of said flow rate measuring unit, wherein in the cooling step of forcibly supplying the coolant cooled to a required temperature to said coolant line, a gradient of temperature calculated as (resin temperature during injection—molded article removing temperature)/cooling time, is set at an appropriate value, wherein the coolant is set to have a predetermined flow rate by the supply pressure control unit, to thereby maintain an equilibrium in the temperature of said mold as related to repeated cycles of a molding temperature and a removing temperature.

2. The method according to claim 1, wherein said coolant line comprises a plurality of branching lines in said mold, said branching lines are provided with a coolant branching unit, and said flow rate measuring unit comprises a plurality of flow rate measuring units corresponding in number to said branching coolant return lines to control a supply pressure of the coolant to said coolant branching unit of each of said branching lines.

3. The method according to claim 1, wherein a measurement result obtained by said flow rate control unit is input to a control unit, and said control unit outputs a drive signal for driving said supply pressure control unit in a predetermined manner based on a measurement result obtained by a mold temperature measuring unit provided to said mold and the measurement result obtained by said flow rate measuring unit.

4. The method according to claim 2, wherein measurement results obtained by said flow rate control units are input to a control unit, and said control unit drives said supply pressure control unit in a predetermined manner for each of said branching lines in accordance with measurement results obtained by a plurality of mold temperature measuring units and measurement results obtained by said flow rate measuring units.

5. The method according to claim 2, wherein throttle valves are provided midway along supply lines extending from said coolant branching units to said mold.

6. The method according to claim 5, wherein a measurement result obtained by said flow rate measuring unit is input to a control unit, and said control unit outputs opening degree control signals for said throttle valves based on a measurement result obtained by a mold temperature measuring unit provided to said mold and a measurement result obtained by said flow rate control unit.

7. The method according to claim 2, wherein throttle valves are respectively provided to branching supply lines extending from said coolant branching unit to said mold.

8. The method according to claim 7, wherein a measurement result obtained by said flow rate measuring unit is input to a control unit, and said control unit outputs opening degree control signals for said throttle valves for each of said branching lines based on a measurement result obtained by a mold temperature measuring unit provided to said mold and a measurement result obtained by said flow rate control unit.

9. The method according to claim 1, wherein a pressure sensor for measuring the resin filling pressure within the cavity of the mold and a mold temperature measuring unit for measuring the temperature within the mold are arranged at necessary portions of said mold, measurement results obtained by said pressure sensor and said mold temperature measuring unit are input to a control unit, and said control unit outputs, from the measurement results, a signal for adjusting a flow rate of the coolant in said coolant line, thereby uniforming heat of said mold under cooling.

10. The method according to claim 9, wherein throttle valves are provided to supply lines extending from said coolant branching unit to said mold, and opening degree control signals for said throttle valves that adjust a flow rate of the coolant are output from said control unit.

11. A continuous plastic molding method according to claim 1, after cooling the resin to a predetermined temperature in said mold, and removing a molded article, wherein mold temperature measuring units for measuring temperature of said mold and pressure sensors for measuring a resin pressure in said mold are arranged at a plurality of necessary portions, and in a cooling process after injection molding, or from injection molding to a cooling process, whether a molded article is defective or not defective is determined by a control unit based on measurement results of said mold temperature measuring units and said pressure sensors.

12. The method according to claim 11, comprising providing a recording unit for recording output signals from said pressure sensors, so that recorded information of said recording unit is monitored, and an alarm signal is output upon detection of an abnormality from an output waveform of said pressure sensors.

13. The method according to claim 11, wherein removing means for removing the molded article from said mold comprises pressure adjusting means for a holding portion thereof to control a chucking pressure of the molded article based on a signal from said control unit.

14. The method according to claim 2, wherein a molded article unloading line for conveying out a molded article unloaded from said mold is provided with monitoring means for monitoring temperatures at respective portions of the molded article, and flow rate control of the coolant in said branching lines of the coolant is performed by a feedback signal sent from said monitoring means.

15. A plastic molding method, in injection molding of a resin, of molding a resin injected from an injection molding apparatus into a mold, cooling the resin to a predetermined temperature in said mold, and removing a molded article, wherein a molded article unloading line for conveying out the molded article unloaded from said mold is provided with monitoring means for monitoring temperatures at respective portions of the molded article, thereby determining whether the molded article is defective or not defective.

* * * * *

UNITED STATES PATENT AND TRADEMARK OFFICE
CERTIFICATE OF CORRECTION

PATENT NO. : 5,591,385
DATED : January 7, 1997
INVENTOR(S) : TAKASHI ARAI, ET AL.

It is certified that error appears in the above-indentified patent and that said Letters Patent is hereby corrected as shown below:

<u>COLUMN 10</u>

Line 21, ".arrangement" should read --arrangement--.

Signed and Sealed this

Twenty-second Day of July, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,591,385
DATED : January 7, 1997
INVENTOR(S) : Takashi Arai, et al It is certified that error appears in the above-indentified patent and that said Letters Patent is hereby corrected as shown below:

On the title page, item [73] Assignee: "Canon Kabushika Kaisha," should read --Canon Kabushiki Kaisha,--.

Signed and Sealed this

Second Day of September, 1997

Attest:

BRUCE LEHMAN

Attesting Officer

Commissioner of Patents and Trademarks